US012753117B1

(12) United States Patent
Peters et al.

(10) Patent No.: US 12,753,117 B1
(45) **Date of Patent: *Oct. 6, 2026**

(54) ACCELERATING PORTLAND CEMENT AND SAND MIXTURES WITH DRY CALCIUM CHLORIDE

(71) Applicant: J&P Invesco LLC, Schertz, TX (US)

(72) Inventors: Stanley R. Peters, Castle Rock, CO (US); George Clarence Geal, III, Parker, CO (US)

(73) Assignee: J&P Invesco LLC, San Antonio, TX (US)

( * ) Notice: Subject to any disclaimer, the term of this patent is extended or adjusted under 35 U.S.C. 154(b) by 588 days.

This patent is subject to a terminal disclaimer.

(21) Appl. No.: 18/178,345

(22) Filed: Mar. 3, 2023

Related U.S. Application Data

(60) Provisional application No. 63/316,168, filed on Mar. 3, 2022.

(51) Int. Cl.

| | |
|---|---|
| ***C04B 22/00*** | (2006.01) |
| ***C04B 7/02*** | (2006.01) |
| ***C04B 16/06*** | (2006.01) |
| ***C04B 16/12*** | (2006.01) |
| ***C04B 26/28*** | (2006.01) |
| ***C04B 103/46*** | (2006.01) |

(52) U.S. Cl.
CPC ................ *C04B 22/00* (2013.01); *C04B 7/02* (2013.01); *C04B 16/0633* (2013.01); *C04B 16/12* (2013.01); *C04B 26/285* (2013.01); *C04B 2103/46* (2013.01)

(58) Field of Classification Search
CPC ....... C04B 22/00; C04B 7/02; C04B 16/0633; C04B 16/12; C04B 26/285; C04B 2103/46
See application file for complete search history.

(56) References Cited

U.S. PATENT DOCUMENTS

| | | | |
|---|---|---|---|
| 1,782,471 | A | 11/1930 | Kirchener |
| 1,968,152 | A | 7/1934 | Kirchener |
| 2,307,485 | A | 1/1943 | Booth |
| 2,434,301 | A | 1/1948 | Wertz |
| 2,600,018 | A | 6/1952 | Nelson et al. |
| 2,806,531 | A | 9/1957 | Morgan et al. |
| 2,819,171 | A | 1/1958 | Benedict et al. |
| 2,820,713 | A | 1/1958 | Wagner |
| 2,890,965 | A | 6/1959 | Underdown et al. |
| 3,008,843 | A | 11/1961 | Jolly |
| 3,427,175 | A | 2/1969 | Angstadt et al. |
| 4,032,353 | A | 6/1977 | Ball |
| 4,042,408 | A | 8/1977 | Murray et al. |
| 4,209,336 | A | 6/1980 | Previte |
| 4,264,367 | A | 4/1981 | Schutz |
| 4,444,593 | A | 4/1984 | Schutz |
| 5,106,422 | A | 4/1992 | Bennett et al. |
| 5,211,751 | A | 5/1993 | Arfaei et al. |
| 5,378,278 | A | 1/1995 | Colburn |
| 5,399,195 | A | 3/1995 | Hansen |
| 5,728,209 | A | 3/1998 | Bury |
| 5,785,751 | A | 7/1998 | Bashlykov et al. |
| 6,485,561 | B1 | 11/2002 | Dattel |
| 6,648,962 | B2 | 11/2003 | Berke et al. |
| 6,869,474 | B2 | 3/2005 | Perez-pena et al. |
| 6,890,382 | B2 | 5/2005 | Zampieri |
| 6,913,645 | B2 | 7/2005 | McNulty, Jr. |
| 7,029,527 | B2 | 4/2006 | Gaudry et al. |
| 7,427,321 | B2 | 9/2008 | Hilton et al. |
| 7,670,427 | B2 | 3/2010 | Perez-pena et al. |
| 7,842,348 | B2 | 11/2010 | Abbott et al. |
| 8,167,998 | B2 | 5/2012 | Ladely et al. |
| 8,747,547 | B1 | 6/2014 | Peters et al. |
| 8,822,567 | B2 | 9/2014 | Kono et al. |
| 9,028,606 | B2 | 5/2015 | Andersen |
| 9,038,719 | B2 | 5/2015 | Crews |
| 9,090,508 | B2 | 7/2015 | Gong |
| 10,239,790 | B2 | 3/2019 | Byrd |
| 10,322,971 | B1 | 6/2019 | Geal, III |
| 10,571,045 | B2 | 2/2020 | Pino, Jr. et al. |

(Continued)

FOREIGN PATENT DOCUMENTS

| | | | |
|---|---|---|---|
| BE | 508098 | A1 | 1/1952 |
| BE | 582948 | A1 | 1/1960 |

(Continued)

OTHER PUBLICATIONS

Calcium Chloride Pellets Safety Data Sheet (Year: 2020).*

(Continued)

*Primary Examiner* — Anthony J Green
(74) *Attorney, Agent, or Firm* — Merchant & Gould P.C.

(57) ABSTRACT

The present disclosure generally relates to backfill compositions of Portland cement, sand and water that will solidify from a liquid state to solid at an accelerated rate, by the addition of dry calcium chloride. The addition of the dry calcium chloride allows the mixtures to solidify quicker than typical chemical admixtures designed for accelerating Portland cement concrete can achieve, including those containing commercially available calcium chloride in a liquid form. Additionally, disclosed compositions demonstrate improved freeze-thaw resistance in cold climates by utilizing higher cement contents and conventional air-entrainment. In some examples, the system improves durability in service by application of a cure-sealing compound to the surface of the backfill material.

20 Claims, 36 Drawing Sheets

(56) References Cited

U.S. PATENT DOCUMENTS

| | | | | |
|---|---|---|---|---|
| 10,571,047 | B2 | 2/2020 | Pino, Jr. et al. | |
| 10,641,414 | B2 | 5/2020 | Pino, Jr. et al. | |
| 10,843,968 | B1 | 11/2020 | Geal | |
| 10,851,016 | B1 | 12/2020 | Peters | |
| 10,919,807 | B1 | 2/2021 | Karam | |
| 11,247,942 | B1 | 2/2022 | Geal | |
| 11,434,169 | B1 | 9/2022 | Peters | |
| 11,440,841 | B1 | 9/2022 | Peters | |
| 11,926,568 | B1 | 3/2024 | Geal | |
| 11,987,534 | B1 | 5/2024 | Peters | |
| 12,043,578 | B1 * | 7/2024 | Peters | C04B 16/0633 |
| 12,398,074 | B1 | 8/2025 | Peters | |
| 2002/0117088 | A1 | 8/2002 | Norman et al. | |
| 2003/0041785 | A1 | 3/2003 | Harrison | |
| 2005/0103234 | A1 | 5/2005 | McNulty, Jr. | |
| 2008/0227891 | A1 | 9/2008 | Jarvie et al. | |
| 2009/0114126 | A1 | 5/2009 | Roddy et al. | |
| 2009/0158960 | A1 | 6/2009 | Andersen | |
| 2009/0158965 | A1 | 6/2009 | Andersen | |
| 2009/0158967 | A1 | 6/2009 | Andersen | |
| 2010/0064943 | A1 | 3/2010 | Guevara et al. | |
| 2010/0095871 | A1 | 4/2010 | Patil et al. | |
| 2010/0190888 | A1 * | 7/2010 | Gaeberlein | C04B 24/2688 524/5 |
| 2011/0021668 | A1 | 1/2011 | Hamai et al. | |
| 2012/0037046 | A1 | 2/2012 | La Rolland et al. | |
| 2012/0040165 | A1 | 2/2012 | Dubey | |
| 2012/0196046 | A1 | 8/2012 | Nicoleau | |
| 2013/0008354 | A1 | 1/2013 | Constantz | |
| 2013/0087075 | A1 | 4/2013 | Massa | |
| 2014/0083698 | A1 | 3/2014 | Stone et al. | |
| 2014/0138007 | A1 | 5/2014 | Dubey et al. | |
| 2014/0311387 | A1 | 10/2014 | Hohn et al. | |
| 2015/0144032 | A1 * | 5/2015 | Brush | C08B 11/20 536/87 |
| 2015/0175887 | A1 | 6/2015 | Welker | |
| 2015/0240163 | A1 | 8/2015 | Welker | |
| 2015/0291476 | A1 | 10/2015 | Al-Mutlaq | |
| 2018/0106015 | A1 | 4/2018 | Pino et al. | |
| 2018/0156357 | A1 | 6/2018 | Pino et al. | |
| 2018/0201547 | A1 * | 7/2018 | Hills | C04B 28/26 |
| 2020/0149659 | A1 | 5/2020 | Pino, Jr. et al. | |
| 2020/0149660 | A1 | 5/2020 | Pino, Jr. et al. | |
| 2020/0200292 | A1 | 6/2020 | Pino, Jr. et al. | |

FOREIGN PATENT DOCUMENTS

| | | | | |
|---|---|---|---|---|
| CA | 412214 | A | 5/1943 | |
| CA | 419133 | A | 3/1944 | |
| CA | 419134 | A | 3/1944 | |
| CA | 419135 | A | 3/1944 | |
| CA | 462493 | A | 1/1950 | |
| CA | 520832 | A | 1/1956 | |
| CA | 566361 | A | 11/1958 | |
| CA | 607361 | A | 10/1960 | |
| CA | 607391 | A | 10/1960 | |
| CA | 625024 | A | 8/1961 | |
| CA | 713618 | A | 7/1965 | |
| CA | 900635 | A | 5/1972 | |
| CA | 1204456 | | 5/1986 | |
| CA | 2689446 | | 12/2008 | |
| CA | 101670619 | A | 3/2010 | |
| CN | 113801566 | A * | 12/2021 | C08G 59/1477 |
| DE | 1807608 | A1 | 6/1970 | |
| EP | 114448 | A1 | 8/1984 | |
| EP | 127960 | A1 | 12/1984 | |
| EP | 402306 | A1 | 12/1990 | |
| EP | 2520553 | A1 | 11/2012 | |
| EP | 1532080 | B2 | 3/2014 | |
| EP | 2832706 | A1 | 2/2015 | |
| EP | 2414301 | B2 | 11/2015 | |
| FR | 38549 | E | 6/1931 | |
| FR | 1591415 | A | 4/1970 | |
| FR | 2061507 | A2 | 6/1971 | |
| GB | 301509 | A | 1/1930 | |
| GB | 430781 | A | 6/1935 | |
| GB | 791622 | A | 3/1958 | |
| GB | 833071 | A | 4/1960 | |
| GB | 1181331 | A | 2/1970 | |
| GB | 1315225 | A | 5/1973 | |
| IN | 154852 | A1 | 12/1984 | |
| IN | 159750 | A1 | 6/1987 | |
| JP | 06040756 | A | 2/1994 | |
| JP | 06298552 | A | 10/1994 | |
| JP | 08029963 | B2 | 3/1996 | |
| JP | 2802972 | B2 | 9/1998 | |
| JP | 11217253 | A | 8/1999 | |
| JP | 2000007402 | A | 1/2000 | |
| JP | 2000095554 | A | 4/2000 | |
| JP | 3125316 | B2 | 1/2001 | |
| JP | 2004002080 | A | 1/2004 | |
| JP | 3558730 | B2 | 8/2004 | |
| JP | 2005324982 | A | 11/2005 | |
| JP | 2006298661 | A | 11/2006 | |
| JP | 4157485 | B2 | 10/2008 | |
| JP | 4290628 | B2 | 7/2009 | |
| JP | 4348001 | B2 | 10/2009 | |
| JP | 2010150105 | A | 7/2010 | |
| JP | 4626541 | B2 | 2/2011 | |
| JP | 4705455 | B2 | 6/2011 | |
| JP | 4725742 | B2 | 7/2011 | |
| JP | 4813822 | B2 | 11/2011 | |
| JP | 4837161 | B2 | 12/2011 | |
| JP | 4860396 | B2 | 1/2012 | |
| JP | 4877886 | B2 | 2/2012 | |
| JP | 5051990 | B2 | 10/2012 | |
| JP | 5113496 | B2 | 1/2013 | |
| JP | 2013170436 | | 9/2013 | |
| JP | 2013077378 | A1 | 4/2015 | |
| JP | 2015124141 | A | 7/2015 | |
| JP | 2015229684 | A | 12/2015 | |
| KR | 100311286 | B2 | 9/2001 | |
| KR | 1020120016432 | A | 2/2012 | |
| LU | 57288 | A1 | 2/1969 | |
| RU | 2099302 | C1 | 12/1997 | |
| RU | 2102356 | C1 | 1/1998 | |
| RU | 2119900 | C1 | 10/1998 | |
| RU | 2186942 | C1 | 8/2002 | |
| RU | 2257294 | C1 | 7/2005 | |
| RU | 2337124 | C1 | 10/2008 | |
| RU | 2434923 | C1 | 11/2011 | |
| RU | 2470979 | C1 | 12/2012 | |
| RU | 2497861 | C1 | 11/2013 | |
| RU | 2525408 | C1 | 8/2014 | |
| RU | 2542063 | C1 | 2/2015 | |
| RU | 2545208 | C1 | 3/2015 | |
| RU | 2553807 | C1 | 6/2015 | |
| RU | 2555683 | C1 | 7/2015 | |
| SU | 848594 | A1 | 7/1981 | |
| SU | 876960 | A1 | 10/1981 | |
| SU | 1411439 | A1 | 7/1988 | |
| SU | 1435762 | A1 | 11/1988 | |
| SU | 1585309 | A1 | 8/1990 | |
| SU | 1682531 | A1 | 10/1991 | |
| WO | 8601795 | A1 | 3/1986 | |
| WO | 0051947 | A1 | 9/2000 | |
| WO | 2008130107 | A1 | 10/2008 | |
| WO | 2010047919 | A1 | 4/2010 | |
| WO | 2011139466 | A1 | 11/2011 | |
| WO | 2012136963 | A1 | 10/2012 | |
| WO | 2014068409 | A2 | 5/2014 | |
| WO | 2014072533 | A1 | 5/2014 | |
| WO | 2015034531 | A1 | 3/2015 | |
| WO | 2015034543 | A1 | 3/2015 | |
| WO | 2015130284 | A1 | 9/2015 | |
| WO | 2016043500 | A1 | 3/2016 | |

OTHER PUBLICATIONS

ARG Roving Specification, Nippon Electric Glass Co., Ltd, Kanzaki, Shiga, Japan, Feb. 5, 2001, version 2, 1 page.

(56) References Cited

OTHER PUBLICATIONS

BCSA is a stand-alone rapid-setting Cement, PP composition, 2018, Eupave, 1 page.
Bost et al., "Comparison of the accelerating effect of various additions on the early hydration of Portland cement," Construction and Building Materials, Jun. 15, 2016, 2 pages.
Chryso Turbocast NCT, concrete admixture, Safety Data Sheet, according to Federal Register, vol. 77, No. 58, Monday, Mar. 26, 2012, pp. 1-5.
Chryso, Material Safety Data Sheet, Chryso Plast P150, Revision Date Jun. 26, 2009, 5 pages.
Fibercast, by Propex, Product Data, Fibercast 500, PCS-1156E-002 (Mar. 2017), 2 pages.
Juenger et al., "A soft X-ray microscope investigation into the effects of calcium chloride on tricalcium silicate hydration," Cement and Concrete Research, Jan. 1, 2005, 2 pages.
Kosmatka et al., "Design and Control of Concrete Mixtures," The guide to applications, methods, and materials, 15th edition, Engineering Bulletin 001, Portal Cement Association, 2011, p. 91.
Liquid Calcium chloride, Product Data Sheet, Tetra Chemicals, 2004, 1 page.
Odler et al., "On the combined effect of water solubles lignosulfonates and carbonates on Portland cement and clinker pastes 1. Physical properties," Cement and Concreate Research, Jul. 1, 1978, 2 pages.
Rapid Set Cement, Fast Setting Hydraulic Cement, Manufacturer: CTS Cement Manufacturing Corp., 1982, 1 page.
Rapp, "Effect of Calcium Chloride on Portland Cements and Concretes," Journal of Research of the National Bureau of Standards, Apr. 1, 1935, 2 pages.
Reddy, V. Venkateswarna et al., "Influence of strong alkaline substances (sodium carbonate and sodium bicarbonate) in mixing water on strength and setting properties of concrete", Indian Journal of Engineering & Materials Sciences, vol. 13, Apr. 2006, pp. 123-128.
Rosenberg, "Study of the Mechanism Through Which Calcium Chloride Accelerates the Set of Portland," Oct. 1, 1964, 2 pages.
Safety Data Sheet, Rapid Set, CTS cement, Version No. 2, revision date Issue date Jan. 27, 2018, pp. 1-7.
Surecrete Design Products, Inc., Safety Data Sheet, TruTique—Integral Color (Gun Metal), revision date Jan. 1, 2017, 7 pages.
Western Material & Design, LC, FasTrac 400, vol. Mar. 2018, 2 pages.
Williams et al., "Developing Mixture Proportion Guidance for Field-Prepared Rapid-Setting Materials for Emergency Airfield Repairs," Feb. 8, 2012, 2 pages.
Witlbank et al., "Effect of Selected Accelerants on the Physical Properties of Mineral Trioxide Aggregate and Portland Cement," Journal of Endodontics, Oct. 1, 2007, 2 pages.

* cited by examiner

G-1000 - Salt Solution - 5 Cycles

G-1000-B G-1000-CS-B

Without Cure Seal With Cure Seal

G-1000 - Salt Solution - 20 Cycles

G-1000-B

G-1000-CS-B

Without Cure Seal

With Cure Seal

G-1000 - Salt Solution - 30 Cycles

G-1000-B G-1000-CS-B

Without Cure Seal With Cure Seal

ACCELERATING PORTLAND CEMENT AND SAND MIXTURES WITH DRY CALCIUM CHLORIDE

CROSS REFERENCE TO RELATED APPLICATIONS

This application claims priority to U.S. Provisional Patent Application Ser. No. 63/316,168, filed Mar. 3, 2022, which is fully incorporated herein by reference.

BACKGROUND

In construction applications, it may be desirable for a self-hardening backfill composition to set quickly. Currently disclosed compositions that achieve satisfactory strength (for example, strength sufficient to support truck traffic) in four hours include large amounts of Class C fly ash. Additionally, construction applications may require a self-hardening backfill that sets quickly and that has freeze-thaw resistance. Currently disclosed compositions that meet these requirements include preformed cellular foam as well as even larger amounts of Class C fly ash. However, Class C fly ash is not readily available in many locations. Additionally, energy industry trends forecast that a majority of coal-fired power plants will be shut down within 20 years. Because coal-fired power plants are the only source of Class C fly ash, Class C fly ash may soon not be readily available even areas where it has traditionally been available.

SUMMARY

The present disclosure generally relates to compositions that use dry calcium chloride, e.g., pelleted calcium chloride, as an accelerant. The disclosed compositions accelerate the time that a mixture of Portland cement, sand and water will solidify from a liquid state to solid, by the addition of dry calcium chloride. The addition of the dry calcium chloride allows the mixtures to solidify quicker than typical chemical admixtures designed for accelerating Portland cement concrete can achieve, including those containing commercially available calcium chloride in a liquid form. The disclosed compositions provide an alternate means of producing a rapid-setting backfill material, even when Class C fly ash is not readily available.

Additionally, the present disclosure describes compositions of a fast-setting backfill system with improved freeze-thaw durability in cold climates. The compositions utilize higher cement contents and conventional air-entrainment to create a backfill material with freeze-thaw resistance. In some examples, the system improves durability in service by application of a cure-sealing compound to the surface of the backfill material.

Accordingly, the present application describes a composition comprising: between 45% and 70% sand by weight of the composition; between 10% and 35% cement by weight of the composition; between 5% and 20% water by weight of the composition; between 0.01% and 0.5% fibers by weight of the composition; and between 0.1% and 3% dry calcium chloride by weight of the composition, the composition having a compressive strength of between 1,500 psi and 4,000 psi after 7 days, and a compressive strength of between 2,500 psi and 5,000 psi after 28 days.

In an example, the sand is between 50% and 65% by weight of the composition.

In an example, the cement includes Portland cement. In an example, the Portland cement is between 15% and 30% by weight of the composition.

In an example, the dry calcium chloride includes pellets. In an example, the dry calcium chloride is between 0.5% and 2% by weight of the composition.

In an example, the water is between 10% and 15% by weight of the composition.

In an example, the described composition further comprises between 0.01% and 2.0% polymer by weight of the composition. In an example, the polymer is between 0.03% and 0.1% by weight of the composition. In an example, the polymer is hydroxypropyl methylcellulose.

In an example, the fibers are between 0.05% and 0.1% by weight of the composition. In an example, the fibers are polypropylene fibers. In an example, the fibers are between 0.25 inches and 0.5 inches long.

In an example, the described composition further comprises a cure-sealing compound. In an example, the cure sealing compound is applied to the composition at a coverage rate of 400 square feet per gallon of cure sealing compound. In an example, two coats of cure sealing compound are applied to the composition.

In an example, the described composition further comprises an air entraining agent. In an example, the air entraining agent is between 0.01% and 0.5% by weight of the composition. In an example, the air entraining agent is between 0.04% and 0.2% by weight of the composition.

In an example, the described composition further comprises a water reducer.

While the disclosure will be described with respect to preferred embodiment configurations and with respect to particular compositions or methods used therein, it will be understood that the disclosure is not to be construed as limited in any manner by either such configuration or components described herein. Also, while the particular types of equipment, compositions and uses are described herein, it will be understood that such particular compositions, equipment or uses are not to be construed in a limiting manner. Instead, the functionality of those compositions and methods should be appreciated. These and other variations of the disclosure will become apparent to those skilled in the art upon a more detailed description of the disclosure.

The advantages and features which characterize the disclosure are pointed out with particularity in the claims annexed hereto and forming a part hereof. For a better understanding of the disclosure, however, reference should be had to the examples, which form a part hereof and to the accompanying descriptive matter, in which there is illustrated and described embodiments of the disclosure. The provisional applications to which this application claims priority to are incorporated herein in their entirety.

BRIEF DESCRIPTION OF THE DRAWINGS

Non-limiting and non-exhaustive examples are described with reference to the following Figures.

DETAILED DESCRIPTION

Figure 1A:
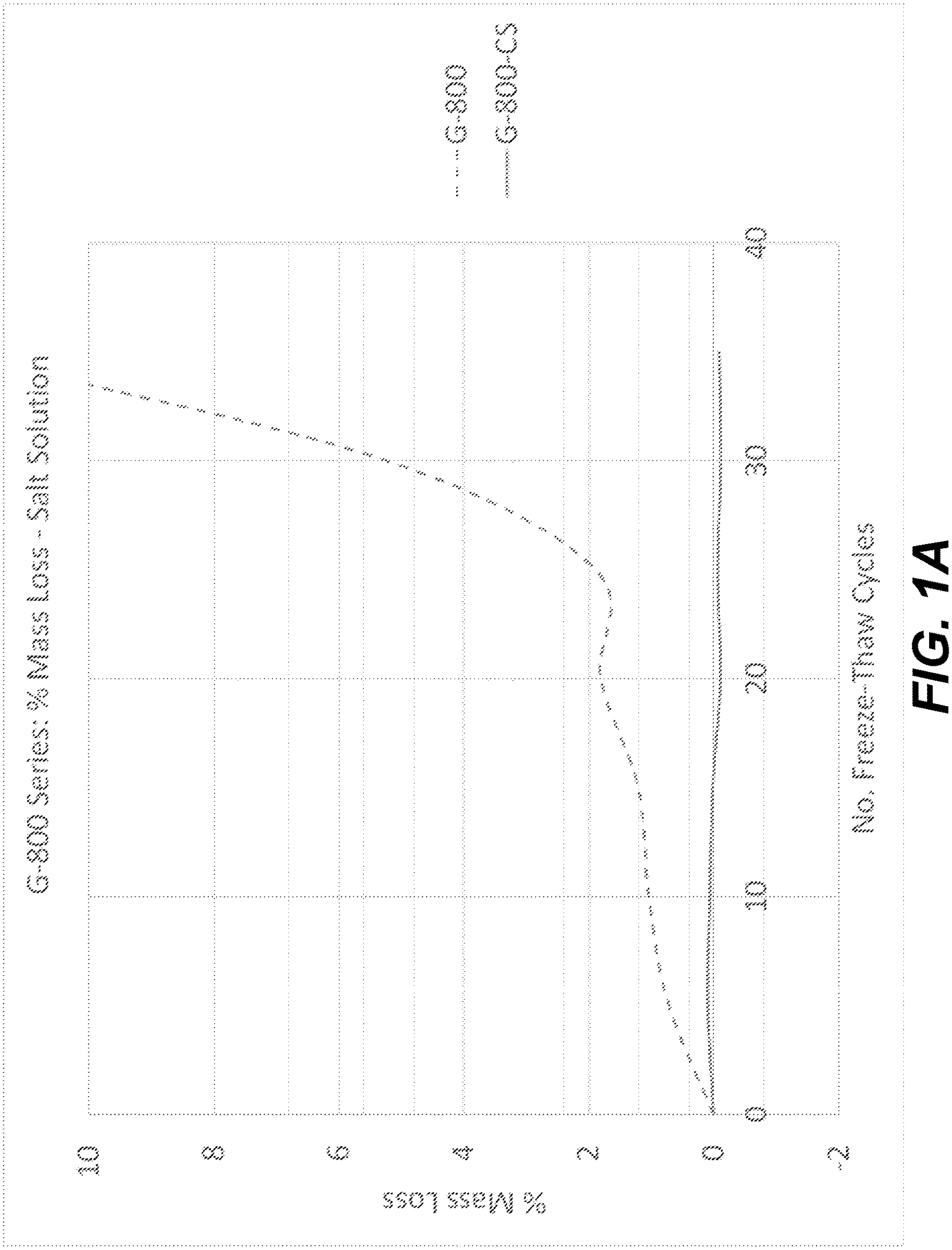
FIG. 1A illustrates a graphical representation of data depicting freeze-thaw cycle data for compositions including 800 lb/CY cement and either including or not including a cure sealer, when exposed to a salt solution.
Figure 1B:
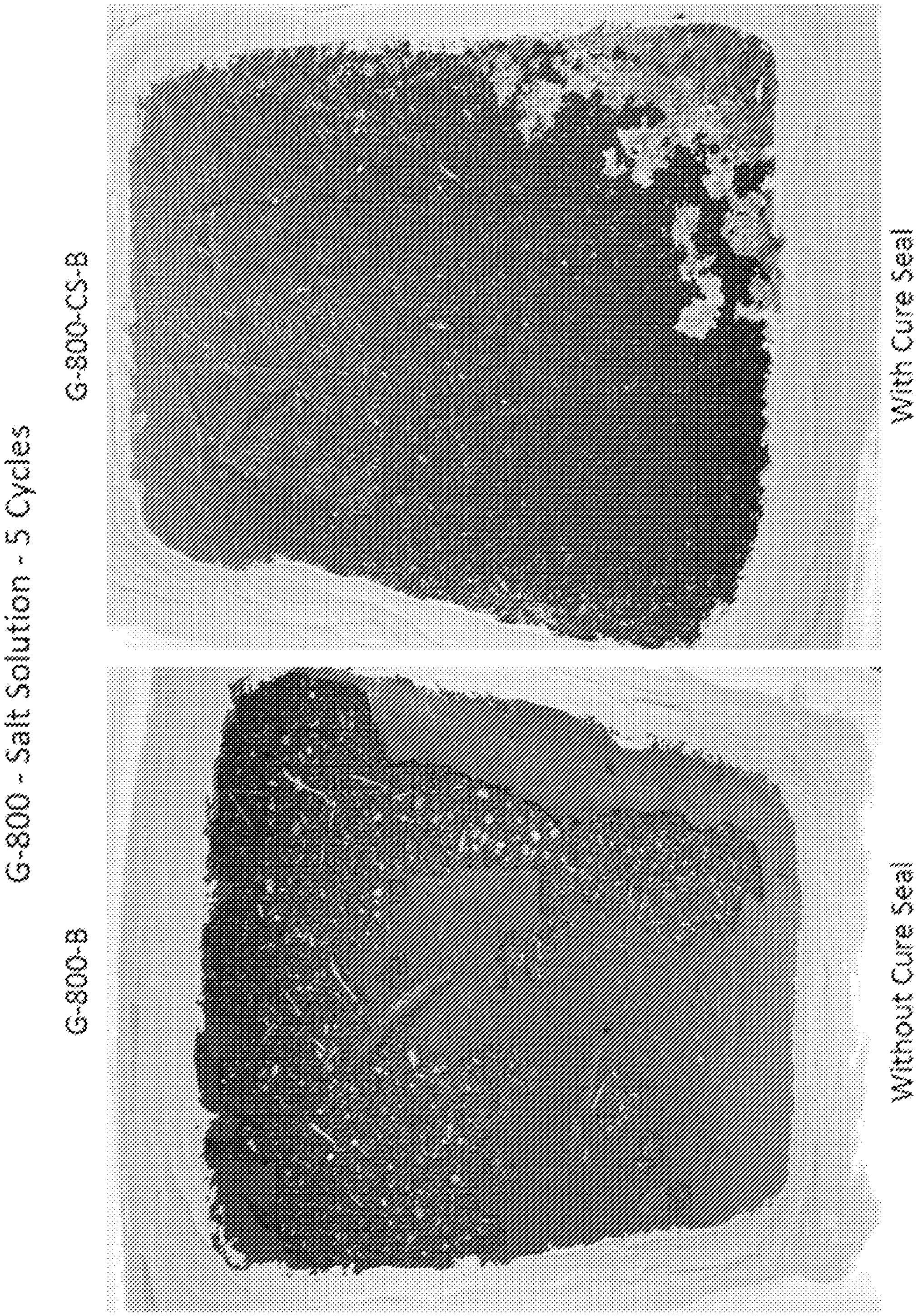
FIG. 1B depicts visual surface deterioration observations taken after 5 freeze-thaw cycles, for compositions including 800 lb/CY cement and including and not including a cure sealer, when exposed to a salt solution.
Figure 1C:
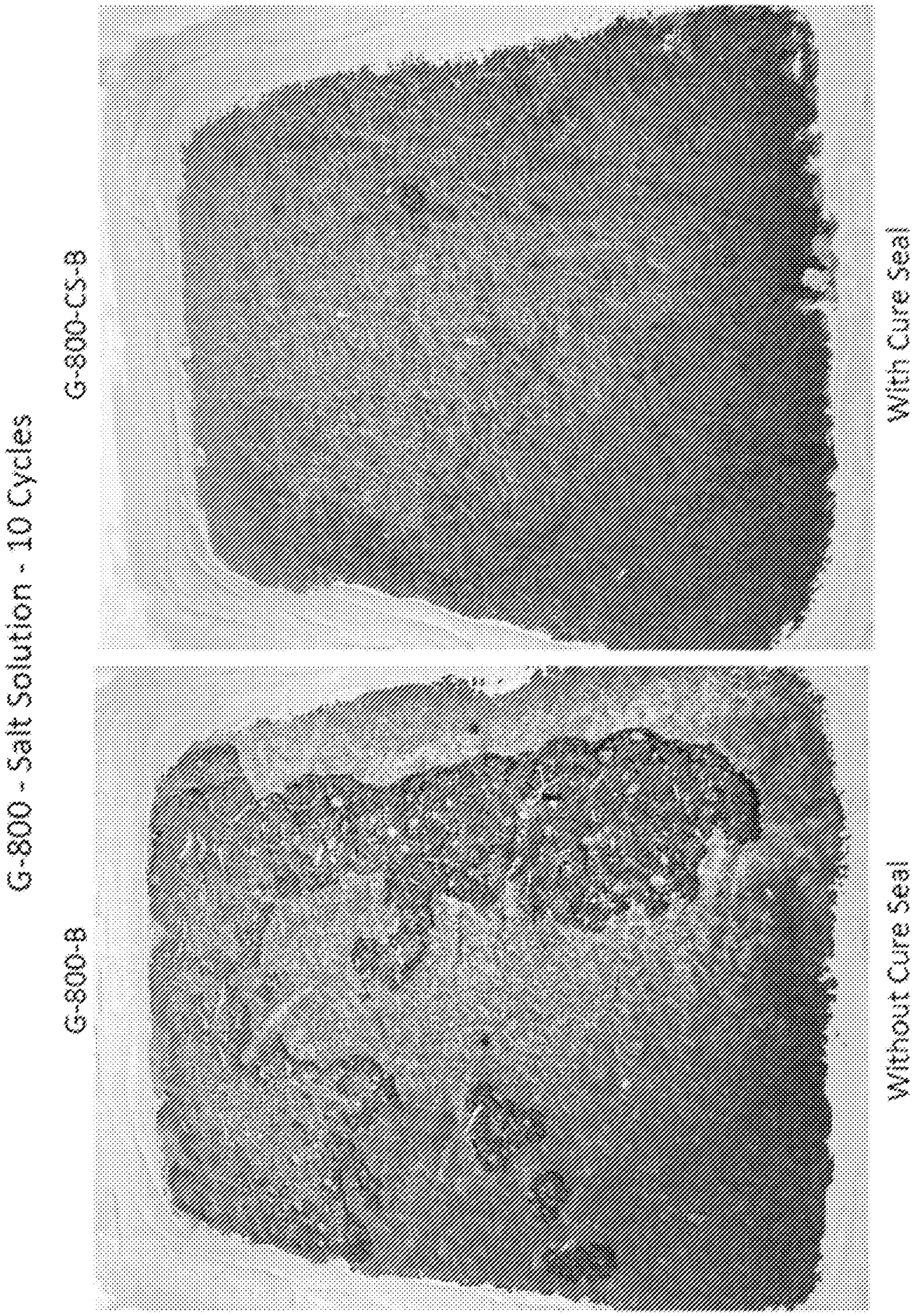
FIG. 1C depicts visual surface deterioration observations taken after 10 freeze-thaw cycles, for compositions including 800 lb/CY cement and including and not including a cure sealer, when exposed to a salt solution.
Figure 1D:
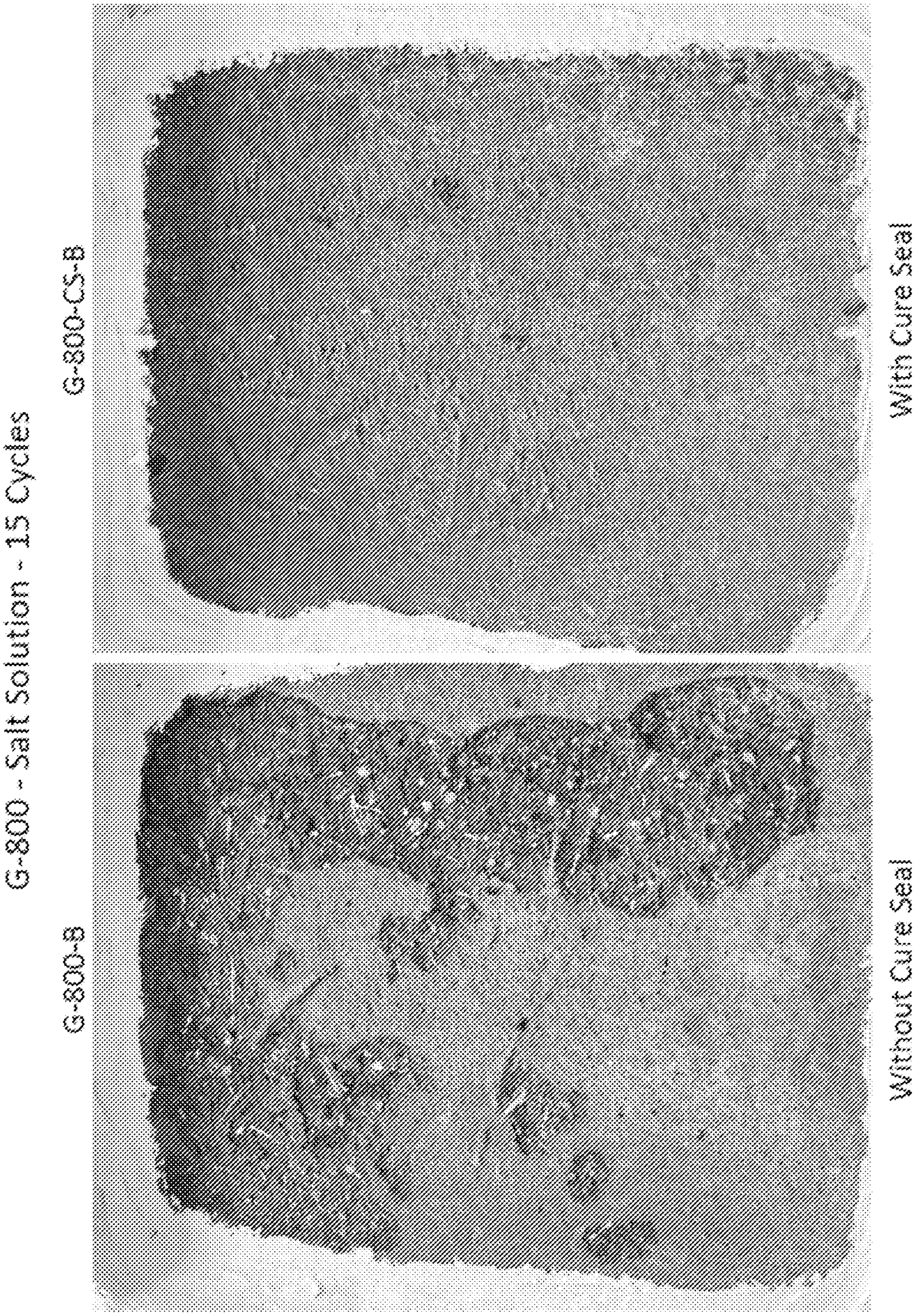
FIG. 1D depicts visual surface deterioration observations taken after 15 freeze-thaw cycles, for compositions including 800 lb/CY cement and including and not including a cure sealer, when exposed to a salt solution.
Figure 1E:
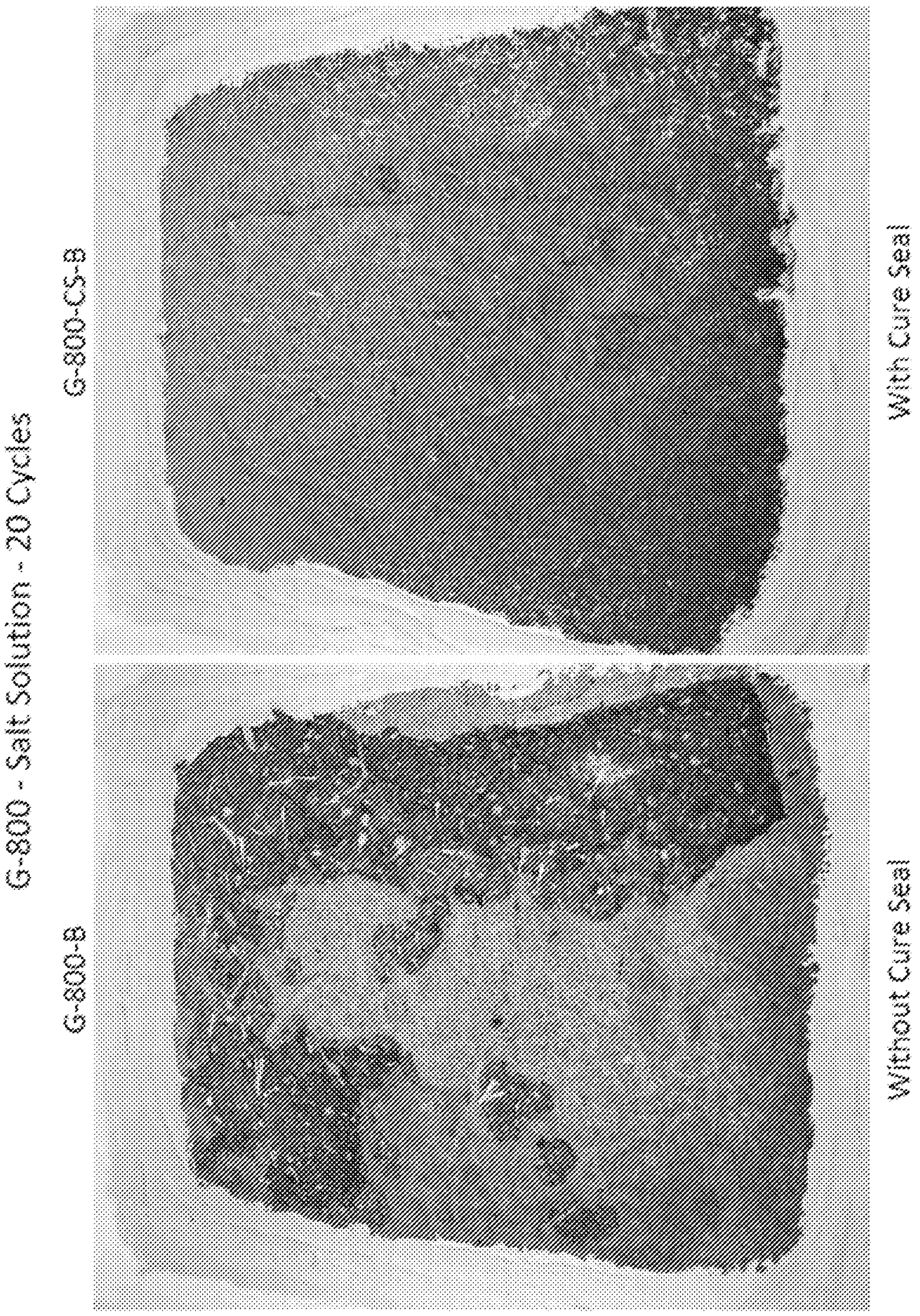
FIG. 1E depicts visual surface deterioration observations taken after 20 freeze-thaw cycles, for compositions including 800 lb/CY cement and including and not including a cure sealer, when exposed to a salt solution.
Figure 1F:
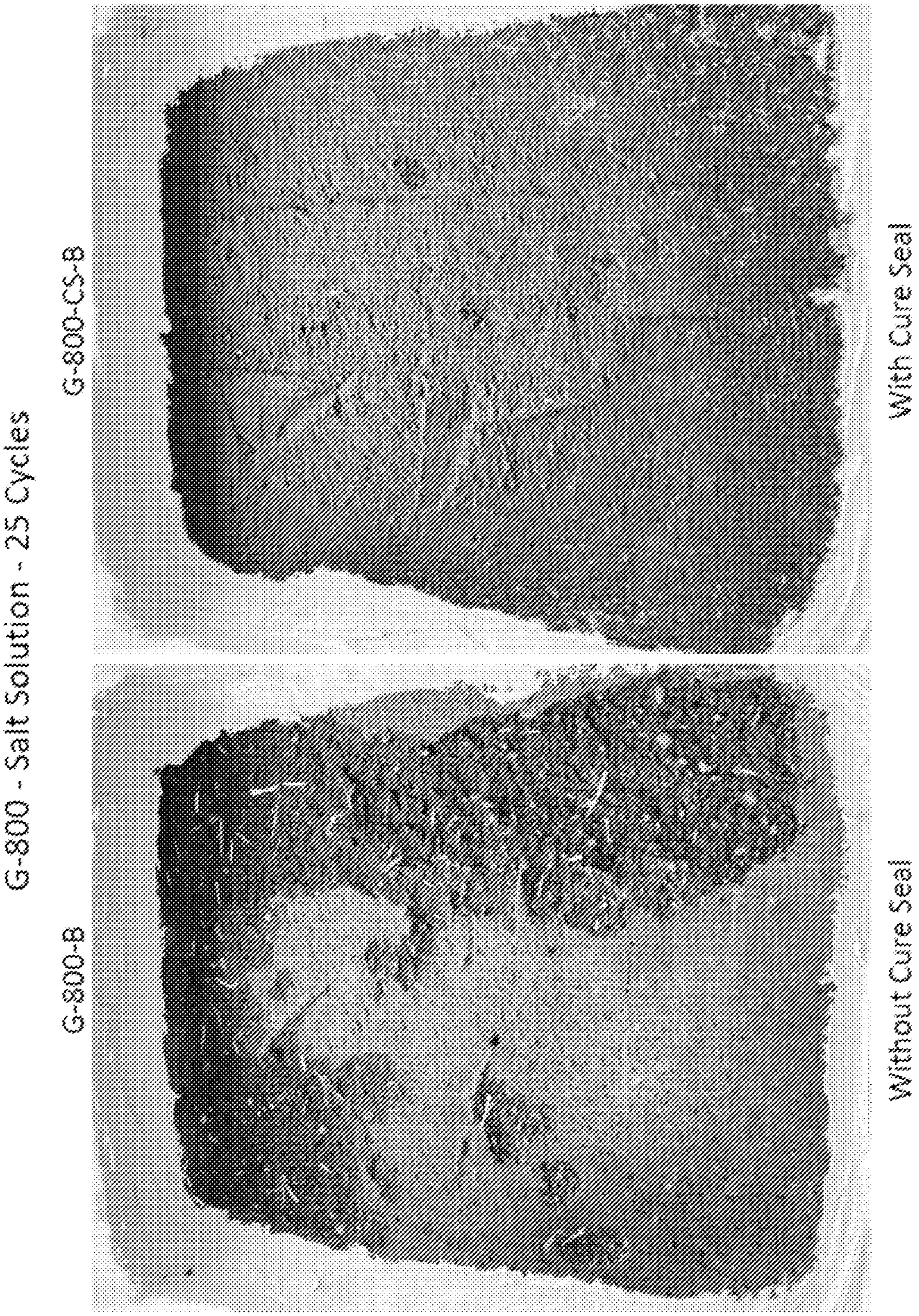
FIG. 1F depicts visual surface deterioration observations taken after 25 freeze-thaw cycles, for compositions including 800 lb/CY cement and including and not including a cure sealer, when exposed to a salt solution.
Figure 1G:
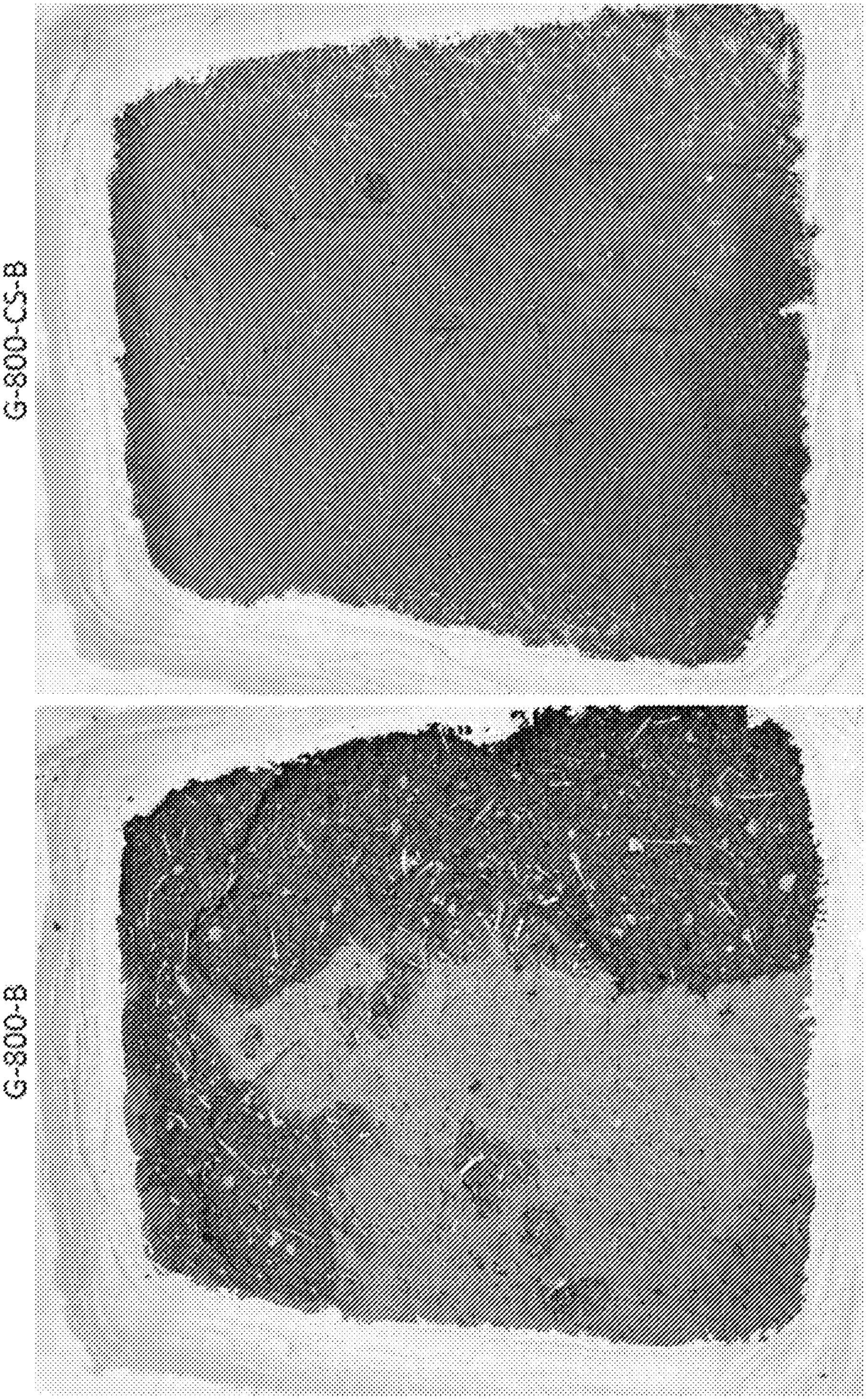
FIG. 1G depicts visual surface deterioration observations taken after 30 freeze-thaw cycles, for compositions including 800 lb/CY cement and including and not including a cure sealer, when exposed to a salt solution.
Figure 1H:
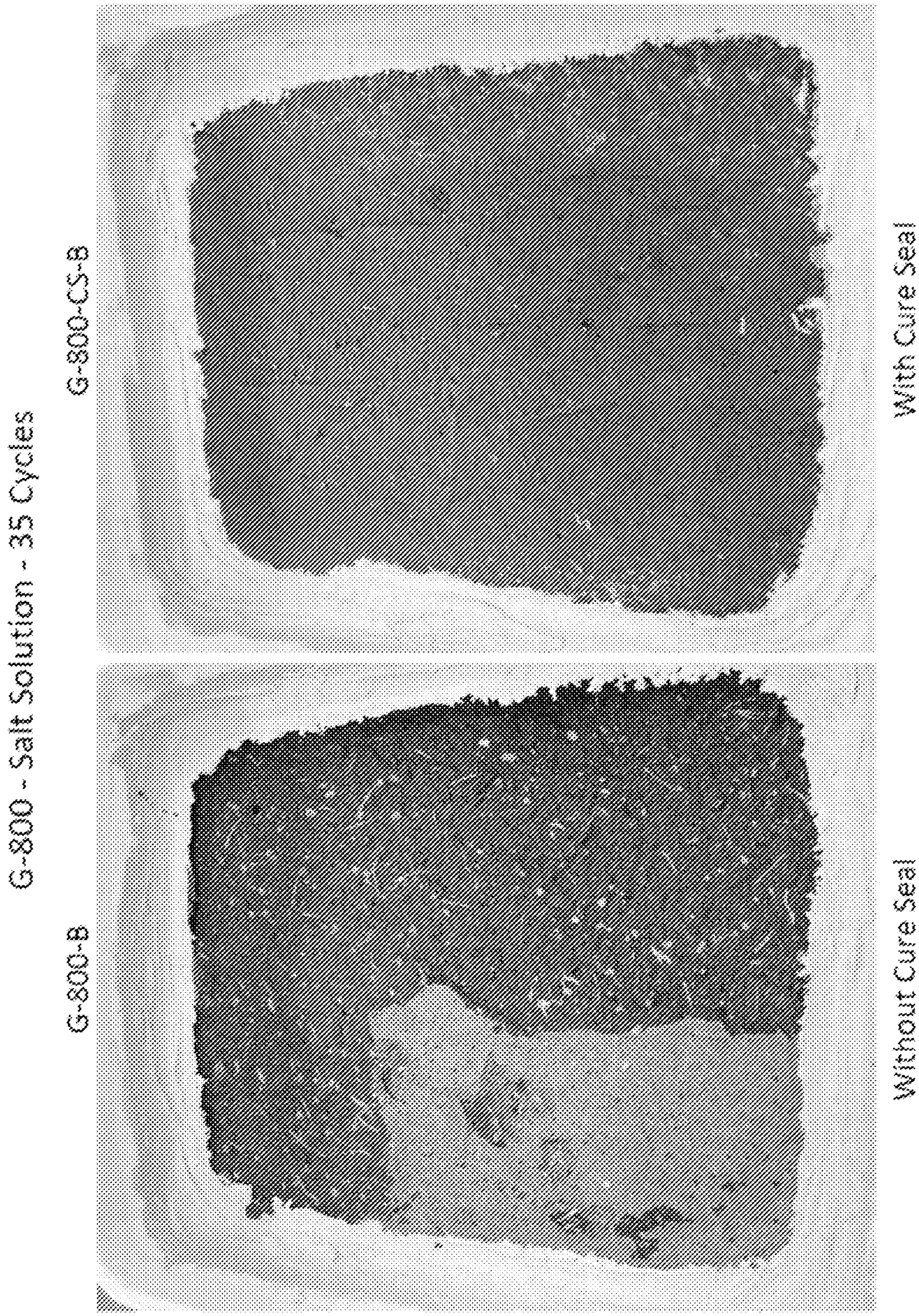
FIG. 1H depicts visual surface deterioration observations taken after 35 freeze-thaw cycles, for compositions including 800 lb/CY cement and including and not including a cure sealer, when exposed to a salt solution.

The present disclosure provides compositions and methods for filling voids, e.g., trenches, with a flowable fill composition that is accelerated by dry calcium chloride.

Generally, one must consider several factors when determining an appropriate composition for filling a void. These factors include the flowability or spread of the composition, the setting time of the composition, the final compressive strength of the composition, the consolidation of the composition, the durability of the composition, and the segregation of the composition. In some climates, the freeze-thaw resistance of the final composition must be considered.

Disclosed herein are compositions that use dry calcium chloride, e.g., pelleted calcium chloride, as an accelerant. The disclosed compositions accelerate the time that a mixture of Portland cement, sand and water will solidify from a liquid state to solid, by the addition of dry calcium chloride. The addition of the dry calcium chloride allows the mixtures to solidify quicker than typical chemical admixtures designed for accelerating Portland cement concrete can achieve, including those containing commercially available calcium chloride in a liquid form. In some examples, these compositions may be useful in backfilling micro-trenches for installation of telecommunication cables where traditional slow setting mixtures are not desired, for example, because of a need to re-open streets to traffic quickly. The disclosed compositions provide an alternate means of producing a rapid-setting backfill material, even when Class C fly ash is not readily available.

In reinforced concrete applications, calcium chloride is not a permitted ingredient in many locations because it may lead to corrosion of the steel reinforcing bars, however, dry calcium chloride in concrete applications without steel reinforcing bars (for example, trench-filling) should have little to no effect an outer sheathing material of a cable (such outer sheathes for direct burial cables are typically made of polyethylene materials). According to the Polyethylene Chemical Resistance Chart, by the CDF Corporation, polyethylene was rated "A" against calcium chloride in saturated conditions. A rating of "A" means "Resistant, no indication that serviceability would be impaired."

In examples, strength development in compositions is directly related to the amount of cementitious material, aggregate, water content, and accelerant, e.g., dry calcium chloride. In an embodiment, the primary cementitious material is Portland cement. In an embodiment, the aggregate may be fine aggregate, coarse aggregate, micro aggregate, sand, recycled spoils, or some combination thereof. Water content of the composition also influences strength development as the addition of water controls flowability or slump. In an embodiment, the composition will include dry calcium chloride.

The use of dry calcium chloride, in contrast to primarily using liquid calcium chloride, has unexpected benefits. These unexpected benefits include, but are not limited to: decreased set times and increased early compressive strength of compositions, in part, because the dry calcium chloride capitalizes on the heat generated by the exothermic dissolution of the dry calcium chloride, which further contributes to the acceleration of the set time; and reduced volumes of calcium chloride added to the composition versus typical liquid calcium chloride accelerants, which results in a shipping and truck mixing advantage because of volume savings. In addition to these unexpected benefits, utilization of dry calcium chloride instead of a liquid calcium chloride may improve the practicality of utilizing calcium chloride in compositions. For example, use of a liquid calcium chloride may have an effect on the water content of the composition, and so may require other changes to the composition component amounts. The use of liquid calcium chloride may also require a comparatively large volume of the liquid calcium chloride, which would require impractically large admixture tanks on volumetric mixing trucks.

Additionally, the present disclosure describes compositions of a fast-setting backfill system with improved freeze-thaw durability in cold climates. The compositions utilize higher cement contents and conventional air-entrainment to create a backfill material with freeze-thaw resistance. In some examples, these compositions may be utilized where the trench backfill is brought up to the pavement surface. The system improves durability in service by application (for example, immediately after backfilling the trench to grade) of a cure-sealing compound (for example, an acrylic cure-sealing compound) to the surface of the backfill material. In some examples, these compositions may be useful in backfilling micro-trenches for installation of telecommunication cables, where traditional slow setting mixtures are not desired, and where the climate necessitates resistance to freeze-thaw heaving of the ground surrounding the trench.

In embodiments, application of a cure sealer may improve durability of the disclosed compositions. Application of a cure sealer protects the composition (i.e. backfill) material at the pavement surface from deicers that may be applied during the first and most critical year. Secondly, it maintains proper moisture levels in the mixture, to prompt full cement hydration and maximum strength gain. These higher strengths also provide durability and higher abrasion resistance.

In an embodiment, freeze-thaw testing may be conducted in accordance with ASTM C672, which leads to measurements of mass lost due to freeze-thaw effects. For example, freezing and thawing may induce cracks or fissures in composition samples, which may cause pieces of the cured composition to break, flake, or shear off of the sample. In some examples, composition samples may be treated with a cure-sealing compound prior to freeze-thaw testing. Cure-sealing compounds may be obtained from commercial sources, including Dayton Superior Cure & Seal 1315 EF, available from Dayton Superior Corporation, 1125 Byers Road; Miamisburg, OH 45342.

In some embodiments of the present disclosure, the flowability or spread may be determined using ASTM D6103, e.g., utilizing a moistened 3-inch diameter by 6-inch high open-ended cylinder filled with a composition. Along with strength development and flowability, setting time is an additional factor to consider when determining a suitable composition. The faster the composition sets and gains strength, the sooner the project can be completed.

An embodiment includes flowable fill compositions comprising between 45% and 70% sand by weight of the composition; between 10% and 35% cement by weight of the composition; between 5% and 20% water by weight of the composition; between 0.01% and 0.5% fibers by weight of the composition; and between 0.1% and 3% dry calcium chloride by weight of the composition. The compositions have a compressive strength of between 1,500 psi and 4,000 psi after 7 days, and a compressive strength of between 2,500 psi and 5,000 psi after 28 days.

In an embodiment of the present disclosure, the aggregate is standard concrete grade sand, for example, sand from Austin Aggregates, 881 Hergotz Ln, Austin, TX 78742, or Vulcan Materials Company, 1200 Urban Center Drive, Birmingham, AL 35242, or Webberville Sand & Gravel, 18601 FM 969, Manor, Texas 78653. The aggregate may, however, be a combination of one or more of the following: sand, fine aggregate (concrete sand), coarse aggregate (rock or gravel), recycled trench spoils, commercial recycled materials, or micro aggregate.

Fine aggregate is known in the industry as concrete sand and is defined by ASTM C33 specifications. Coarse aggregate is known in the industry as rock or gravel and is also defined by ASTM C33 specifications. Recycled trench spoils refers to the material excavated to create a trench, e.g., the gravel, sand, and/or ground asphalt pavement excavated from the ground to create a trench in order to place cables or wires into the trench prior to backfilling the trench with compositions of the present disclosure. Micro aggregate refers ultra-fine, inert or chemically active, particles that are predominantly sized less than a #200 sieve. One example of a micro aggregate is BHF, which are dust-sized micro aggregates that are typically, but not necessarily, captured in bag houses to prevent air pollution, and could be inert minerals, lime, cement kiln dust, or other chemical or mineral materials. Thus, BHF includes micro aggregates recovered via one or more of fabric filters (baghouses), and mechanical collectors (e.g., cyclones).

In an embodiment of the present disclosure, the composition has between about 40% and about 90% aggregate by weight of the composition, between about between about 45% and about 70% aggregate, between about between about 45% and about 85% aggregate, between about 50% and about 80% aggregate, between about 50% and about 70% aggregate, between about 50% and about 65% aggregate, or between about 55% and 65% aggregate. In some embodiments, the aggregate is sand.

In certain embodiments, a composition of the present disclosure will have a measurable amount of, but less than about 95% aggregate by weight of the composition, less than about 90% aggregate, less than about 85% aggregate, less than about 80% aggregate, less than about 75% aggregate, less than about 70% aggregate, less than about 65% aggregate, less than about 60% aggregate, less than about 55% aggregate, less than about 50% aggregate, or less than about 45% aggregate. Some embodiments will have no or insubstantial aggregate by weight of the composition. In still other embodiments, a composition of the present disclosure will have greater than about 40% aggregate by weight of the composition, greater than about 45% aggregate, greater than about 50% aggregate, greater than about 55% aggregate, greater than about 60% aggregate, greater than about 65% aggregate, greater than about 70% aggregate, greater than about 75% aggregate, or greater than about 80% aggregate. In some embodiments, the aggregate is sand.

In certain embodiments, the aggregate will consist entirely of sand, fine aggregate, coarse aggregate, recycled trench spoils, or micro aggregates like BHFs. In other embodiments, the aggregate may consist of one or more combinations of sand, fine aggregate, coarse aggregate, recycled trench spoils, or BHF in order to reach the desired specification for the composition.

In an embodiment of the present disclosure, the cementitious material is standard Portland cement, which is well known in the industry. The Portland cement of the present disclosure may be Type I, Type II, Type III, Type IV, Type V, Type IL, or some combination thereof. In an embodiment, the Portland cement is Type I-II The Portland cement of the present disclosure can be obtained from a variety of sources based on economics, location, chemical properties, or additional criteria. For example, Portland cement can be obtained from CEMEX, 5134 Ute Rd, Longmont, Colorado 80503. In an example, the Portland Cement is Type IL, which may include clinker inter-ground with between 5% and 15% limestone.

In some embodiments of the present disclosure the cementitious material may include fly ash, e.g., Class C fly ash.

In an embodiment of the present disclosure, a composition has between about 5% and about 40% cement by weight of the composition, between about 10% and about 35% cement, between about 10% and about 30% cement, between about 15% and about 35% cement, or between about 15% and about 30% cement, between about 10% and about 20% cement.

In some embodiments of the present disclosure, a composition has a measurable amount of, but less than about 90% cement by weight of the composition, less than about 45% cement, less than about 40% cement, less than about 35% cement, less than about 30% cement, less than about 25% cement, less than about 20% cement, less than about 15% cement, or less than about 10% cement. In additional embodiments of the present disclosure, the composition has greater than about 3% cement by weight of the composition, greater than about 4% cement, greater than about 6% cement, greater than about 10% cement, greater than about 15% cement, greater than about 20% cement, greater than about 25% cement, greater than about 30% cement, or a greater than about 35% cement.

Some compositions of the present disclosure will include an accelerant. In an embodiment of the presently disclosed composition, the accelerant is primarily or exclusively dry calcium chloride rather than liquid calcium chloride. Dry calcium chloride means calcium chloride in powder, pellet, or other dry form. The dry calcium chloride may be purchased from well-known commercial sources, e.g., Anhydrous Calcium Chloride 94-97% Mini-Pellets from Occidental Chemical Corporation, 14555 Dallas Parkway, Suite 400, Dallas, Texas 75254-4300 or Hi 94 Calcium Chloride Prills from Hill Brothers Chemical Company, 3000 E. Birch St, Suite 108, Brea, California 92821.

In an embodiment of the present disclosure, a composition has between about 0.10% and about 15.0% accelerant by weight of the composition, between about 0.10% and about 3.0%, between about 0.30% and about 6.0%, between about 0.50% and about 3.0%, between about 0.50% and about 2.0%, between about 1.0% and about 2.0%, between about 0.4% and about 1.0%.

In additional embodiments, a composition has greater than about 0.1% accelerant by weight of the composition, greater than about 0.2% accelerant, greater than about 0.25% accelerant, greater than about 1.0% accelerant, greater than about 2.0% accelerant, or greater than about 3.0% accelerant. In other embodiments, a composition has a measurable amount, but less than about 15% accelerant by weight of the composition, less than about 10.0% accelerant, less than about 5.0% accelerant, less than about 3.0% accelerant, less than about 2.0% accelerant, less than about 1.0% accelerant, or less than about 0.5% accelerant.

In an embodiment of the presently disclosed composition, the water is standard city potable water. In another embodiment, the water used in the composition is substantially purified of additional minerals or other impurities. In still another embodiment of the present disclosure, the water is non-potable water. In additional embodiments, the water is selected based on its natural impurities, e.g., specific mineral content like calcium, magnesium, iron, or similar water minerals.

The water content of the presently disclosed composition may vary depending on desired flowability, setting time, and final compressive strength. In an embodiment, a composition has a water content of between about 5% and about 30% by weight of the composition, between about 5% and about 25%, between about 5% and about 20%, between about 8% and about 15%, between about 10% and about 15%, between about 11% and about 14%.

In additional embodiments, a composition has no additional water added to the composition. In an embodiment, a composition has greater than about 5% water by weight of the composition, greater than about 8% water, greater than about 10% water, greater than about 15% water, greater than about 20% water, or greater than about 25% water. In other embodiments, a composition has less than about 40% water by weight of the composition, less than about 35% water, less than about 30% water, less than about 25% water, less than about 20% water, less than about 15% water, or less than about 10% water. Any water included with additional ingredients, e.g., aqueous water reducers, foaming agents, etc. under the circumstances encountered in the field by the inventors has been negligible in comparison to the primary batch water and therefore has not been included in the above calculations. Depending on the actual water content of the additional ingredients used it may be necessary to consider the additional water in the final water concentrations.

In some embodiments, the compositions may include a water reducer, e.g., a standard water reducer or a High Range Water Reducer for maintaining fluid properties at lower total water contents. A High Range Water Reducer is available as Sika ViscoCrete 4100 and Sika ViscoCrete 6100, Sika Corporation, 201 Polito Avenue, Lyndhurst, NJ 07071. Another example of a water reducer is Chryso Fluid Premia 198 from Chryso Inc., 10600 Hwy 62, Unit 7, Charlestown, IN 47111. In some examples, a composition including a water reducer may require lesser cement and/or water contents than an otherwise identical composition that does not include a water reducer, while achieving similar compressive strengths and improved setting times.

In some embodiments, a composition has a dosage rate of three ounces (3 oz) of a water reducer per composition weight (cwt). In some embodiments, a composition has a dosage rate of six ounces (6 oz) of a water reducer per composition weight (cwt). In some embodiments, a composition has between three ounces (3 oz) per composition weight (cwt) and six ounces (6 oz) of a water reducer per composition weight (cwt). In some embodiments, a composition has less than three ounces (3 oz) of a water reducer per composition weight (cwt). In some embodiments, a composition has more than six ounces (6 oz) of a water reducer per composition weight (cwt). The dosage rate of the water reducer may vary in other embodiments. In some embodiments, a composition has between 0.02% by weight and 0.2% by weight of a water reducer. In some embodiments, a composition has between 0.03% by weight and 0.15% by weight of a water reducer. In some embodiments, a composition has between 0.05% by weight and 0.09% by weight of a water reducer.

In some embodiments, the compositions of the present disclosure may further comprise a polymer, e.g., hydroxypropyl methylcellulose, based on the desired properties of the compositions. Notably, the addition of polymer captures air within the composition, which has beneficial properties for reducing freeze thaw heave. The addition of a polymer or multiple polymers helps reduce water in a composition (or traditional water reducers may also be used in conjunction or independent of polymers); helps achieve greater air entrainment of a composition; and helps improve suspension of sand particles (or aggregates) in the mix. All of which result in a more fluid, non-segregating, minimal bleed water mix, while using less water.

In an embodiment, the concentration of the polymer is between about 0.01% and about 3.0% by weight of the composition, between about 0.01% and about 2.0% by weight of the composition, between about 0.03% and about 0.1% by weight of the composition, between about 0.05% and about 1.5% by weight of the composition, or between about 0.05% and about 0.20% by weight of the composition. In certain embodiments, the concentration of the polymer is greater than about 0.01% by weight of the composition, is greater than about 0.03%, is greater than about 0.05%, is greater than about 0.10%, or is greater than about 0.15%. In certain embodiments, the concentration of the polymer is less than about 3.0%, is less than about 2.0%, is less than about 1.5%, is less than about 0.5%, or is less than about 0.1%.

In some embodiments, the compositions of the present disclosure may further comprise fibers, e.g., FiberCast polypropylene fibers of either 0.5 inches or 0.25 inches in length. FiberCast fibers are available from Fibermesh®, 4019 Industry Drive, Chattanooga, TN 37416, e.g., Fibercast® 500 Micro-Synthetic Fiber. Fibers may also be purchased from Nippon Electric Glass Co., Ltd, 906 Ima, Notogawa, Kanzaki, Shiga, Japan, e.g., AR 5000 H-530X.

In an embodiment, the concentration of the fibers is between about 0.01% and about 1.0% by weight of the composition, is between about 0.01% and about 0.5% by weight of the composition, between about 0.05% and about 0.1% by weight of the composition, between about 0.02% and about 1.0% by weight of the composition, or between about 0.03% and about 0.1% by weight of the composition. In certain embodiments, the concentration of the fibers is greater than about 0.01% by weight of the composition, is greater than about 0.02%, is greater than about 0.3%, or is greater than about 0.4%. In certain embodiments, the concentration of the fibers is less than about 0.5% by weight of the composition, is less than about 0.1%, is less than about 0.05%, or is less than about 0.04%.

In some embodiments, the compositions of the present disclosure may further comprise a set retarder. A set retarder is a compound capable of delaying the set time of the composition. In certain embodiments, delaying the set time is necessary to allow a composition to completely fill a void before setting. An example of a set retarder may be Sika Plastiment XR. In certain embodiments, the set retarder is liquid while in other embodiments the set retarder is a powder. An appropriate set retarder will be well known to a person of ordinary skill in the art.

In some examples, although embodiments of the disclosed compositions aim to accelerate mixture setting times, inclusion of a set retarder may advantageously provide a temporary slowing of setting time near the beginning of the setting time of the mixture, to provide better workability and fluidity of the mixture (as well as longer working time), allowing for easier mixing and placement of the mixture. The slowing effects of the set retarder may then wear off and allow the included accelerator to accelerate the overall setting time. In some examples, especially those utilizing water reducers, example compositions may thicken and flash set very quickly, leading to a shortened working time. The inclusion of a set retarder in some embodiments has addressed this issue, as demonstrated by experimental data below.

In an embodiment, the concentration of set retarder is between about 0.01% and about 3% by weight of the composition, between about 0.01% and about 1%, between about 0.05% and about 2.5%, between about 0.1% and about 2%, between about 0.5% and about 1.5%, between about 0.0001% and about 1.0%. In some embodiments, the set retarder is greater than about 0.001% by weight of the composition, is greater than about 0.01% is greater than about 0.05%, is greater than about 0.1%, is greater than about 0.5%, is greater than about 1.0%, is greater than about 1.5%, or is greater than about 2.0%. In certain embodiments, the set retarder is less than about 3.0% by weight of the composition, less than about 2.5%, less than about 2.0%, less than about 1.5%, less than about 1.0%, less than about 0.5%, less than about 0.3%, less than about 0.1%, less than about 0.01%, less than about 0.001%.

The air content of the compositions of the present disclosure will vary depending on the desired properties of the composition. In some embodiments, the presently disclosed compositions can include air entraining agents. The air content may be determined by the following formula using wet densities before and after the addition of air:

$$\text{Air content} = \frac{(\text{Unit Weights}_{no\ air} - \text{Unit Weight}_{air}) \times 100\%}{\text{Unit Weight}_{no\ air}}$$

In other embodiments, the air content can be determined using ASTM C231.

In certain embodiments, the air content is achieved by mixing an air entraining agent, i.e., a dry surfactant or liquid admixture into the cement and aggregate prior to the addition of water. In these embodiments, the air content may by uniformly distributed by mixing directly in a truck or by mixing in a commonly used agitation/mixing device. The mixing process can occur prior to addition of water, after addition of water or simultaneously with the addition of water.

In another embodiment, the air content is achieved by addition of an air entraining agent after mixture of the dry ingredients with water but prior to applying the composition to the space that requires filling.

In specific embodiments, the air content may be achieved by adding an air entraining admixture, e.g., Sika® AEA-14 (Air Entraining Admixture) available from Sika Corporation located at 201 Polito Avenue, Lyndhurst New Jersey, 07071. The choice of an air entraining agent is within one of skill in the art and may be dictated by cost, environmental concerns, or the need to meet the requirements of local or national agencies.

The amount of air entraining agent necessary for a given composition will vary with the desired air content. In some embodiments, the final air content of the composition will be between about 0.1% and about 30%, between about 1.0% and about 25%, between about 5.0% and about 22%, between about 5.0% and about 20%, between about 5% and about 15%. In some embodiments, the composition does not contain any additional air content, i.e., the composition is not purposefully air entrained.

In some embodiments, the final air content will be greater than 1.0%, greater than 3.0%, greater than 5.0%, greater than 10.0%, greater than 15.0%, greater than 20.0%. In other embodiments, the final air content of the composition will be less than 15%, less than 13%, less than 10%, less than 8%, less than 6%, less than 4%, less than 2%, less than 1%, less than 0.1%, less than 0.01%.

In some embodiment, the amount of air entraining agent is between about 0.01% and about 1.0% by weight of the composition, between about 0.01% and about 0.5%, between about 0.04% and about 0.2%, between about 0.05% and about 0.3%, between about 0.08% and about 0.2%. In some embodiments, the amount of air entraining agent is greater than 0.01% by weight of the composition, greater than 0.04%, greater than 0.05%, greater than 0.08%, greater than 0.1%, or great than 0.2%. In some embodiments, the air entraining agent is less than about 0.5% by weight of the composition, less than about 0.2%, less than about 0.1%, or less than about 0.05%.

Compositions of the present disclosure will have a range of compressive strengths at various times after the addition of a composition to a void or space that requires filling. In certain embodiments, the compressive strength is measured at 2 hours, 4 hours, 1 day, 7 days, and/or 28 days where the 28-day measurement is considered the final compressive strength. In other embodiments, the compressive strength is measured more often at smaller intervals. In some embodiments, the compressive strength may be measured at 90 days. In an embodiment, the bearing capacity or penetration resistance of a composition is measured at 1 hour, 1.5 hours, 2 hours, 2.5 hours, 3 hours, 3.5 hours, 4 hours, 5 hours, 6 hours, 7 hours, and 8 hours using ASTM WK 27337 or C403.

In an embodiment, the compressive strength of a composition of the present disclosure at 2 hours as measured by ASTM D4832 will have no measurable psi. In certain embodiments it will be between about 20 psi and about 400 psi, between about 40 psi and about 300 psi, between about 60 psi and about 300 psi, between 20 psi and 300 psi, or between 100 psi and 300 psi. In additional embodiments, the compressive strength of the composition at 2 hours will be greater than about 20 psi, will be greater than about 50 psi, will be greater than about 100 psi, will be greater than about 150 psi, will be greater than 200 psi, or will be greater than 250 psi. In certain embodiments, the compressive strength of the composition at 2 hours will be less than about 500 psi, will be less than about 400 psi, will be less than about 300 psi, will be less than about 200 psi, will be less than about 100 psi, will be less than about 50 psi, or will be less than about 30 psi.

In an embodiment, the compressive strength of a composition of the present disclosure at 4 hours as measured by ASTM D4832 will have no measurable psi. In certain embodiments it will be between about 20 psi and about 1500 psi, between about 50 psi and about 1200 psi, between about 20 psi and about 300 psi, between 300 psi and 1200 psi, or between 400 psi and 900 psi. In additional embodiments, the compressive strength of the composition at 4 hours will be greater than about 20 psi, will be greater than about 50 psi, will be greater than about 200 psi, will be greater than about 300 psi, will be greater than 400 psi, will be greater than 500 psi, will be greater than 700 psi, will be greater than 900 psi. In certain embodiments, the compressive strength of the composition at 4 hours will be less than about 1500 psi, will be less than about 1200 psi, will be less than about 1100 psi, will be less than about 1000 psi, will be less than about 900 psi, will be less than about 800 psi, will be less than about 700 psi, less than 500 psi, less than 300 psi, less than 200 psi, less than 100 psi.

In an embodiment, the compressive strength of a composition of the present disclosure at 1 day will be between about 40 psi and about 3500 psi, between about 40 psi and about 1000 psi, between about 100 psi and about 700 psi, between about 600 psi and about 3000 psi, or between about 1000 psi and about 2700 psi. In additional embodiments, the compressive strength of the composition at 1 day will be greater than about 10 psi, will be greater than about 50 psi, will be greater than about 100 psi, will be greater than about 200 psi, will be greater than 350 psi, will be greater than 600 psi, will be greater than 1000 psi, will be greater than 1500 psi, will be greater than 1800 psi, will be greater than 2000 psi, will be greater than 2200 psi, will be greater than 2500 psi, or will be greater than 2500 psi. In certain embodiments, the compressive strength of the composition at 1 day will be less than about 4000 psi, will be less than about 3000 psi, will be less than about 2500 psi, will be less than about 2000 psi, will be less than about 1500 psi, will be less than about 1000 psi, or will be less than about 500 psi.

In an embodiment, the compressive strength of a composition of the present disclosure at 7 days will be between about 100 psi and about 6000 psi, between about 100 psi and about 2000 psi, between about 200 psi and about 1500 psi, between about 1000 psi and about 6000 psi, between about 1500 psi about 4000 psi, between about 1500 psi and about 5000 psi, between about 2000 and about 4000 psi, or between about 3000 psi and 5000 psi. In additional embodiments, the compressive strength of the composition at 7 days will be greater than about 200 psi, will be greater than about 400 psi, will be greater than about 700 psi, will be greater than about 900 psi, will be greater than 1100 psi, will be greater than 1500 psi, will be greater than about 2000 psi, will be greater than about 2500, will be greater than about 3000 psi, will be greater than about 3500 psi, or will be greater than about 4000 psi. In certain embodiments, the compressive strength of the composition at 7 days will be less than about 5000 psi, will be less than about 4000 psi, will be less than about 3500 psi, will be less than about 3000 psi, will be less than about 2500 psi, will be less than about 2000 psi, or will be less than about 1500 psi.

In an embodiment, the compressive strength of a composition of the present disclosure at 28 days will be between about 100 psi and about 8000 psi, between about 100 psi and about 2500 psi, between about 100 psi and about 3000 psi, between about 200 psi and about 2000 psi, between about 200 psi and about 2500 psi, between about 2000 psi and about 8000 psi, between about 2000 and about 7000 psi, between about 2000 psi and about 6000 psi, between about 2500 psi and about 5000 psi, between about 3000 and about 6000 psi, or between about 4000 and about 6000 psi. In additional embodiments, the compressive strength of the composition at 28 days will be greater than about 100 psi, will be greater than about 500 psi, will be greater than about 1000 psi, will be greater than about 1500 psi, will be greater than about 2000 psi, will be greater than about 2500 psi, will be greater than about 3000 psi, will be greater than about 3500 psi, will be greater than about 4000 psi, will be greater than about 4500 psi, or will be greater than about 5000 psi. In certain embodiments, the compressive strength of the composition at 28 days will be less than about 5500 psi, less than about 5000 psi, less than about 4500 psi, less than about 4000 psi, less than about 3500 psi, less than about 3000 psi, less than about 2500 psi, less than about 2000 psi, less than about 1500 psi, or less than about 100 psi.

In some embodiments, the compositions of the present disclosure may include (i.e. have applied to them) a cure-sealing compound. In certain examples, the composition may include one coat of a cure sealing compound. In certain examples, the composition may include two coats of a cure sealing compound. In certain examples, the composition may include between one and three coats of a cure sealing compound. In certain examples, the composition may include two or more coats of a cure sealing compound. In certain examples, the total coverage rate of the cure sealing compound may be between approximately 100 square feet per gallon and 200 square feet per gallon. In certain examples, the total coverage rate of the cure sealing compound may be between approximately 200 square feet per gallon and 400 square feet per gallon. In certain examples, the total coverage rate of the cure sealing compound may be between approximately 400 square feet per gallon and 600 square feet per gallon. In certain examples, the total coverage rate of the cure sealing compound may be between approximately 200 square feet per gallon and 600 square feet per gallon. In certain examples, the total coverage rate of the cure sealing compound may be approximately 200 square feet per gallon. In certain examples, the total coverage rate of the cure sealing compound may be approximately 400 square feet per gallon. In certain examples, the total coverage rate of the cure sealing compound may be approximately 600 square feet per gallon.

In certain embodiments of the present disclosure, a composition does not include one or more of the following: does not include a water reducer, does not include a set retarder, does not include polymer, does not include sand, does not include BHF, does not include fine aggregate, does not include coarse aggregate, does not include recycled spoils, does not include air entraining agent, or does not include fibers. In certain embodiments of the present disclosure, a composition does not include a cure-sealing compound.

In certain embodiments of the present disclosure, the disclosed compositions may be suited to on-site production in traditional concrete volumetric mixing trucks, because the effects of the dry calcium chloride are immediate, and may be difficult to control for a normal delivery to the project from a stationary offsite concrete plant. In some examples, the dry calcium chloride may be premixed with the Portland cement. In some examples, the dry calcium chloride may be added separately to the mixture (for example, through a dry-powder dispensing bin on a volumetric truck).

The present disclosure also provides for a method of filing a void, e.g., backfilling a trench, with a disclosed composition. In an example, a method includes excavating a trench or void, mixing a composition of the present disclosure that includes dry calcium carbonate, and filling the trench or void with the composition. In an example, a method includes excavating a trench or void, mixing a composition of the present disclosure that includes dry calcium carbonate, filling the trench or void with the composition, and applying a cure-sealing compound to the surface of the filled material. In an example, a method of filling a void with a composition comprising recycled trench spoils or aggregate (for example, including sand) from additional sources. For example, a method includes excavating a trench or void, maintaining some portion of the excavated trench spoils for addition to a composition, mixing a composition of the present disclosure that includes some portion of the excavated trench spoils, and filling the trench or void with the composition that includes the recycled trench spoils.

EXAMPLES

Example 1

Eighteen embodiments of the compositions described above were prepared for testing and evaluation. The components for each of the eighteen compositions is set forth below based on pounds per cubic yard (lb/cy) in Table 1A and percent (%) of the composition by weight in Table 1B.

For example, referring to MIX ID G-1200-CC-3 in Table 1A, it comprises 1200 lbs of Portland cement per cubic yard, 36 lbs of Prill per cubic yard (Prill is a dry calcium chloride in pellet form as Anhydrous Calcium Chloride 94-97% Mini-Pellets from Occidental Chemical Corporation, 14555 Dallas Parkway, Suite 400, Dallas, Texas 75254-4300 or Hi 94 Calcium Chloride Prills from Hill Brothers Chemical Company, 3000 E. Birch St, Suite 108, Brea, California 92821), 1925 lbs of sand per cubic yard, 2.5 lbs of fibers per cubic yard, 2 lbs of polymer per cubic yard, 547 lbs of water per cubic yard, no water reducer was added (WR), no set retarder was added (Ret.), and no air entraining agent is added (AEA). The cement in each composition is Portland cement from CEMEX. The water for each composition is standard tap water. The sand for each composition is from Austin Aggregates. The polymer for each composition, if any, is hydroxypropyl methylcellulose. The fibers for each composition, if any, are polypropylene fibers (FiberCast) from Fibermesh. The air entraining agent (AEA), if any, is Chryso Air 260. The set retarder, if any, is Sika® Plastiment XR. The water reducer, if any, is Sika® ViscoCrete®. Mix ID's and descriptions of the components are consistent throughout the Examples unless otherwise noted.

TABLE 1A

Components of Eighteen Embodiments of the Compositions by Pounds per Cubic Yard.

| | Composition (lb/CY) | | | | | | WR | Ret. | AEA |
|---|---|---|---|---|---|---|---|---|---|
| Mix ID | Cement | Prill | Sand | Fibers | Polymer | Water | (lb/CY) | (lb/CY) | (lb/CY) |
| G-1200-CC-3 | 1200 | 36 | 1925 | 2.5 | 2 | 547 | 0.0 | 0.0 | 0.0 |
| G-1000-CC-3 | 1000 | 30 | 2220 | 2.5 | 2 | 501 | 0.0 | 0.0 | 0.0 |
| G-1000-HSCC | 1000 | 30 | 2440 | 2.5 | 1 | 417 | 2.1 | 2.1 | 4.2 |
| G-900-HSCC | 900 | 27 | 2560 | 2.5 | 1 | 409 | 1.9 | 1.9 | 3.8 |
| G-9C-HSCC | 900 | 27 | 2540 | 2.5 | 0 | 417 | 1.9 | 1.9 | 3.8 |
| G-9C-HSCC-2 | 900 | 27 | 2540 | 2.5 | 0 | 417 | 1.9 | 1.9 | 0.2 |
| G-800-FP | 800 | 0 | 2400 | 2.5 | 2 | 509 | 0.0 | 0.0 | 0.0 |
| G-800-CC-5 | 800 | 40 | 2350 | 2.5 | 2 | 509 | 0.0 | 0.0 | 0.0 |
| G-800-FPHS | 800 | 0 | 2800 | 2.5 | 0.25 | 350 | 3.4 | 0.0 | 0.0 |
| G-600-FP | 600 | 0 | 2540 | 2.5 | 2 | 501 | 0.0 | 0.0 | 0.0 |
| G-600-CC-2 | 600 | 12 | 2560 | 2.5 | 2 | 501 | 0.0 | 0.0 | 0.0 |
| G-600-CC-5 | 600 | 30 | 2550 | 2.5 | 2 | 501 | 0.0 | 0.0 | 0.0 |
| G-600-CC-8 | 600 | 48 | 2540 | 2.5 | 2 | 501 | 0.0 | 0.0 | 0.0 |
| G-600-CC-10 | 600 | 60 | 2530 | 2.5 | 2 | 501 | 0.0 | 0.0 | 0.0 |
| G-500-CC-5 | 500 | 25 | 2650 | 2.5 | 2 | 501 | 0.0 | 0.0 | 0.0 |
| G-500-CC-10 | 500 | 50 | 2640 | 2.5 | 2 | 489 | 0.0 | 0.0 | 0.0 |
| G-400-CC-5 | 400 | 20 | 2710 | 2.5 | 2 | 509 | 0.0 | 0.0 | 0.0 |
| G-400-CC-10 | 400 | 40 | 2690 | 2.5 | 2 | 509 | 0.0 | 0.0 | 0.0 |

TABLE 1B

Components of the compositions of Table 1A by Weight.

| | Composition (%) by weight | | | | | | | | |
|---|---|---|---|---|---|---|---|---|---|
| Mix ID | Cement | Prill | Sand | Fibers | Polymer | Water | WR | Ret. | AEA |
| G-1200-CC-3 | 32.32% | 0.97% | 51.85% | 0.07% | 0.05% | 14.73% | 0.00% | 0.00% | 0.00% |
| G-1000-CC-3 | 26.63% | 0.80% | 59.11% | 0.07% | 0.05% | 13.34% | 0.00% | 0.00% | 0.00% |
| G-1000-HSCC | 25.68% | 0.77% | 62.65% | 0.06% | 0.03% | 10.71% | 0.05% | 0.05% | 0.11% |
| G-900-HSCC | 23.06% | 0.69% | 65.59% | 0.06% | 0.03% | 10.48% | 0.05% | 0.05% | 0.10% |
| G-9C-HSCC | 23.13% | 0.69% | 65.29% | 0.06% | 0.00% | 10.72% | 0.05% | 0.05% | 0.10% |
| G-9C-HSCC-2 | 23.13% | 0.69% | 65.29% | 0.06% | 0.00% | 10.72% | 0.05% | 0.05% | 0.00% |
| G-800-FP | 21.54% | 0.00% | 64.63% | 0.07% | 0.05% | 13.71% | 0.00% | 0.00% | 0.00% |
| G-800-CC-5 | 21.60% | 1.08% | 63.45% | 0.07% | 0.05% | 13.74% | 0.00% | 0.00% | 0.00% |
| G-800-FPHS | 20.22% | 0.00% | 70.78% | 0.06% | 0.01% | 8.85% | 0.09% | 0.00% | 0.00% |
| G-600-FP | 16.46% | 0.00% | 69.67% | 0.07% | 0.05% | 13.74% | 0.00% | 0.00% | 0.00% |
| G-600-CC-2 | 16.32% | 0.33% | 69.61% | 0.07% | 0.05% | 13.62% | 0.00% | 0.00% | 0.00% |
| G-600-CC-5 | 16.28% | 0.81% | 69.19% | 0.07% | 0.05% | 13.59% | 0.00% | 0.00% | 0.00% |
| G-600-CC-8 | 16.24% | 1.30% | 68.77% | 0.07% | 0.05% | 13.56% | 0.00% | 0.00% | 0.00% |
| G-600-CC-10 | 16.24% | 1.62% | 68.46% | 0.07% | 0.05% | 13.56% | 0.00% | 0.00% | 0.00% |
| G-500-CC-5 | 13.59% | 0.68% | 72.00% | 0.07% | 0.05% | 13.61% | 0.00% | 0.00% | 0.00% |
| G-500-CC-10 | 13.57% | 1.36% | 71.67% | 0.07% | 0.05% | 13.28% | 0.00% | 0.00% | 0.00% |
| G-400-CC-5 | 10.98% | 0.55% | 74.38% | 0.07% | 0.05% | 13.97% | 0.00% | 0.00% | 0.00% |
| G-400-CC-10 | 10.98% | 1.10% | 73.83% | 0.07% | 0.05% | 13.97% | 0.00% | 0.00% | 0.00% |

Example 2

The water to cement (only) ratio (W/C), the water to cementitious materials ratio, which includes cement and dry calcium chloride (W/Cm), the unit weight also known as density (UW (pcf)), the percent air content (Air (%), and the flowability or spread (inches) was calculated for each of the eighteen compositions as disclosed in Table 2. Table 2 also discloses which version of Sika® ViscoCrete® water reducer was used: 6100 or 4100. Ratios, unit weights, spread, and percent air content are consistent throughout the Examples unless otherwise noted.

TABLE 2

Characteristics of the Eighteen Compositions of Example 1.

| Mix ID | W/C | W/Cm | UW (pcf) | Air (%) | Spread (in) | WR |
|---|---|---|---|---|---|---|
| G-1200-CC-3 | 0.46 | 0.44 | 124.5 | 10.4 | 7.0 | — |
| G-1000-CC-3 | 0.50 | 0.49 | 123.3 | 12.8 | 7.5 | — |
| G-1000-HSCC | 0.42 | 0.40 | 121.8 | 18.3 | 8.0 | 6100 |
| G-900-HSCC | 0.45 | 0.44 | 121.6 | 18.8 | 8.0 | 6100 |
| G-9C-HSCC | 0.46 | 0.45 | 122.2 | 17.9 | 8.0 | 6100 |
| G-9C-HSCC-2 | 0.46 | 0.45 | 126.1 | 13.5 | 8.0 | 6100 |
| G-800-FP | 0.64 | 0.64 | 122.9 | 12.1 | 9.0 | — |
| G-800-CC-5 | 0.64 | 0.61 | 119.5 | 14.9 | 7.5 | — |
| G-800-FPHS | 0.44 | 0.44 | 122 | 16.0 | 8.0 | 4100 |
| G-600-FP | 0.84 | 0.84 | 121 | 10.0 | 9.0 | — |
| G-600-CC-2 | 0.84 | 0.82 | 123.9 | 10.4 | 8.0 | — |
| G-600-CC-5 | 0.84 | 0.80 | 123.8 | 10.3 | 8.0 | — |
| G-600-CC-8 | 0.84 | 0.77 | 125.1 | 9.1 | 8.0 | — |
| G-600-CC-10 | 0.84 | 0.76 | 123.8 | 10.1 | 7.5 | — |
| G-500-CC-5 | 1.00 | 0.95 | 119.1 | 14.2 | 8.0 | — |
| G-500-CC-10 | 0.98 | 0.89 | 115.8 | 18.0 | 7.5 | — |
| G-400-CC-5 | 1.27 | 1.21 | 111.9 | 20.6 | 7.5 | — |
| G-400-CC-10 | 1.27 | 1.16 | 113.4 | 18.9 | 8.0 | — |

Example 3

The above compositions were evaluated for compressive strength using ASTM D4832 (psi) at 2 hours, 4 hours, 1 day, 7 days, and 28 days following mixture and application as disclosed in Table 3. Descriptions of compressive strength evaluations are consistent throughout the Examples unless otherwise noted.

TABLE 3

Compressive Strength Measurements for the Eighteen Compositions of Example 1.

| | Compressive Strength (psi) | | | | |
|---|---|---|---|---|---|
| Mix ID | 2-hr | 4-hr | 1-day | 7-day | 28-day |
| G-1200-CC-3 | 200 | 870 | 2730 | 4785 | 6050 |
| G-1000-CC-3 | 90 | 630 | 2400 | 3975 | 4820 |
| G-1000-HSCC | 110 | 630 | 2460 | 4100 | 5240 |
| G-900-HSCC | 100 | 475 | 1860 | 3090 | 4000 |
| G-9C-HSCC | 120 | 475 | 1865 | 3160 | 3960 |
| G-9C-HSCC-2 | 140 | 780 | 2740 | 4575 | 5880 |
| G-800-FP | 0 | 0 | 822 | 1974 | 2745 |
| G-800-CC-5 | 125 | 290 | 1115 | 2115 | 2750 |
| G-800-FPHS | 0 | 0 | 2135 | 3490 | 4155 |
| G-600-FP | 0 | 0 | 485 | 1503 | 2072 |
| G-600-CC-2 | 0 | 80 | 790 | 1500 | 2000 |
| G-600-CC-5 | 30 | 180 | 615 | 1295 | 1640 |
| G-600-CC-8 | 65 | 160 | 610 | 1090 | 1535 |
| G-600-CC-10 | 50 | 140 | 440 | 1080 | 1470 |
| G-500-CC-5 | 0 | 75 | 290 | 660 | 800 |
| G-500-CC-10 | 30 | 85 | 230 | 610 | 790 |
| G-400-CC-5 | 0 | 9 | 160 | 300 | 370 |
| G-400-CC-10 | 0 | 20 | 125 | 250 | 320 |

Table 3 shows that the 28-day compressive strengths of the compositions including 800 lb/CY cement demonstrated similar compressive strengths (for example, the compressive strengths of Mix IDs G-800-FP and G-800-CC-5). Table 3 also demonstrates that the 28-day compressive strengths of the compositions including 600 lb/CY cement demonstrated about a 25% strength loss (for example, the compressive strengths of G-600-FP through G-600-CC-10).

Example 4

The above compositions were evaluated for penetration resistance (tsf) using a soil penetrometer at 1 hour, 1.5 hours, 2 hours, 2.5 hours, 3 hours, 3.5 hours, 4 hours, 5 hours, 6 hours, 7 hours, and 8 hours post mix and application as disclosed in Table 4. Measurements were stopped once a penetration of 4.5 tsf was measured and are indicated by "-". In addition, Gel Set time (GS) was measured in minutes for the compositions and the time for each composition to reach 4 psi was also measured in minutes (4 psi). The Gel Set time is when the composition has set to a point that it will no longer flow under its own weight, but may not necessarily have a penetration resistance. For example, MIX ID G-1200-CC-3 reached a Gel State in 30 minutes and 4 psi in 52 minutes following mixture and application. Descriptions of setting time and penetration resistance evaluations are consistent throughout the Examples unless otherwise noted.

TABLE 4

Penetration Measurements for the Eighteen Compositions of Example 1.

| | Seting (min) | | Penetration Resistance (tsf) - Soil Penetrometer | | | | | | | | | | |
|---|---|---|---|---|---|---|---|---|---|---|---|---|---|
| Mix ID | GS | 4 psi | 1 | 1.5 | 2 | 2.5 | 3 | 3.5 | 4 | 5 | 6 | 7 | 8 |
| G-1200-CC-3 | 30 | 52 | 0.5 | 4 | 4.5 | — | — | — | — | — | — | — | — |
| G-1000-CC-3 | 45 | 55 | 0.25 | 3 | 4.5 | — | — | — | — | — | — | — | — |
| G-1000-HSCC | 42 | 60 | 0 | 2.5 | 4.5 | — | — | — | — | — | — | — | — |
| G-900-HSCC | 50 | 60 | 0 | 2.75 | 4.5 | — | — | — | — | — | — | — | — |
| G-9C-HSCC | 48 | 62 | 0 | 2.5 | 4.5 | — | — | — | — | — | — | — | — |
| G-9C-HSCC-2 | 45 | 56 | 0.25 | 4.5 | — | — | — | — | — | — | — | — | — |
| G-800-FP | — | — | 0 | 0 | 0 | 0 | 0 | 0 | 0 | 0.5 | 2.25 | 3.75 | 4.5 |
| G-800-CC-5 | 40 | 55 | 0.25 | 2.5 | 4.5 | — | — | — | — | — | — | — | — |
| G-800-FPHS | 135 | 180 | 0 | 0 | 0 | 0 | 0 | 0.25 | 0.75 | 1.5 | 2.25 | 4.5 | — |
| G-600-FP | — | — | 0 | 0 | 0 | 0 | 0 | 0 | 0 | 0.5 | 1.25 | 2.75 | 4.5 |

TABLE 4-continued

Penetration Measurements for the Eighteen Compositions of Example 1.

| | Seting (min) | | Penetration Resistance (tsf) - Soil Penetrometer | | | | | | | | | | | | |
|---|---|---|---|---|---|---|---|---|---|---|---|---|---|---|---|
| Mix ID | GS | 4 psi | 1 | 1.5 | 2 | 2.5 | 3 | 3.5 | 4 | 5 | 6 | 7 | 8 |
| G-600-CC-2 | 90 | 120 | 0 | 0 | 0 | 0.5 | 2.25 | 3.75 | 4.5 | — | — | — | — |
| G-600-CC-5 | 45 | 60 | 0 | 1.25 | 4.5 | — | — | — | — | — | — | — | — |
| G-600-CC-8 | 38 | 50 | 0.25 | 2.75 | 4.5 | — | — | — | — | — | — | — | — |
| G-600-CC-10 | 25 | 45 | 0.25 | 2.5 | 4.5 | — | — | — | — | — | — | — | — |
| G-500-CC-5 | 75 | 90 | 0 | 0 | 1.25 | 3.5 | 4.5 | — | — | — | — | — | — |
| G-500-CC-10 | 32 | 52 | 0.5 | 2.5 | 4.5 | — | — | — | — | — | — | — | — |
| G-400-CC-5 | 90 | 135 | 0 | 0 | 0 | 0.75 | 2.25 | 3 | 4.5 | — | — | — | — |
| G-400-CC-10 | 60 | 82 | 0 | 0.5 | 2 | 3.5 | 4.5 | 1 | — | — | — | — | — |

As shown by the above data, compositions including higher doses of dry calcium chloride and lower amounts of cement (for example, Mix IDs: G-400-CC-5, G-400-CC-10, G-500-CC-5, G-500-CC-10) demonstrated improved the setting time of about one hour. For those compositions, increasing the amount of dry calcium chloride from 5% to 10% in compositions including 400 lb/CY and 500 lb/CY improved the setting time by about 1 hour. For compositions including 600 lb/CY cement (for example, Mix IDs: G-600-FP, G-600-CC-2, G-600-CC-5, G-600-CC-8, G-600-CC-10), once a 5% dose of calcium chloride was included in the mixture, addition of additional dry calcium chloride showed little or no improvement. For compositions including 1000 lb/CY or 1200 lb/CY cement (for example, Mix IDs: G-1000-CC-3, G-1200-CC-3), once a 3% dose of calcium chloride was included in the mixture, addition of additional dry calcium chloride showed little or no improvement.

Unexpectedly, for compositions including 600 lb/CY and 800 lb/CY and dry calcium chloride (for example, Mix IDs: G-600-CC-5, G-600-CC-8, G-600-CC-10, G-800-CC-5), the 4.5 tsf penetration resistance was achieved in two hours; much quicker than the eight hours required to meet the 4.5 tsf penetration resistance by the compositions including 600 lb/CY and 800 lb/CY but no dry calcium chloride (for example, Mix IDs: G-600-FP, G-800-FP).

Example 5

Sixteen embodiments (of the eighteen embodiments defined in Example 1) of the compositions described above were prepared for testing and evaluation. The components for each of the sixteen compositions is set forth below based on pounds per cubic yard (lb/cy) in Table 5A and percent (%) of the composition by weight in Table 5B.

TABLE 5A

Components of Sixteen Embodiments of the Compositions by Pounds per Cubic Yard.

| | Composition (lb/CY) | | | | | | WR | Ret. | AEA |
|---|---|---|---|---|---|---|---|---|---|
| Mix ID | Cement | Prill | Sand | Fibers | Polymer | Water | (lb/CY) | (lb/CY) | (lb/CY) |
| G-1200-CC-3 | 1200 | 36 | 1925 | 2.5 | 2 | 547 | 0.0 | 0.0 | 0.0 |
| G-1000-CC-3 | 1000 | 30 | 2220 | 2.5 | 2 | 501 | 0.0 | 0.0 | 0.0 |
| G-1000-HSCC | 1000 | 30 | 2440 | 2.5 | 1 | 417 | 2.1 | 2.1 | 4.2 |
| G-900-HSCC | 900 | 27 | 2560 | 2.5 | 1 | 409 | 1.9 | 1.9 | 3.8 |
| G-9C-HSCC | 900 | 27 | 2540 | 2.5 | 0 | 417 | 1.9 | 1.9 | 3.8 |
| G-9C-HSCC-2 | 900 | 27 | 2540 | 2.5 | 0 | 417 | 1.9 | 1.9 | 0.2 |
| G-800-CC-5 | 800 | 40 | 2350 | 2.5 | 2 | 509 | 0.0 | 0.0 | 0.0 |
| G-800-FPHS | 800 | 0 | 2800 | 2.5 | 0.25 | 350 | 3.4 | 0.0 | 0.0 |
| G-600-CC-2 | 600 | 12 | 2560 | 2.5 | 2 | 501 | 0.0 | 0.0 | 0.0 |
| G-600-CC-5 | 600 | 30 | 2550 | 2.5 | 2 | 501 | 0.0 | 0.0 | 0.0 |
| G-600-CC-8 | 600 | 48 | 2540 | 2.5 | 2 | 501 | 0.0 | 0.0 | 0.0 |
| G-600-CC-10 | 600 | 60 | 2530 | 2.5 | 2 | 501 | 0.0 | 0.0 | 0.0 |
| G-500-CC-5 | 500 | 25 | 2650 | 2.5 | 2 | 501 | 0.0 | 0.0 | 0.0 |
| G-500-CC-10 | 500 | 50 | 2640 | 2.5 | 2 | 489 | 0.0 | 0.0 | 0.0 |
| G-400-CC-5 | 400 | 20 | 2710 | 2.5 | 2 | 509 | 0.0 | 0.0 | 0.0 |
| G-400-CC-10 | 400 | 40 | 2690 | 2.5 | 2 | 509 | 0.0 | 0.0 | 0.0 |

TABLE 5B

Components of the compositions of Table 5A by Weight.

| | Composition (%) by weight | | | | | | | | |
|---|---|---|---|---|---|---|---|---|---|
| Mix ID | Cement | Prill | Sand | Fibers | Polymer | Water | WR | Ret. | AEA |
| G-1200-CC-3 | 32.32% | 0.97% | 51.85% | 0.07% | 0.05% | 14.73% | 0.00% | 0.00% | 0.00% |
| G-1000-CC-3 | 26.63% | 0.80% | 59.11% | 0.07% | 0.05% | 13.34% | 0.00% | 0.00% | 0.00% |
| G-1000-HSCC | 25.68% | 0.77% | 62.65% | 0.06% | 0.03% | 10.71% | 0.05% | 0.05% | 0.11% |
| G-900-HSCC | 23.06% | 0.69% | 65.59% | 0.06% | 0.03% | 10.48% | 0.05% | 0.05% | 0.10% |
| G-9C-HSCC | 23.13% | 0.69% | 65.29% | 0.06% | 0.00% | 10.72% | 0.05% | 0.05% | 0.10% |

TABLE 5B-continued

Components of the compositions of Table 5A by Weight.

| Mix ID | Composition (%) by weight | | | | | | | | |
|---|---|---|---|---|---|---|---|---|---|
| | Cement | Prill | Sand | Fibers | Polymer | Water | WR | Ret. | AEA |
| G-9C-HSCC-2 | 23.13% | 0.69% | 65.29% | 0.06% | 0.00% | 10.72% | 0.05% | 0.05% | 0.00% |
| G-800-CC-5 | 21.60% | 1.08% | 63.45% | 0.07% | 0.05% | 13.74% | 0.00% | 0.00% | 0.00% |
| G-800-FPHS | 20.22% | 0.00% | 70.78% | 0.06% | 0.01% | 8.85% | 0.09% | 0.00% | 0.00% |
| G-600-CC-2 | 16.32% | 0.33% | 69.61% | 0.07% | 0.05% | 13.62% | 0.00% | 0.00% | 0.00% |
| G-600-CC-5 | 16.28% | 0.81% | 69.19% | 0.07% | 0.05% | 13.59% | 0.00% | 0.00% | 0.00% |
| G-600-CC-8 | 16.24% | 1.30% | 68.77% | 0.07% | 0.05% | 13.56% | 0.00% | 0.00% | 0.00% |
| G-600-CC-10 | 16.24% | 1.62% | 68.46% | 0.07% | 0.05% | 13.56% | 0.00% | 0.00% | 0.00% |
| G-500-CC-5 | 13.59% | 0.68% | 72.00% | 0.07% | 0.05% | 13.61% | 0.00% | 0.00% | 0.00% |
| G-500-CC-10 | 13.57% | 1.36% | 71.67% | 0.07% | 0.05% | 13.28% | 0.00% | 0.00% | 0.00% |
| G-400-CC-5 | 10.98% | 0.55% | 74.38% | 0.07% | 0.05% | 13.97% | 0.00% | 0.00% | 0.00% |
| G-400-CC-10 | 10.98% | 1.10% | 73.83% | 0.07% | 0.05% | 13.97% | 0.00% | 0.00% | 0.00% |

Example 6

For some of the above-defined prepared compositions, commercial liquid admixtures were included, as indicated in the tables. These admixtures include one or more of water reducers, set retarders, and air entrainers as discussed above. Table 6 below outlines the dose range, specific gravity, unit weight, and specific products utilized in one or more embodiment compositions. Descriptions of utilized admixtures are consistent throughout the Examples unless otherwise noted.

TABLE 6

Characteristics of Commercial Liquid Admixtures.
Commercial Liquid Admixtures

| Admixture | Dose Range (fl.oz/cwt) Min | Max | SG | UW (pcf) | Product |
|---|---|---|---|---|---|
| Water Reducer | 1 | 12 | 1.08 | 67.392 | Sika ViscoCrete 6100, 4100, 2100 |

TABLE 6-continued

Characteristics of Commercial Liquid Admixtures.
Commercial Liquid Admixtures

| Admixture | Dose Range (fl.oz/cwt) Min | Max | SG | UW (pcf) | Product |
|---|---|---|---|---|---|
| Set Retarder | 1 | 10 | 1.08 | 67.392 | Sika Plastiment XR |
| Air Entrainer | 0.25 | 8 | 1.08 | 67.392 | Sika AEA-14 |

Example 7

Eight embodiments of the compositions described above were prepared for testing and evaluation. Four of these compositions were prepared with RapidSet cement or Fastrax cement, each of which are proprietary cements with different chemistry than typical Portland Cements. The components for each of the eight compositions is set forth below based on pounds per cubic yard (lb/cy) in Table 7A and percent (%) of the composition by weight in Table 7B.

TABLE 7A

Components of Eight Embodiments of the Compositions by Pounds per Cubic Yard.

| Mix ID | Composition (lb/CY) | | | | | | | |
|---|---|---|---|---|---|---|---|---|
| | Cement | FasTrac | RapidSet | Prill | Sand | Fibers | Polymer | Water |
| G-600-CC-5 | 600 | — | — | 30 | 2550 | 2.5 | 2 | 501 |
| G-800-CC-5 | 800 | — | — | 40 | 2350 | 2.5 | 2 | 509 |
| G-1000-CC-3 | 1000 | — | — | 30 | 2220 | 2.5 | 2 | 501 |
| G-1200-CC-3 | 1200 | — | — | 36 | 1925 | 2.5 | 2 | 547 |
| FT-658 | — | 658 | — | — | 2740 | — | — | 413 |
| FT-600-FP | — | 600 | — | — | 2590 | 2.5 | 2 | 487 |
| RS-600 | — | — | 600 | — | 2610 | — | — | 488 |
| RS-600-FP | — | — | 600 | — | 2550 | 2.5 | 2 | 504 |

TABLE 7B

Components of the compositions of Table 7A by Weight.

| Mix ID | Composition (%) by weight | | | | | | | |
|---|---|---|---|---|---|---|---|---|
| | Cement | Fast Trac | Rapid Set | Prill | Sand | Fibers | Polymer | Water |
| G-600-CC-5 | 16.28% | 0.00% | 0.00% | 0.81% | 69.19% | 0.07% | 0.05% | 13.59% |
| G-800-CC-5 | 21.60% | 0.00% | 0.00% | 1.08% | 63.45% | 0.07% | 0.05% | 13.74% |
| G-1000-CC-3 | 26.63% | 0.00% | 0.00% | 0.80% | 59.11% | 0.07% | 0.05% | 13.34% |
| G-1200-CC-3 | 32.32% | 0.00% | 0.00% | 0.97% | 51.85% | 0.07% | 0.05% | 14.73% |

TABLE 7B-continued

| Components of the compositions of Table 7A by Weight. | | | | | | | | |
|---|---|---|---|---|---|---|---|---|
| | Composition (%) by weight | | | | | | | |
| Mix ID | Cement | Fast Trac | Rapid Set | Prill | Sand | Fibers | Polymer | Water |
| FT-658 | 0.00% | 17.27% | 0.00% | 0.00% | 71.90% | 0.00% | 0.00% | 10.84% |
| FT-600-FP | 0.00% | 16.30% | 0.00% | 0.00% | 70.35% | 0.07% | 0.05% | 13.23% |
| RS-600 | 0.00% | 0.00% | 16.22% | 0.00% | 70.58% | 0.00% | 0.00% | 13.20% |
| RS-600-FP | 0.00% | 0.00% | 16.40% | 0.00% | 69.70% | 0.07% | 0.05% | 13.78% |

Example 8

The water to cement (only) ratio (W/C), the water to cementitious materials ratio (W/Cm), the unit weight (UW (pcf)), the percent air content (Air (%)), and the spread (inches) was calculated for each of the eight compositions as disclosed in Table 8.

TABLE 8

| Characteristics of the Eight Compositions of Example 7. | | | | | |
|---|---|---|---|---|---|
| Mix ID | W/C | W/Cm | UW (pcf) | Est Air (%) | Spread (in) |
| G-600-CC-5 | 0.84 | 0.80 | 123.8 | 10.3 | 8.0 |
| G-800-CC-5 | 0.64 | 0.61 | 119.5 | 14.9 | 7.5 |
| G-1000-CC-3 | 0.50 | 0.49 | 123.3 | 12.8 | 7.5 |
| G-1200-CC-3 | 0.46 | 0.44 | 124.5 | 10.4 | 7 |
| FT-658 | 0.63 | 0.63 | 128.9 | 9.6 | 8.5 |
| FT-600-FP | 0.81 | 0.81 | 115.6 | 17.9 | 7.5 |
| RS-600 | 0.81 | 0.81 | 132.8 | 3.1 | 7.5 |
| RS-600-FP | 0.84 | 0.84 | 117.8 | 15 | 7.0 |

Example 9

The above eight compositions were evaluated for compressive strength using ASTM D4832 (psi) at 2 hours, 4 hours, 1 day, 7 days, and 28 days following mixture and application as disclosed in Table 9.

TABLE 9

| Compressive Strength Measurements for the Eight Compositions of Example 7. | | | | | |
|---|---|---|---|---|---|
| | Compressive Strength (psi) | | | | |
| Mix ID | 2-hr | 4-hr | 1-day | 7-day | 28-day |
| G-600-CC-5 | 30 | 180 | 615 | 1295 | 1640 |
| G-800-CC-5 | 125 | 290 | 1115 | 2115 | 2750 |
| G-1000-CC-3 | 90 | 630 | 2400 | 3976 | 4820 |
| G-1200-CC-3 | 200 | 870 | 2730 | 4785 | 6050 |

TABLE 9-continued

| Compressive Strength Measurements for the Eight Compositions of Example 7. | | | | | |
|---|---|---|---|---|---|
| | Compressive Strength (psi) | | | | |
| Mix ID | 2-hr | 4-hr | 1-day | 7-day | 28-day |
| FT-658 | 1325 | 1875 | 2495 | 2790 | 3640 |
| FT-600-FP | 380 | 630 | 850 | 955 | 1090 |
| RS-600 | 1500 | 1970 | 2620 | 3780 | 4100 |
| RS-600-FP | 1000 | 1300 | 1670 | 2300 | 2600 |

Example 10

The above compositions were evaluated for penetration resistance (tsf) using a soil penetrometer at 1 hour, 1.5 hours, 2 hours, 2.5 hours, 3 hours, 3.5 hours, 4 hours, 5 hours, 6 hours, 7 hours, and 8 hours post mix and application as disclosed in Table 10. Measurements were stopped once a penetration of 4.5 tsf was measured and are indicated by "-". In addition, Gel Set time (GS) was measured in minutes for the compositions and the time for each composition to reach 4 psi was also measured in minutes (4 psi). When the compositions including the RapidSet or Fastrax cements were tested without the inclusion of fibers or polymers (FT-658, RS-600), a penetration resistance of 4.5 tsf was achieved within one hour. However, when the compositions including RapidSet or Fastrax cements as well as polymers and fibers (FT-600-FP, RS-600-FP) were tested (which, in some examples, may have had entrained air generated due at least in part to the included polymers and fibers), 4.5 tsf was achieved within 1.5 hours.

When the compositions including cement and calcium chloride as well as fibers and polymers were tested (which, in some examples, may have had entrained air generated due at least in part to the included polymers and fibers), 4.5 tsf was achieved within 2 hours. These compositions achieve a satisfactory penetration resistance in a time only 30 minutes longer than the compositions including fibers, polymers, and the (more expensive) commercially available rapid setting cements tested.

TABLE 10

| Penetration Measurements for the Eight Compositions of Example 7. | | | | | | | | | |
|---|---|---|---|---|---|---|---|---|---|
| | Seting (min) | | Penetration Resistance (tsf)—Soil Penetrometer | | | | | | |
| Mix ID | GS | 4 psi | 1 | 1.5 | 2 | 2.5 | 3 | 3.5 | 4 |
| G-600-CC-5 | 45 | 60 | 0 | 1.25 | 4.5 | — | — | — | — |
| G-800-CC-5 | 40 | 55 | 0.25 | 2.5 | 4.5 | — | — | — | — |
| G-1000-CC-3 | 45 | 55 | 0.25 | 3 | 4.5 | — | — | — | — |
| G-1200-CC-3 | 30 | 52 | 0.5 | 4 | 4.5 | — | — | — | — |
| FT-658 | 20 | 40 | 4.5 | — | — | — | — | — | — |

TABLE 10-continued

Penetration Measurements for the Eight Compositions of Example 7.

| | Seting (min) | | Penetration Resistance (tsf)—Soil Penetrometer | | | | | | |
|---|---|---|---|---|---|---|---|---|---|
| Mix ID | GS | 4 psi | 1 | 1.5 | 2 | 2.5 | 3 | 3.5 | 4 |
| FT-600-FP | 35 | 50 | 2.25 | 4.5 | — | — | — | — | — |
| RS-600 | 30 | 50 | 4.5 | — | — | — | — | — | — |
| RS-600-FP | 35 | 50 | 0 | 4.5 | — | — | — | — | — |

Example 11

Four embodiments of the compositions described above were prepared for testing and evaluation. Two of these compositions were prepared with a liquid calcium chloride accelerant. Compositions G-600-LCC and G-800-LCC are accelerated with liquid calcium chloride using a 32.2% CaCl liquid admixture. Two of these compositions were prepared with a non-chloride accelerant (NCA). The components for each of the four compositions is set forth below based on pounds per cubic yard (lb/cy) and ounces per 100 lbs of cement (oz/cwt) in Table 11A and percent (%) of the composition by weight in Table 11B.

TABLE 11A

Components of Four Embodiments of the Compositions by Pounds per Cubic Yard and Ounces per 100 Pounds of Cement.

| | Composition (lb/CY) | | | | | LCC | NCA | LCC | NCA |
|---|---|---|---|---|---|---|---|---|---|
| Mix ID | Cement | Sand | Fibers | Polymer | Water | (fl.oz/cwt) | (fl.oz/cwt) | (lb/CY) | (lb/CY) |
| G-600-LCC | 600 | 2670 | 2.5 | 2 | 401 | 176 | 0 | 90.8 | 0.0 |
| G-600-NCA | 600 | 2700 | 2.5 | 2 | 392 | 0 | 176 | 0.0 | 94.6 |
| G-800-LCC | 800 | 2475 | 2.5 | 2 | 392 | 176 | 0 | 121.1 | 0.0 |
| G-800-NCA | 800 | 2490 | 2.5 | 2 | 384 | 0 | 176 | 0.0 | 126.2 |

TABLE 11B

Components of the compositions of Table 11A by Weight.

| | Composition (%) by weight | | | | | | |
|---|---|---|---|---|---|---|---|
| Mix ID | Cement | Sand | Fibers | Polymer | Water | CaCl Solid | Liq. NCA |
| G-600-LCC | 15.93% | 70.89% | 0.07% | 0.05% | 12.28% | 0.78% | 0.00% |
| G-600-NCA | 15.83% | 71.22% | 0.07% | 0.05% | 10.34% | 0.00% | 2.50% |
| G-800-LCC | 21.09% | 65.26% | 0.07% | 0.05% | 12.50% | 1.03% | 0.00% |
| G-800-NCA | 21.03% | 65.45% | 0.07% | 0.05% | 10.09% | 0.00% | 3.32% |

In Table 11B above, the percent composition by weight of the CaCl solid for the composition embodiments that include NCA was calculated based on the total liquid admixture.

Table 11C below illustrates properties of admixtures added to the above compositions. In these particular embodiments, the NCA admixture was SikaSet® NC, available from Sika Corporation, 201 Polito Avenue, Lyndhurst, NJ 07071.

TABLE 11C

Properties of Liquid Calcium Chloride and Non-Chloride Accelerant Admixtures added to the compositions of Table 11A.

| Commercial Liquid Admixtures | | | |
|---|---|---|---|
| Admixture | SG | UW (pcf) | Product |
| LCC | 1.32 | 82.368 | Hill Bros. Liquid CaCl, 32.2% Solids |
| NCA | 1.375 | 85.8 | SikaSet NC (non-chloride) |

Example 12

The water to cement (only) ratio (W/C), the unit weight (UW (pcf)), the percent air content (Air (%)), and the spread (inches) was calculated for each of the eight compositions as disclosed in Table 12.

TABLE 13

Compressive Strength Measurements for the Four Compositions of Example 11.

| | Compressive Strength (psi) | | | | |
|---|---|---|---|---|---|
| Mix ID | 2-hr | 4-hr | 1-day | 7-day | 28-day |
| G-600-LCC | 0 | 65 | 370 | 815 | 1110 |
| G-600-NCA | 0 | 0 | 285 | 980 | 1310 |
| G-800-LCC | 50 | 145 | 935 | 1890 | 2610 |
| G-800-NCA | 0 | 40 | 790 | 1950 | 2520 |

Example 14

The above compositions were evaluated for penetration resistance (tsf) using a soil penetrometer at 1 hour, 1.5 hours, 2 hours, 2.5 hours, 3 hours, 3.5 hours, 4 hours, 5 hours, 6 hours, 7 hours, and 8 hours post mix and application as disclosed in Table 10. Measurements were stopped once a penetration of 4.5 tsf was measured and are indicated by "-". In addition, Gel Set time (GS) was measured in minutes for the compositions and the time for each composition to reach 4 psi was also measured in minutes (4 psi).

TABLE 14

Penetration Measurements for the Four Compositions of Example 11.

| | Seting (min) | | Penetration Resistance (tsf)—Soil Penetrometer | | | | | | | | | | |
|---|---|---|---|---|---|---|---|---|---|---|---|---|---|
| Mix ID | GS | 4 psi | 1 | 1.5 | 2 | 2.5 | 3 | 3.5 | 4 | 5 | 6 | 7 | 8 |
| G-600-LCC | 60 | 90 | 0 | 0 | 1.25 | 3 | 4.5 | — | — | — | — | — | — |
| G-600-NCA | 60 | 120 | 0 | 0 | 0 | 0.25 | 0.5 | 1.25 | 1.5 | 1.75 | 3 | 4.5 | — |
| G-800-LCC | 50 | 60 | 0 | 1.5 | 4.5 | — | — | — | — | — | — | — | — |
| G-800-NCA | 50 | 60 | 0 | 0.25 | 0.5 | 1.5 | 2.5 | 3.25 | 4.5 | — | — | — | — |

TABLE 12

Characteristics of the Four Compositions of Example 11.

| Mix ID | W/C Inc. Admx | UW (pcf) | Est Air (%) | Spread (in) |
|---|---|---|---|---|
| G-600-LCC | 0.77 | 121.3 | 15.0 | 7.5 |
| G-600-NCA | 0.77 | 119.7 | 16.7 | 7.0 |
| G-800-LCC | 0.59 | 120.9 | 16.0 | 7.5 |
| G-800-NCA | 0.59 | 121.3 | 16.2 | 7.0 |

Example 13

The above four compositions were evaluated for compressive strength using ASTM D4832 (psi) at 2 hours, 4 hours, 1 day, 7 days, and 28 days following mixture and application as disclosed in Table 13.

Example 15

Two embodiments of the compositions described above were prepared for testing and evaluation. Two of these compositions were prepared including dry calcium chloride Prill. The components for each of the four compositions is set forth below based on pounds per cubic yard (lb/cy) and ounces per 100 lbs of cement (oz/cwt) in Table 15A and percent (%) of the composition by weight in Table 15B.

TABLE 15A

Components of Two Embodiments of the Compositions by Pounds per Cubic Yard and Ounces per 100 Pounds of Cement.

| | Composition (lb/CY) | | | | | | AEA (fl.oz/ | AEA |
|---|---|---|---|---|---|---|---|---|
| Mix ID | Cement | Prill | Sand | Fibers | Color | Water | cwt) | (lb/CY) |
| G-1000-FT | 1000 | 30 | 2220 | 2.5 | 40 | 501 | 4 | 2.8 |
| G-800-FT | 800 | 40 | 2350 | 2.5 | 40 | 509 | 4 | 2.3 |

TABLE 15B

| Components of the compositions of Table 15A by Weight. | | | | | | | |
|---|---|---|---|---|---|---|---|
| | Composition (%) by weight | | | | | | |
| Mix ID | Cement | Prill | Sand | Fibers | Color | Water | AEA |
| G-1000-FT | 26.34% | 0.79% | 58.48% | 0.07% | 1.05% | 13.20% | 0.07% |
| G-800-FT | 21.37% | 1.07% | 62.77% | 0.07% | 1.07% | 13.60% | 0.06% |

Example 16

The water to cementitious materials ratio (W/Cm), the unit weight (UW (pcf)), the percent air content (Air (%)), and the spread (inches) was calculated for each of the two compositions as disclosed in Table 16.

TABLE 16

| Characteristics of the Two Compositions of Example 15. | | | | |
|---|---|---|---|---|
| Mix ID | W/Cm | UW (pcf) | Air (%) | Spread (in) |
| G-1000-FT | 0.49 | 123 | 13.0 | 8.5 |
| G-800-FT | 0.60 | 123.4 | 12.5 | 8.0 |

Example 17

The above two compositions were evaluated for compressive strength using ASTM D4832 (psi) at 7 days and 28 days following mixture and application as disclosed in Table 17.

TABLE 17

| Compressive Strength Measurements for the Two Compositions of Example 15. | | |
|---|---|---|
| | Compressive Strength (psi) | |
| Mix ID | 7-day | 28-day |
| G-1000-FT | 3540 | 4600 |
| G-800-FT | 2270 | 3230 |

Example 18

For the above-defined prepared compositions, commercial liquid admixtures were included, as indicated in the tables. These admixtures air entrainers as discussed above. Table 18 below outlines the dose range, specific gravity, unit weight, and specific product utilized in one or more embodiment compositions.

TABLE 18

| Characteristics of Commercial Liquid Admixtures. Commercial Liquid Admixtures | | | | | |
|---|---|---|---|---|---|
| | Dose Range | | | | |
| Admixture | Min | Max | SG | UW (pcf) | Product |
| Air Entrainer | 0.25 | 8 | 1.08 | 67.392 | Sika AEA-14 |

Example 19

The two compositions of Example 15 were prepared and subjected to freeze-thaw testing. The freeze-thaw testing was conducted in accordance with ASTM C672, in which samples of the two compositions were placed in pans and allowed to cure at ambient conditions for 7 (seven) days. In a one set of examples, the cured compositions were then covered with a 4% calcium chloride solution (the Salt Solution) and then frozen. Once frozen, the compositions were then thawed. Measurements for mass loss (see Table 19A) and visual surface deterioration observations were taken every 5 (five) freeze-thaw cycles for 35 (thirty-five) total freeze-thaw cycles. A second set of example tests were conducted in the same manner, but which utilized only water in lieu of the calcium chloride Salt Solution. Typical environmental exposure conditions for the composition with diluted de-icing salt solutions are expected to be somewhere between water and a 4% salt solution.

Additional example tests were performed using the same freeze-thaw testing methods but also including the use of a cure sealer for added protection against freeze-thaw. The cure sealer utilized was Dayton Superior Cure & Seal 1315 EF, which was applied in 2 (two) coats to the surface of the compositions at an approximate coverage of 400 square feet per gallon. The cure sealer was applied according to the manufacturer's instructions; the first coat was applied immediately after all surface water had disappeared and the surface could not be marred, and the second coat was applied after the first had dried. Dayton Superior Cure & Seal 1315 EF is available from Dayton Superior Corporation, 1125 Byers Road; Miamisburg, OH 45342.

TABLE 19A

| Mass Loss Data due to Freeze-Thaw Cycles for the Compositions of Example 15. | | | | | | |
|---|---|---|---|---|---|---|
| No. Cycles | Mix ID | Sample | Solution | Mass (g) | Mass Loss from initial (g) | % Mass Loss From Initial |
| 0 | G-800 | A | Water | 8673.4 | — | — |
| | | B | Salt | 8122.8 | — | — |
| | G-1000 | A | Water | 8024.3 | — | — |
| | | B | Salt | 8078.9 | — | — |
| | G-800-CS | A | Water | 7991.5 | — | — |
| | | B | Salt | 8083.1 | — | — |
| | G-1000-CS | A | Water | 8274.4 | — | — |
| | | B | Salt | 7900.1 | — | — |
| 5 | G-800 | A | Water | 8666.6 | 6.8 | 0% |
| | | B | Salt | 8063.9 | 58.9 | 1% |
| | G-1000 | A | Water | 8007.9 | 16.4 | 0% |
| | | B | Salt | 8012.4 | 66.5 | 1% |
| | G-800-CS | A | Water | 7991.7 | −0.2 | 0% |
| | | B | Salt | 8075.5 | 7.6 | 0% |
| | G-1000-CS | A | Water | 8239.5 | 34.9 | 0% |
| | | B | Salt | 7883.5 | 16.6 | 0% |
| 10 | G-800 | A | Water | 8643.2 | 30.2 | 0% |
| | | B | Salt | 8038 | 84.8 | 1% |
| | G-1000 | A | Water | 8002 | 22.3 | 0% |
| | | B | Salt | 8015.7 | 63.2 | 1% |

TABLE 19A-continued

Mass Loss Data due to Freeze-Thaw Cycles for the Compositions of Example 15.

| No. Cycles | Mix ID | Sample | Solution | Mass (g) | Mass Loss from initial (g) | % Mass Loss From Initial |
|---|---|---|---|---|---|---|
| | G-800-CS | A | Water | 8015.4 | −23.9 | 0% |
| | | B | Salt | 8078.1 | 5 | 0% |
| | G-1000-CS | A | Water | 8239.5 | 34.9 | 0% |
| | | B | Salt | 7881.3 | 18.8 | 0% |
| 15 | G-800 | A | Water | 8644.5 | 28.9 | 0% |
| | | B | Salt | 8024.4 | 98.4 | 1% |
| | G-1000 | A | Water | 8025.5 | −1.2 | 0% |
| | | B | Salt | 7846.3 | 232.6 | 3% |
| | G-800-CS | A | Water | 8010.2 | −18.7 | 0% |
| | | B | Salt | 8081.9 | 1.2 | 0% |
| | G-1000-CS | A | Water | 8244.5 | 29.9 | 0% |
| | | B | Salt | 7876.6 | 23.5 | 0% |
| 20 | G-800 | A | Water | 8623.1 | 50.3 | 1% |
| | | B | Salt | 7975.9 | 146.9 | 2% |
| | G-1000 | A | Water | 8018.6 | 5.7 | 0% |
| | | B | Salt | 7844.8 | 234.1 | 3% |
| | G-800-CS | A | Water | 8014.7 | −23.2 | 0% |
| | | B | Salt | 8091.8 | −8.7 | 0% |
| | G-1000-CS | A | Water | 8225.4 | 49 | 1% |
| | | B | Salt | 7867.9 | 32.2 | 0% |
| 25 | G-800 | A | Water | 8642.9 | 30.5 | 0% |
| | | B | Salt | 7968.9 | 153.9 | 2% |
| | G-1000 | A | Water | 8020.2 | 4.1 | 0% |
| | | B | Salt | 7856.6 | 222.3 | 3% |
| | G-800-CS | A | Water | 7993.7 | −2.2 | 0% |
| | | B | Salt | 8088.2 | −5.1 | 0% |
| | G-1000-CS | A | Water | 8220.8 | 53.6 | 1% |
| | | B | Salt | 7858.4 | 41.7 | 1% |
| 30 | G-800 | A | Water | 8632.4 | 41 | 0% |
| | | B | Salt | 7698.1 | 424.7 | 5% |
| | G-1000 | A | Water | 8014 | 10.3 | 0% |
| | | B | Salt | 7867.5 | 211.4 | 3% |
| | G-800-CS | A | Water | 7978.1 | 13.4 | 0% |
| | | B | Salt | 8092.4 | −9.3 | 0% |
| | G-1000-CS | A | Water | 8209.9 | 64.5 | 1% |
| | | B | Salt | 7598.1 | 302 | 4% |
| 35 | G-800 | A | Water | 8623.9 | 49.5 | 1% |
| | | B | Salt | 7126.2 | 996.6 | 12% |
| | G-1000 | A | Water | 8015.2 | 9.1 | 0% |
| | | B | Salt | 7802.2 | 276.7 | 3% |
| | G-800-CS | A | Water | 7961.5 | 30 | 0% |
| | | B | Salt | 8090.2 | −7.1 | 0% |
| | G-1000-CS | A | Water | 8204.1 | 70.3 | 1% |
| | | B | Salt | 7145.3 | 754.8 | 10% |

Tables 19B and 19C below summarize the freeze-thaw data and depict mass loss as a percent of the original composition of mass. For purposes of discussing an exemplary embodiment, the freeze-thaw data of the compositions including 800 lb/CY cement (G-800, G-800-CS) demonstrates improved performance with the use of a cure sealer, where the samples treated with the cure sealer experience a smaller mass loss over the course of the freeze-thaw cycles.

FIG. 1A illustrates a graphical representation of data depicting freeze-thaw cycle data for compositions including 800 lb/CY cement and either including or not including a cure sealer, when exposed to the salt solution. FIGS. 1B-1H include photographs of visual surface deterioration observations taken every 5 (five) freeze-thaw cycles up to 35 (thirty-five) freeze-thaw cycles, for compositions including 800 lb/CY cement and either including or not including a cure sealer, when exposed to the salt solution.

Figure 2A:
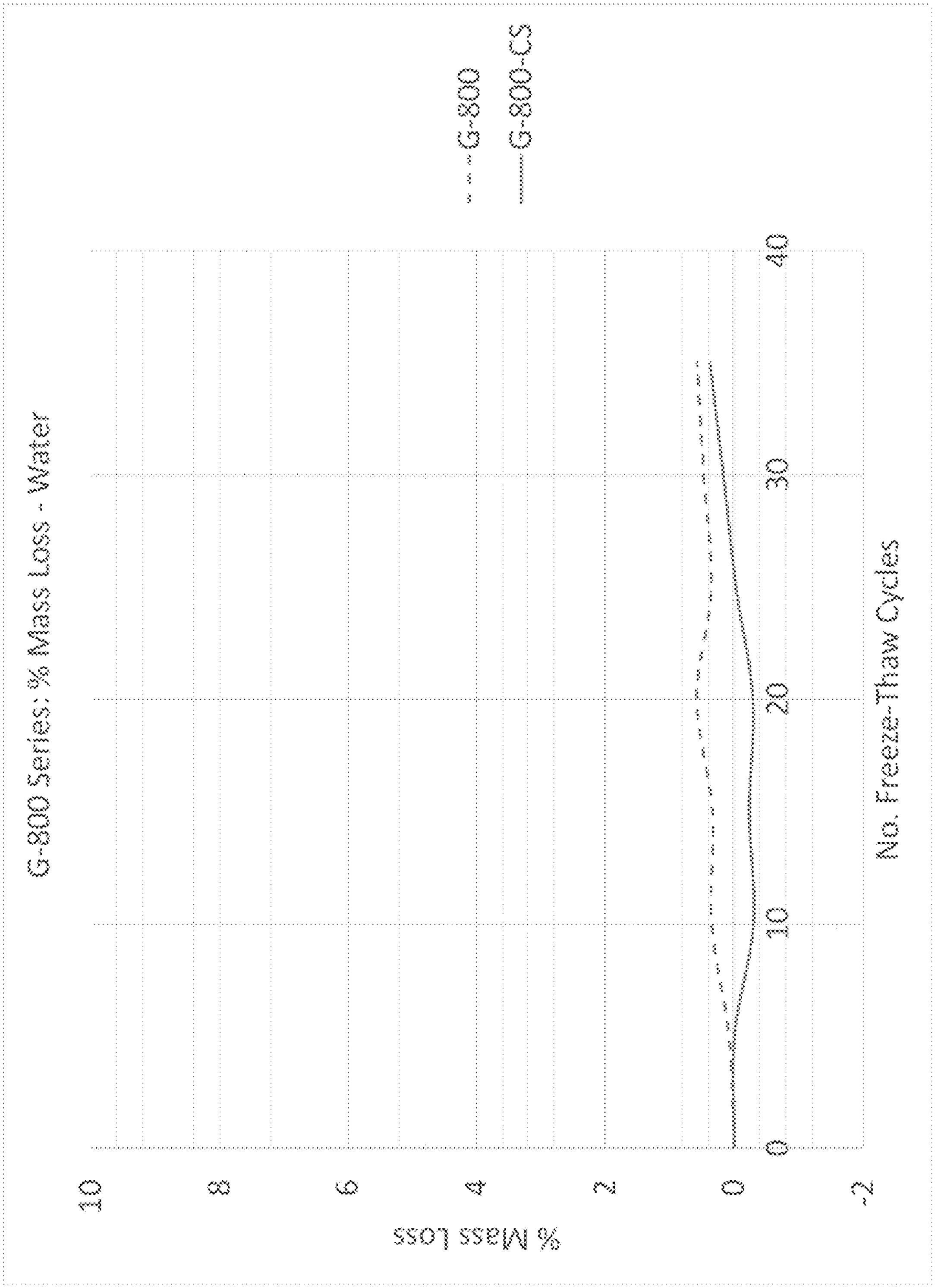
FIG. 2A illustrates a graphical representation of data depicting freeze-thaw cycle data for compositions including 800 lb/CY cement and either including or not including a cure sealer, when exposed to water.
Figure 2B:
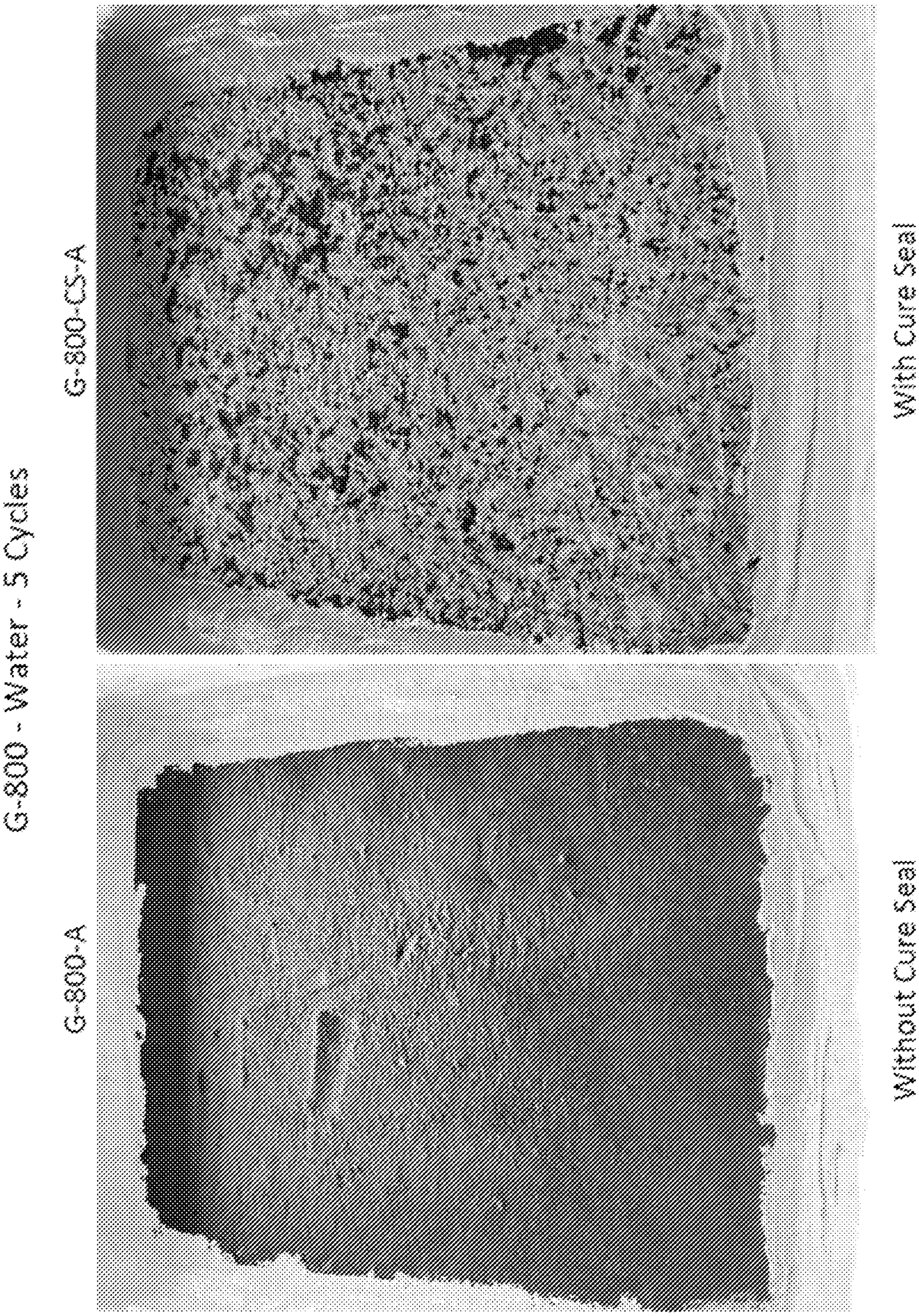
FIG. 2B depicts visual surface deterioration observations taken after 5 freeze-thaw cycles, for compositions including 800 lb/CY cement and including and not including a cure sealer, when exposed to water.
Figure 2C:
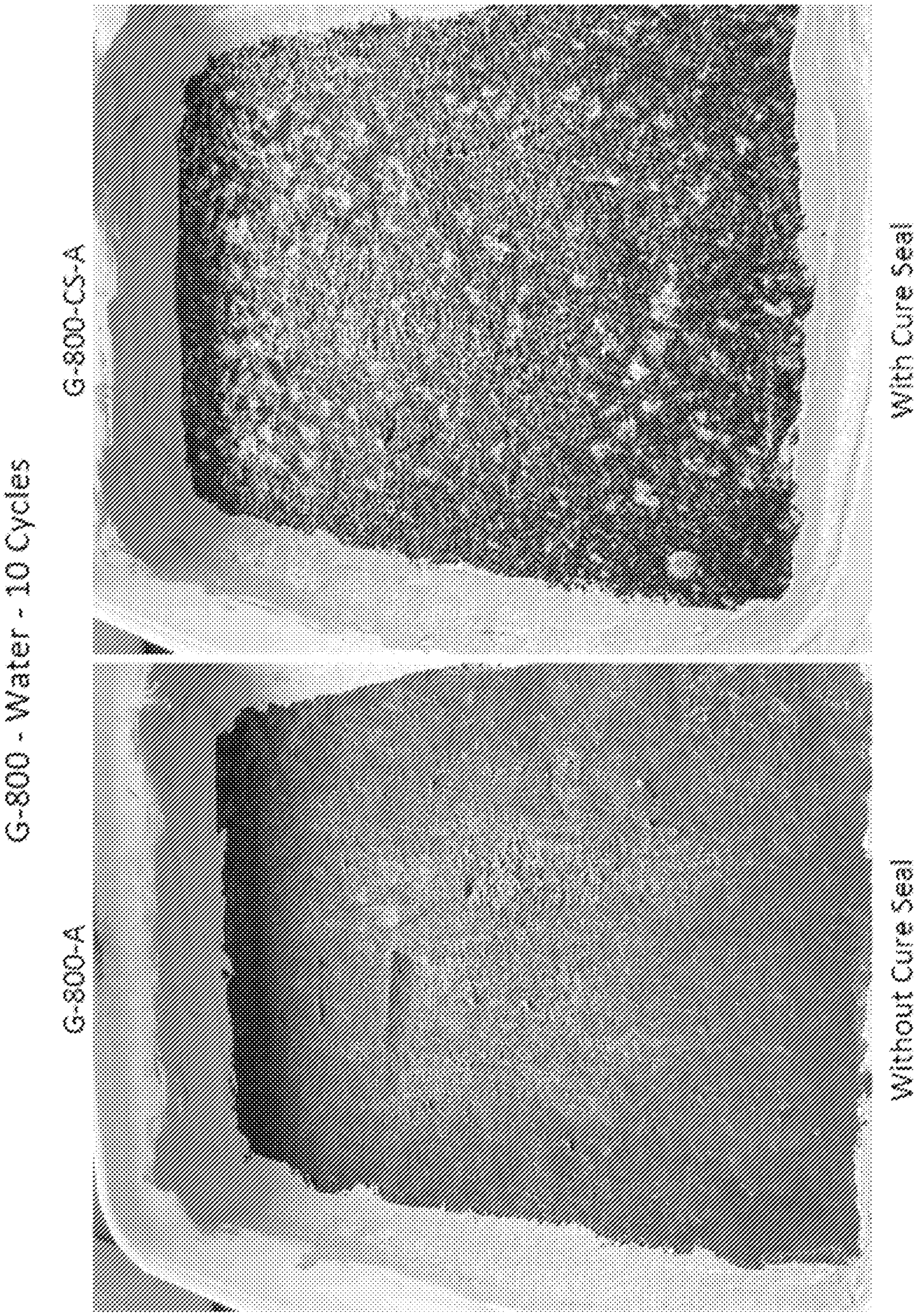
FIG. 2C depicts visual surface deterioration observations taken after 10 freeze-thaw cycles, for compositions including 800 lb/CY cement and including and not including a cure sealer, when exposed to water.
Figure 2D:
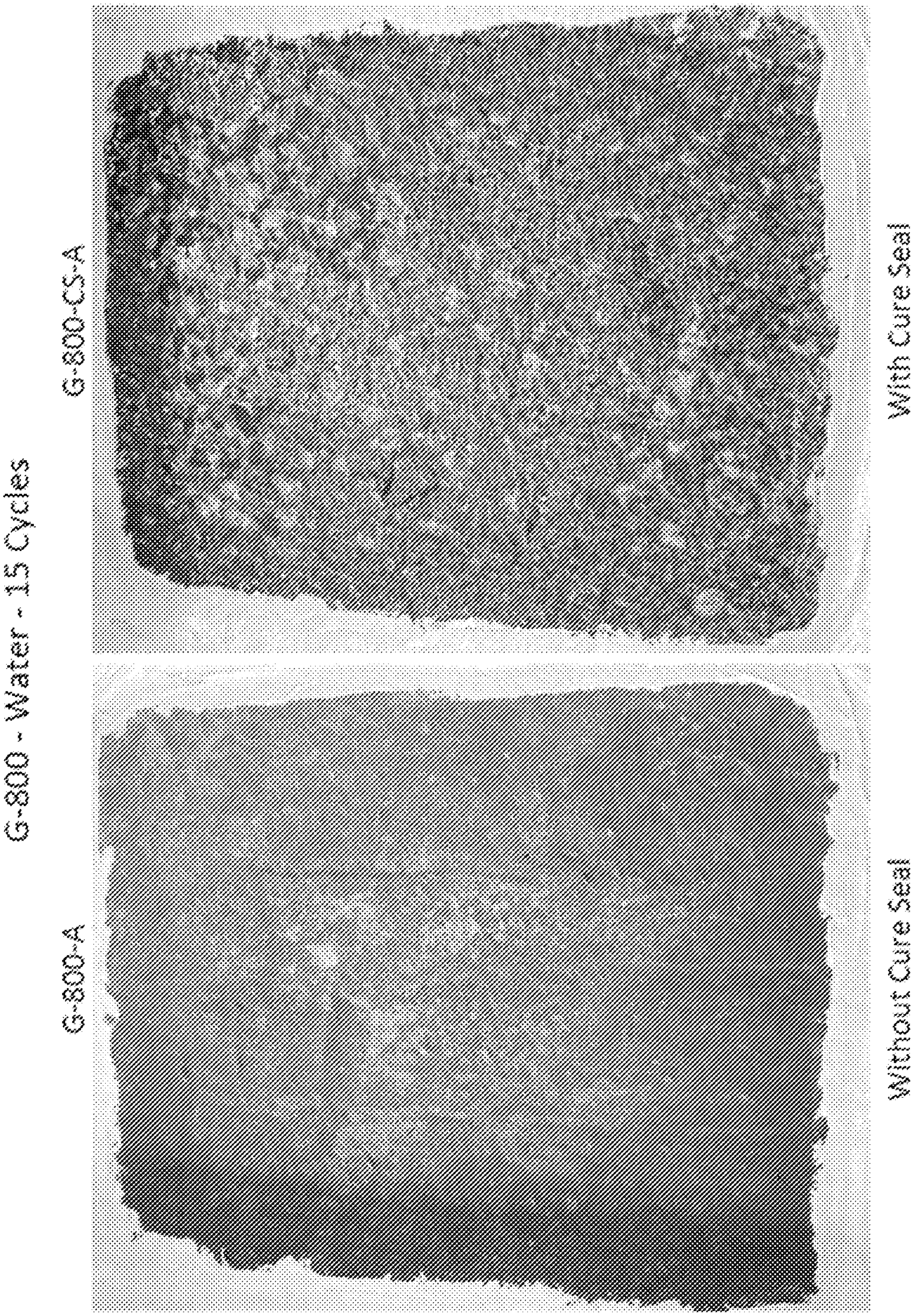
FIG. 2D depicts visual surface deterioration observations taken after 15 freeze-thaw cycles, for compositions including 800 lb/CY cement and including and not including a cure sealer, when exposed to water.
Figure 2E:
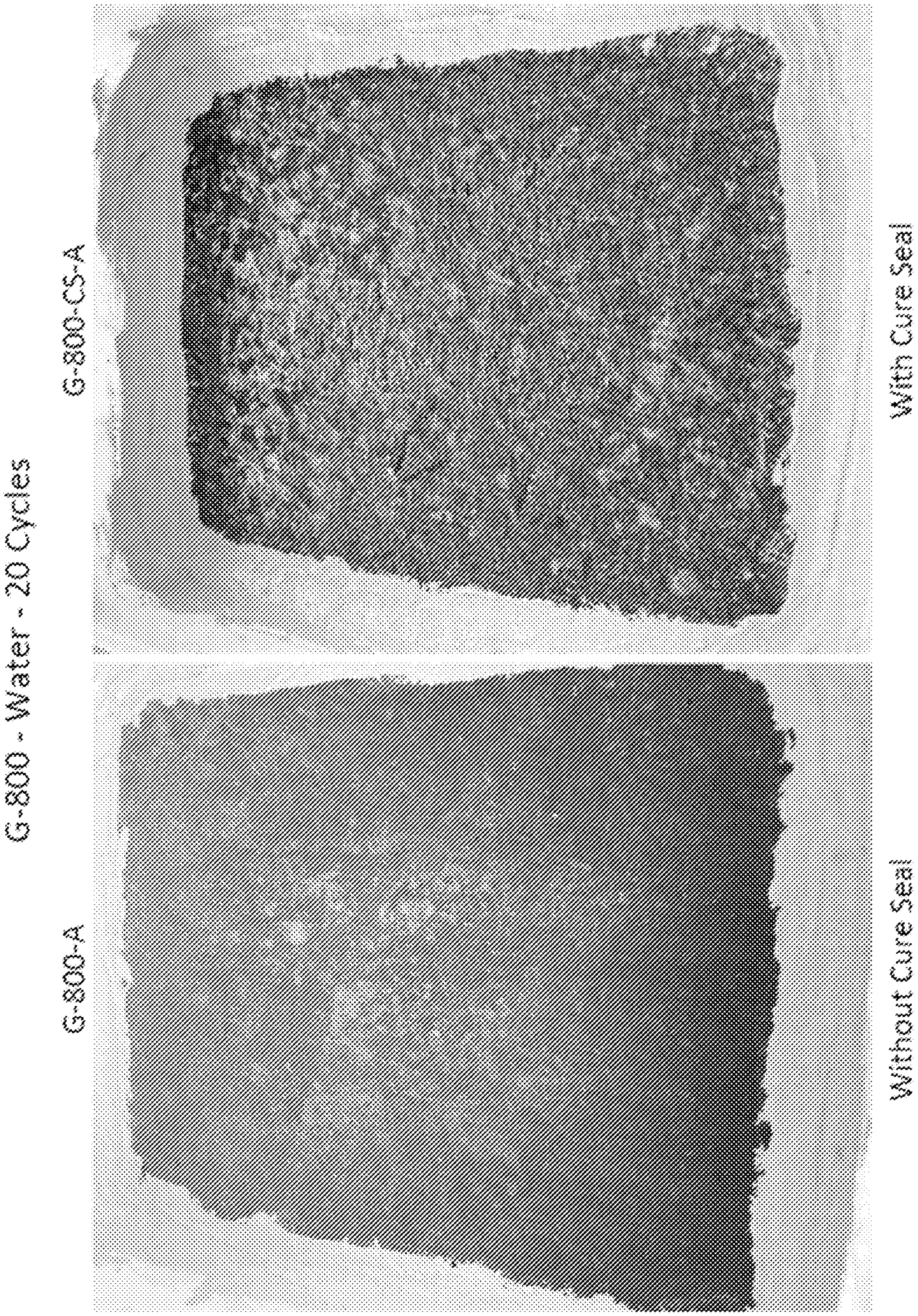
FIG. 2E depicts visual surface deterioration observations taken after 20 freeze-thaw cycles, for compositions including 800 lb/CY cement and including and not including a cure sealer, when exposed to water.
Figure 2F:
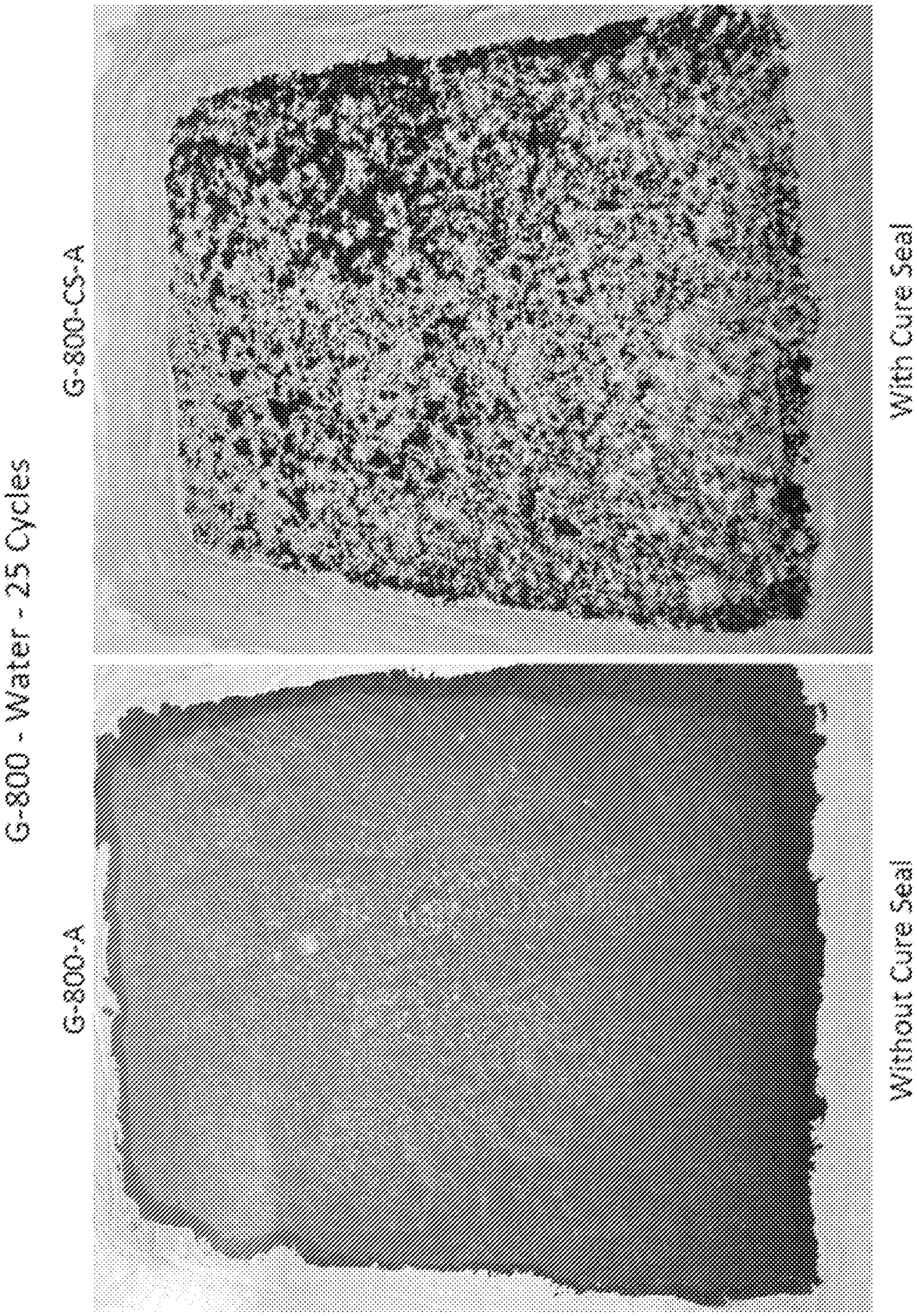
FIG. 2F depicts visual surface deterioration observations taken after 25 freeze-thaw cycles, for compositions including 800 lb/CY cement and including and not including a cure sealer, when exposed to water.
Figure 2G:
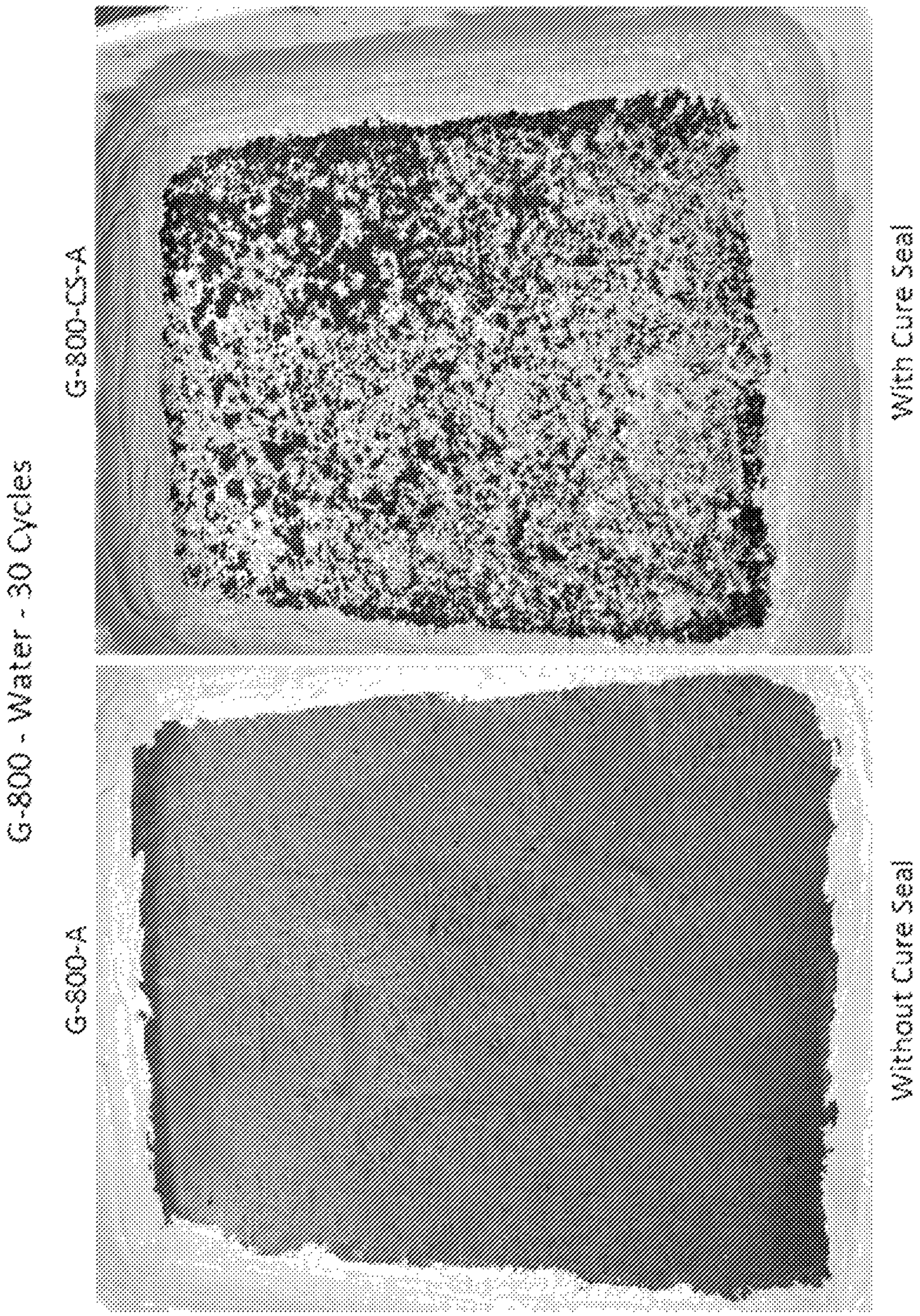
FIG. 2G depicts visual surface deterioration observations taken after 30 freeze-thaw cycles, for compositions including 800 lb/CY cement and including and not including a cure sealer, when exposed to water.
Figure 2H:
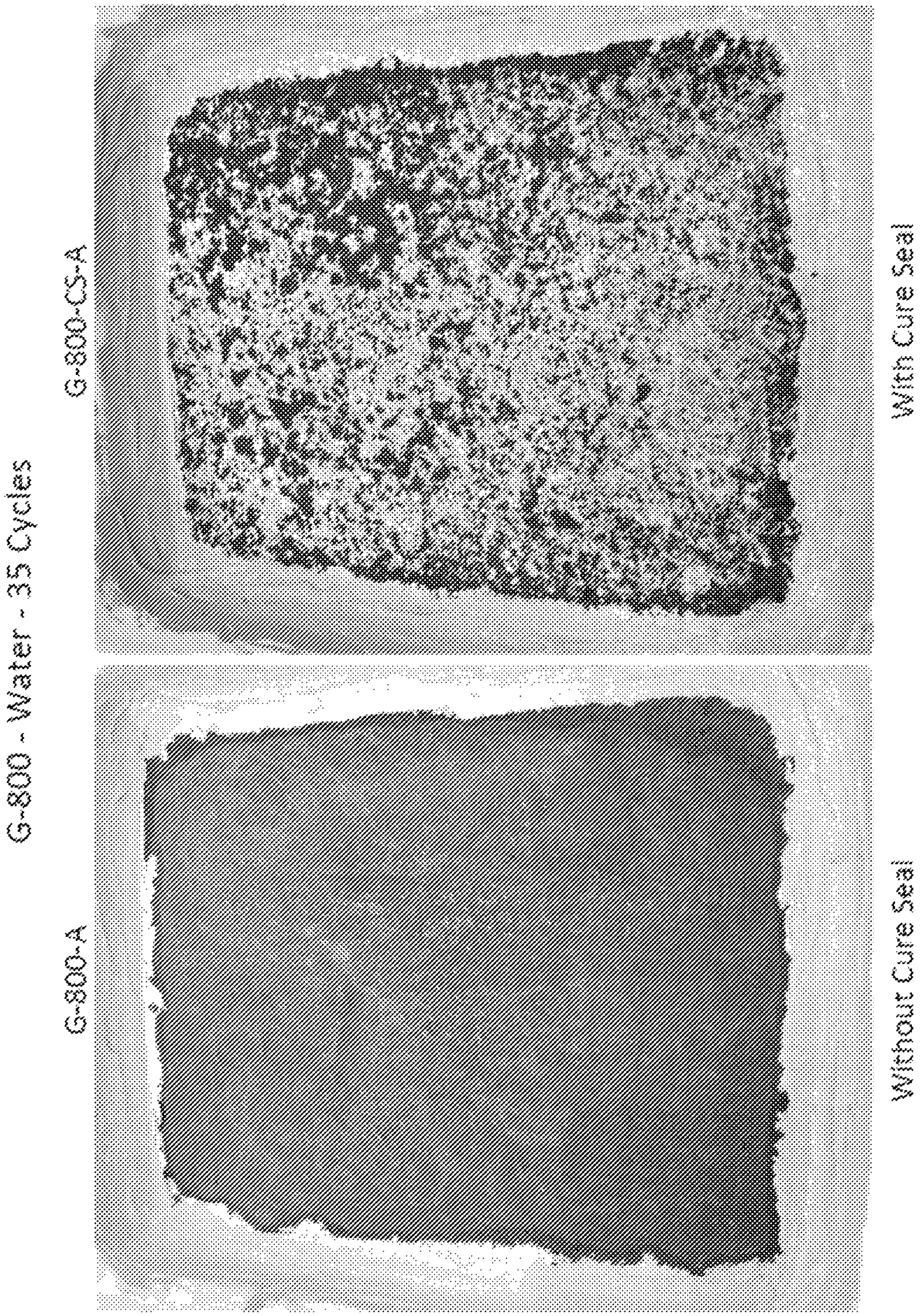
FIG. 2H depicts visual surface deterioration observations taken after 35 freeze-thaw cycles, for compositions including 800 lb/CY cement and including and not including a cure sealer, when exposed to water.

FIG. 2A illustrates a graphical representation of data depicting freeze-thaw cycle data for compositions including 800 lb/CY cement and either including or not including a cure sealer, when exposed to water. FIGS. 2B-2H include photographs of visual surface deterioration observations taken every 5 (five) freeze-thaw cycles up to 35 (thirty-five) freeze thaw cycles, for compositions including 800 lb/CY cement and either including or not including a cure sealer, when exposed to water.

Figure 3A:
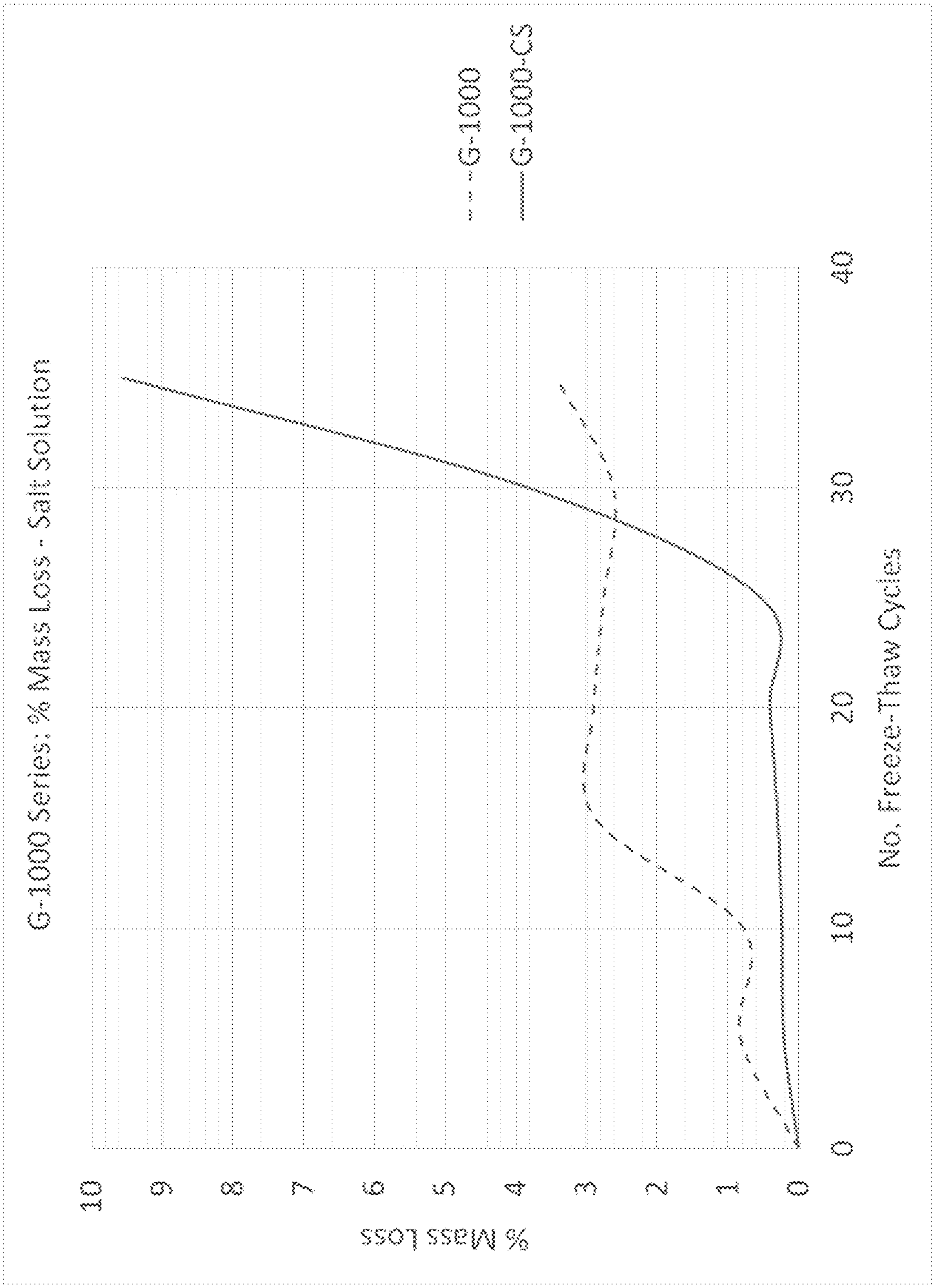
FIG. 3A illustrates a graphical representation of data depicting freeze-thaw cycle data for compositions including 1,000 lb/CY cement and either including or not including a cure sealer, when exposed to a salt solution.
Figure 3B:
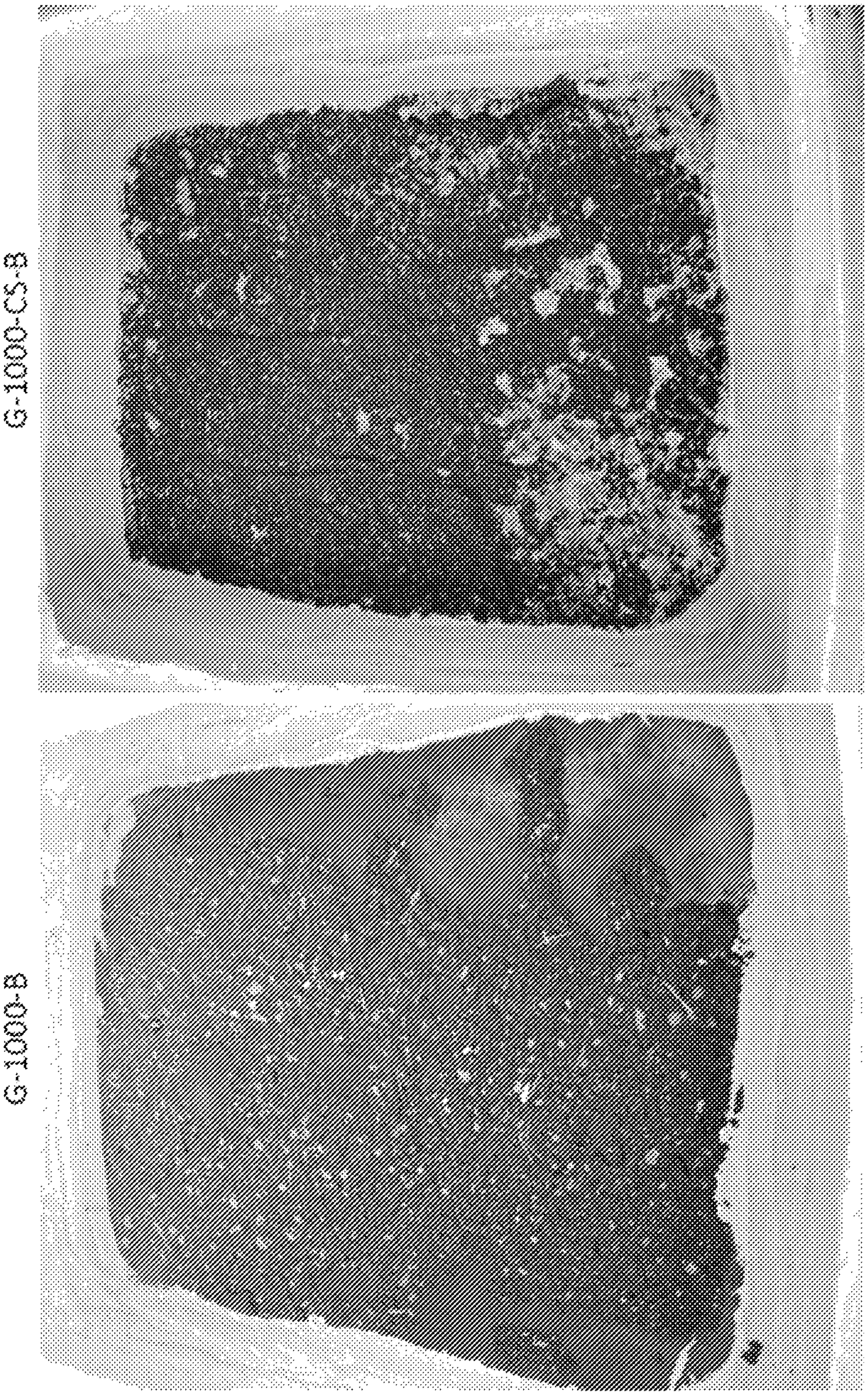
FIG. 3B depicts visual surface deterioration observations taken after 5 freeze-thaw cycles, for compositions including 1,000 lb/CY cement and including and not including a cure sealer, when exposed to a salt solution.
Figure 3C:
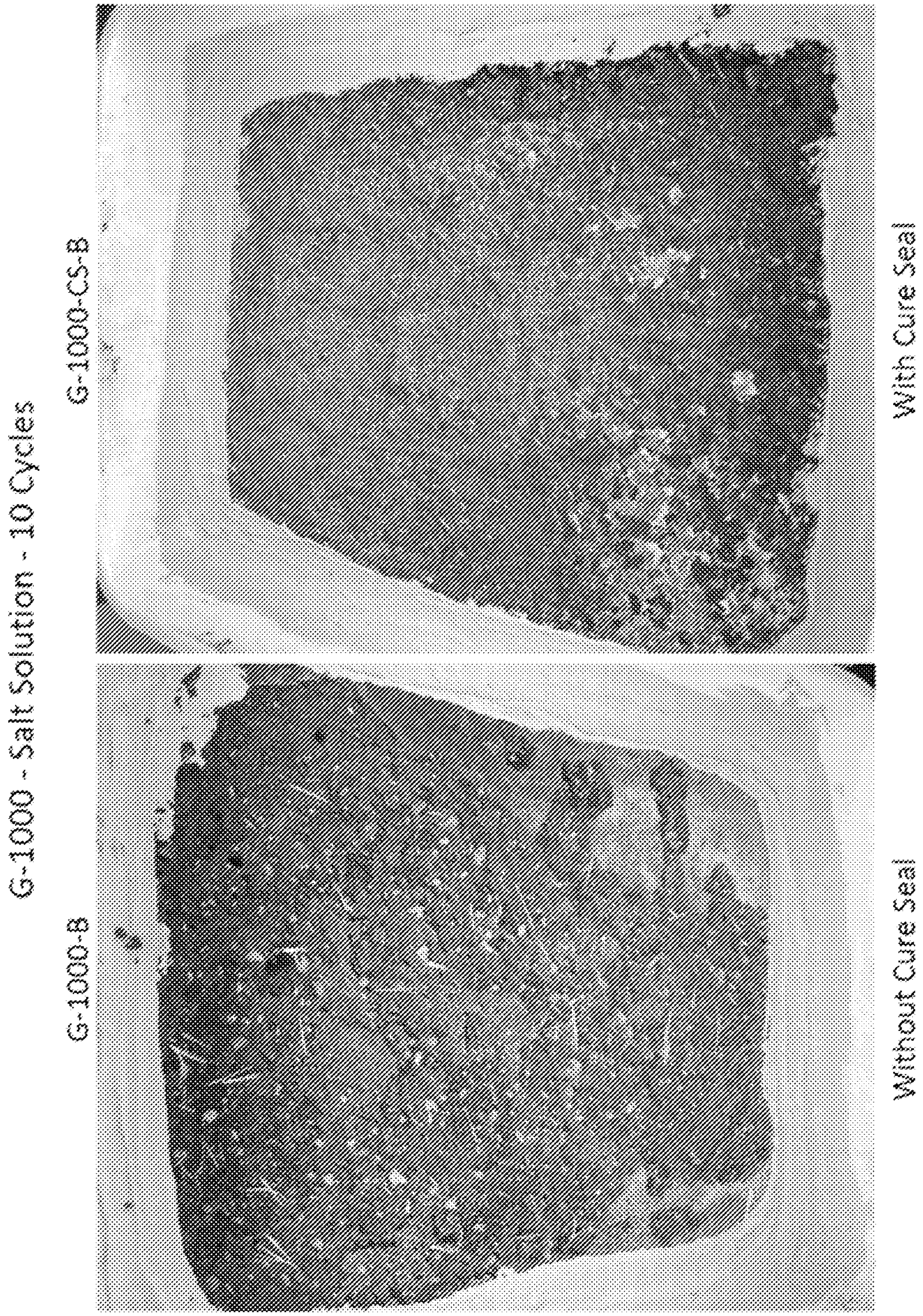
FIG. 3C depicts visual surface deterioration observations taken after 10 freeze-thaw cycles, for compositions including 1,000 lb/CY cement and including and not including a cure sealer, when exposed to a salt solution.
Figure 3D:
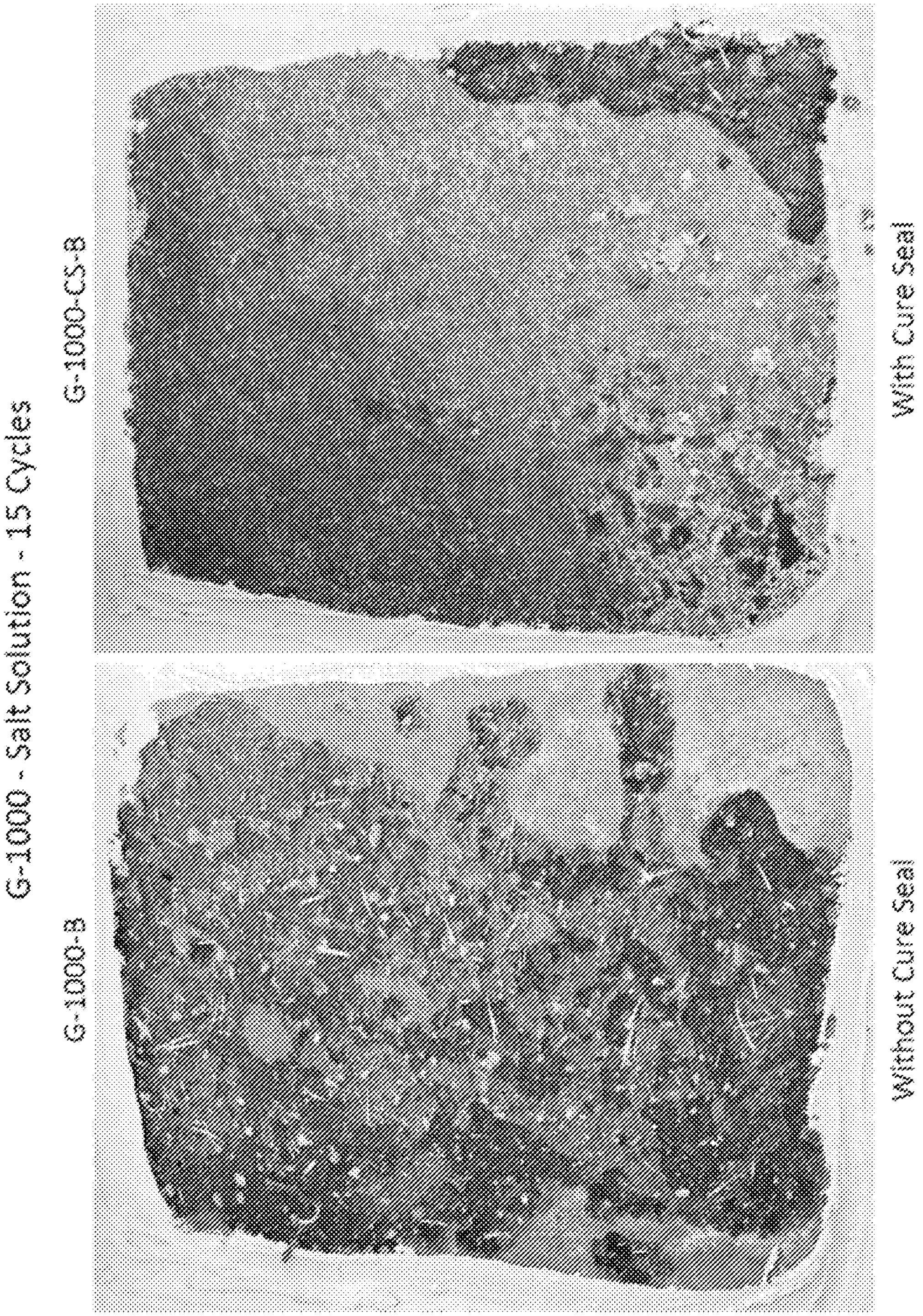
FIG. 3D depicts visual surface deterioration observations taken after 15 freeze-thaw cycles, for compositions including 1,000 lb/CY cement and including and not including a cure sealer, when exposed to a salt solution.
Figure 3E:
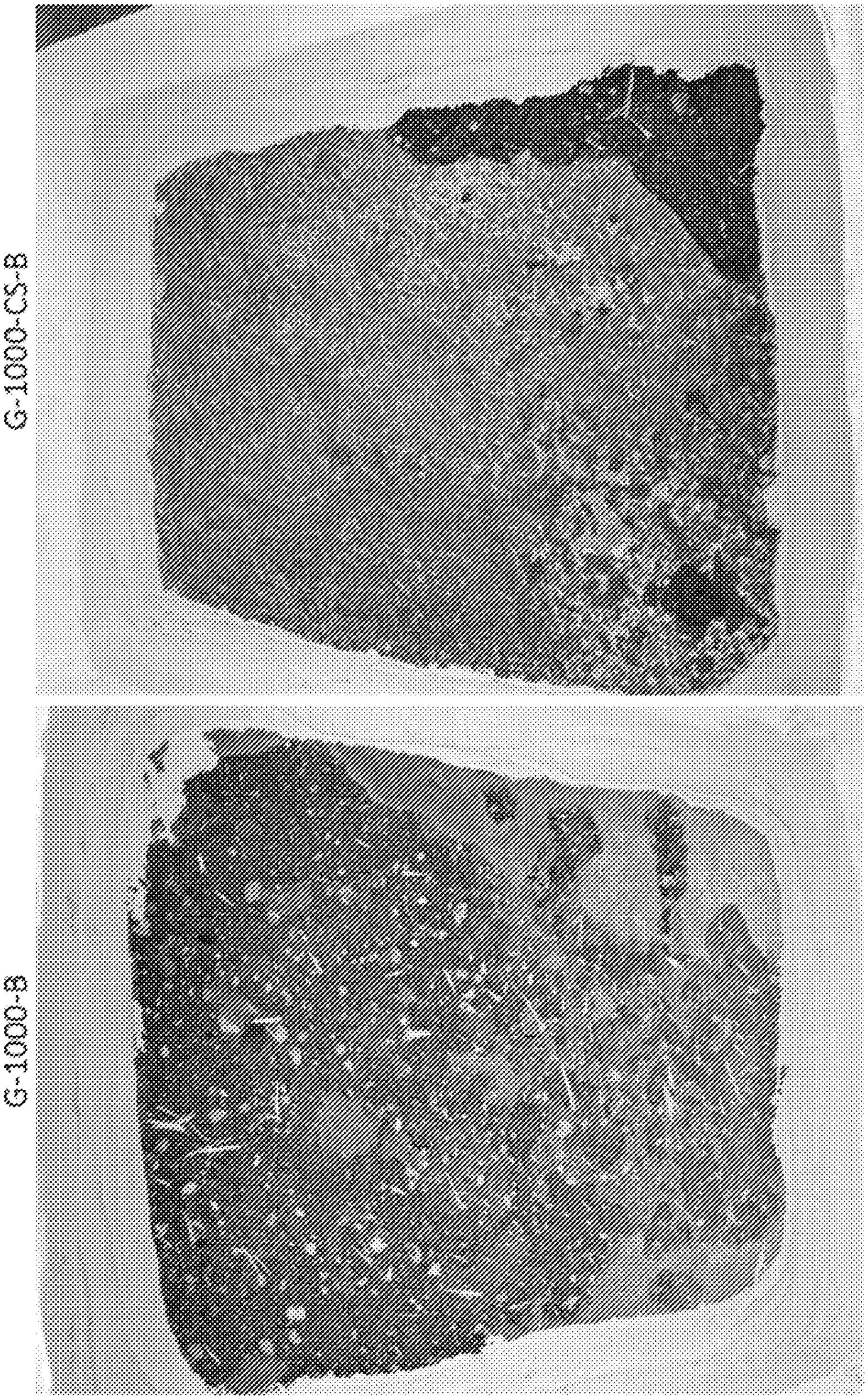
FIG. 3E depicts visual surface deterioration observations taken after 20 freeze-thaw cycles, for compositions including 1,000 lb/CY cement and including and not including a cure sealer, when exposed to a salt solution.
Figure 3F:
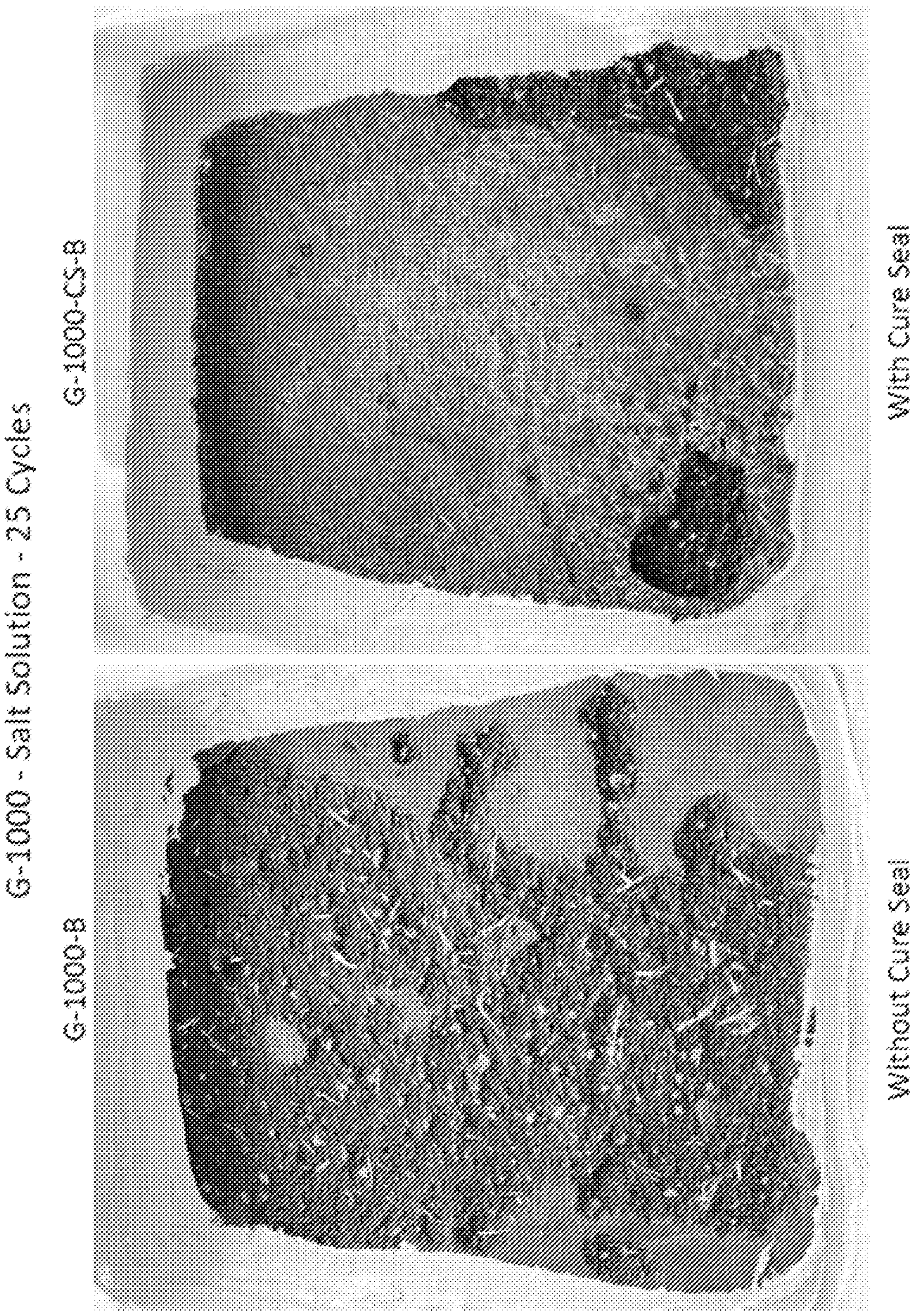
FIG. 3F depicts visual surface deterioration observations taken after 25 freeze-thaw cycles, for compositions including 1,000 lb/CY cement and including and not including a cure sealer, when exposed to a salt solution.
Figure 3G:
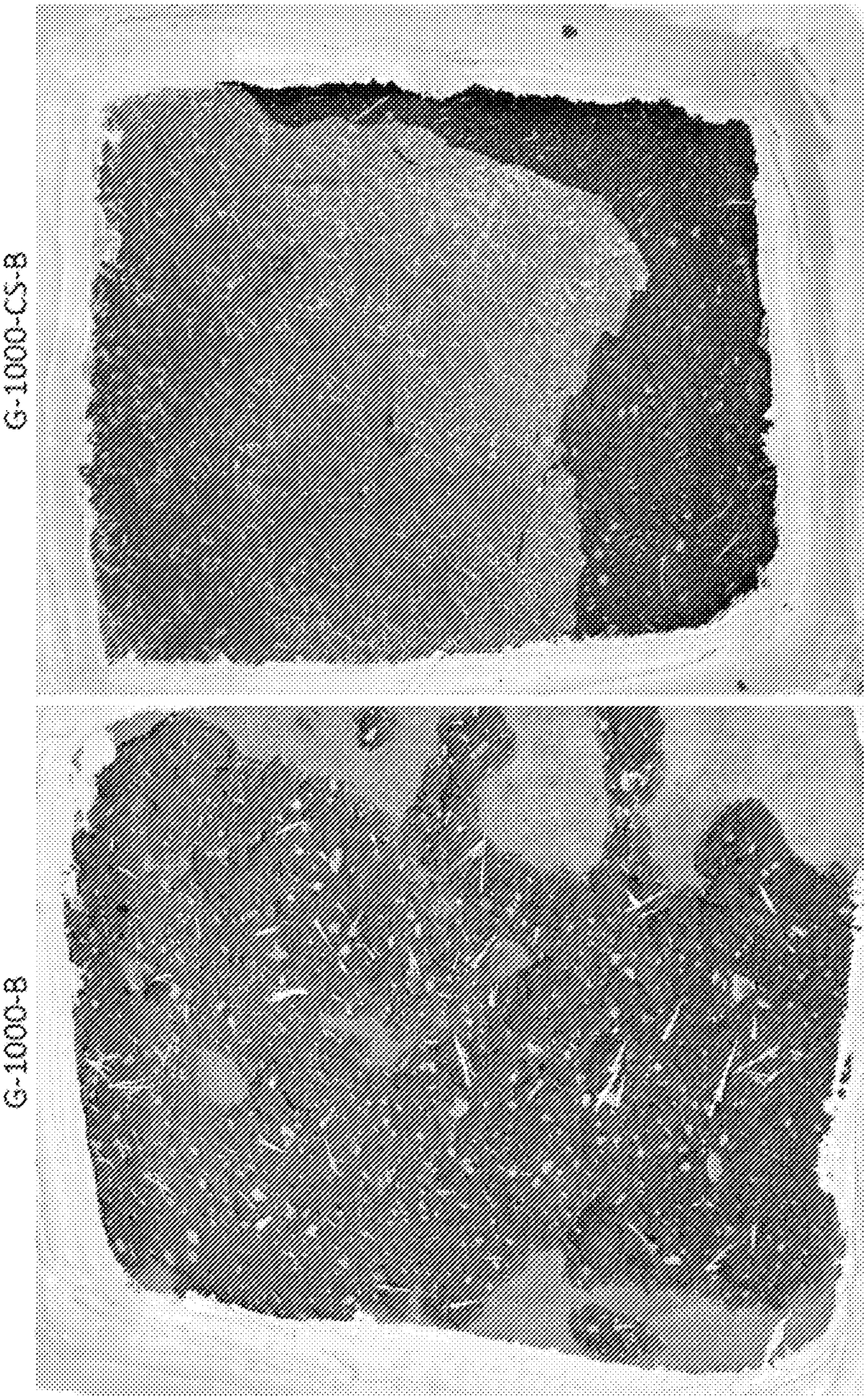
FIG. 3G depicts visual surface deterioration observations taken after 30 freeze-thaw cycles, for compositions including 1,000 lb/CY cement and including and not including a cure sealer, when exposed to a salt solution.
Figure 3H:
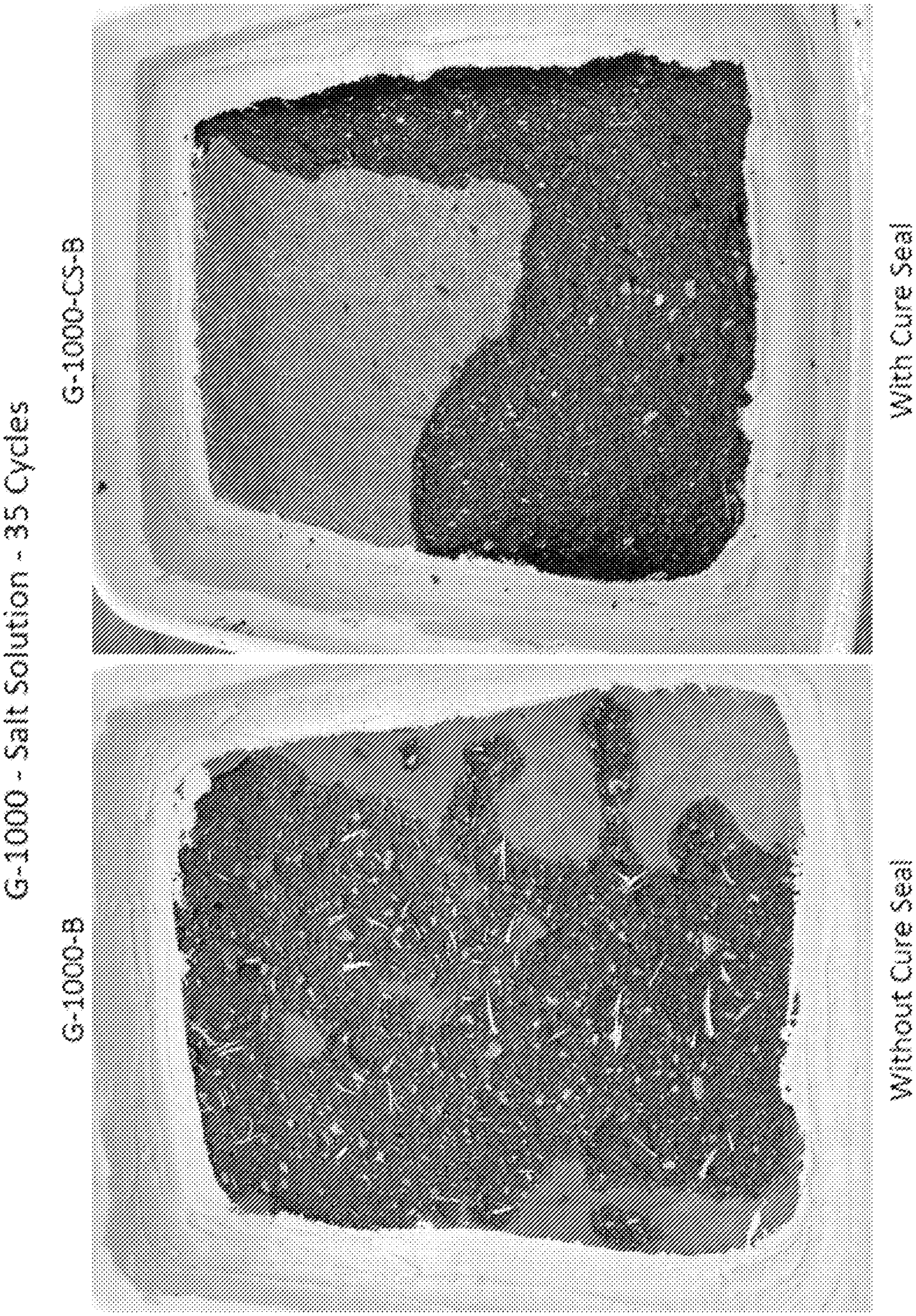
FIG. 3H depicts visual surface deterioration observations taken after 35 freeze-thaw cycles, for compositions including 1,000 lb/CY cement and including and not including a cure sealer, when exposed to a salt solution.

FIG. 3A illustrates a graphical representation of data depicting freeze-thaw cycle data for compositions including 1,000 lb/CY cement and either including or not including a cure sealer, when exposed to the salt solution. FIGS. 3B-3H include photographs of visual surface deterioration observations taken every 5 (five) freeze-thaw cycles up to 35 (thirty-five) freeze-thaw cycles, for compositions including 1,000 lb/CY cement and either including or not including a cure sealer, when exposed to the salt solution.

Figure 4A:
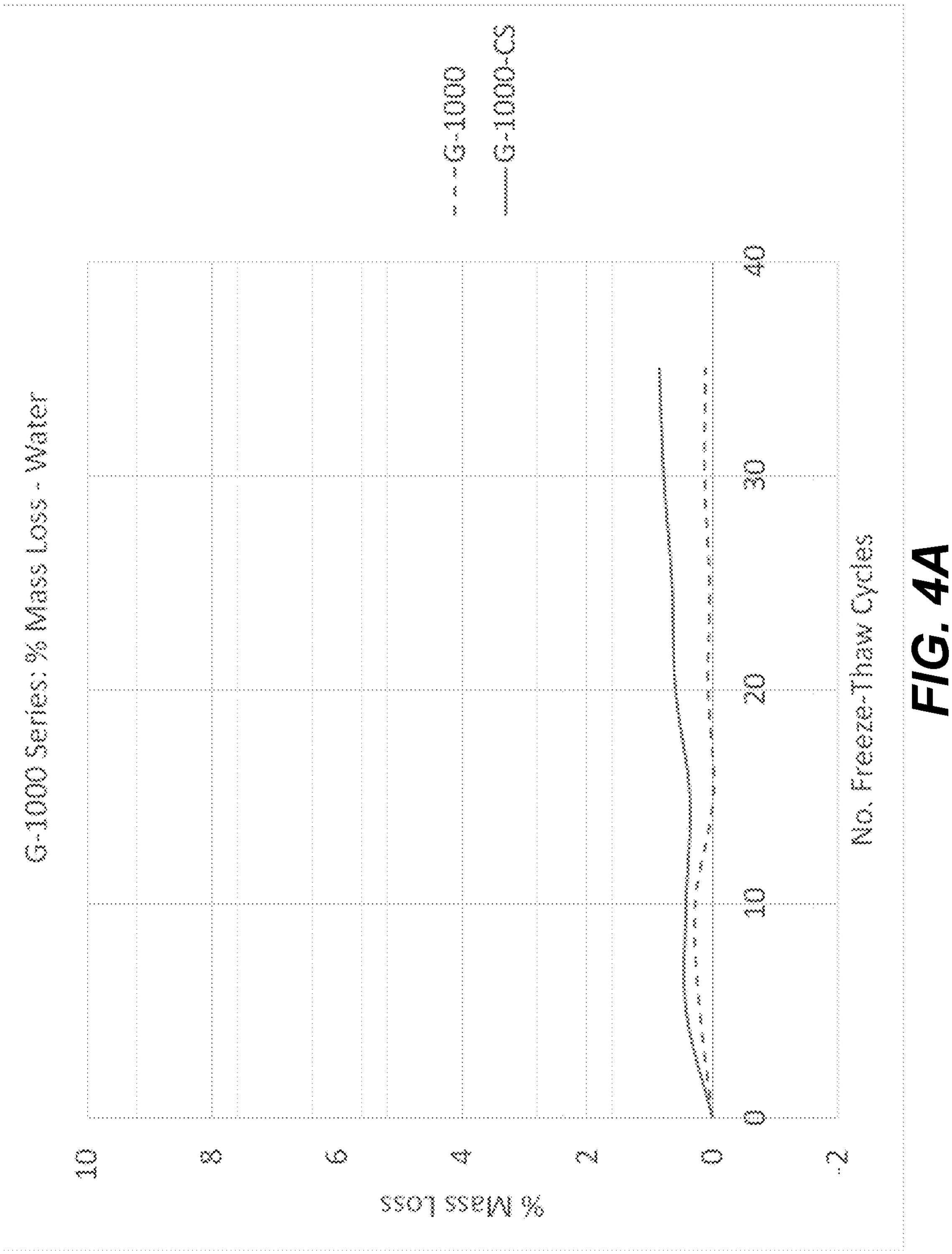
FIG. 4A illustrates a graphical representation of data depicting freeze-thaw cycle data for compositions including 1,000 lb/CY cement and either including or not including a cure sealer, when exposed to water.
Figure 4B:
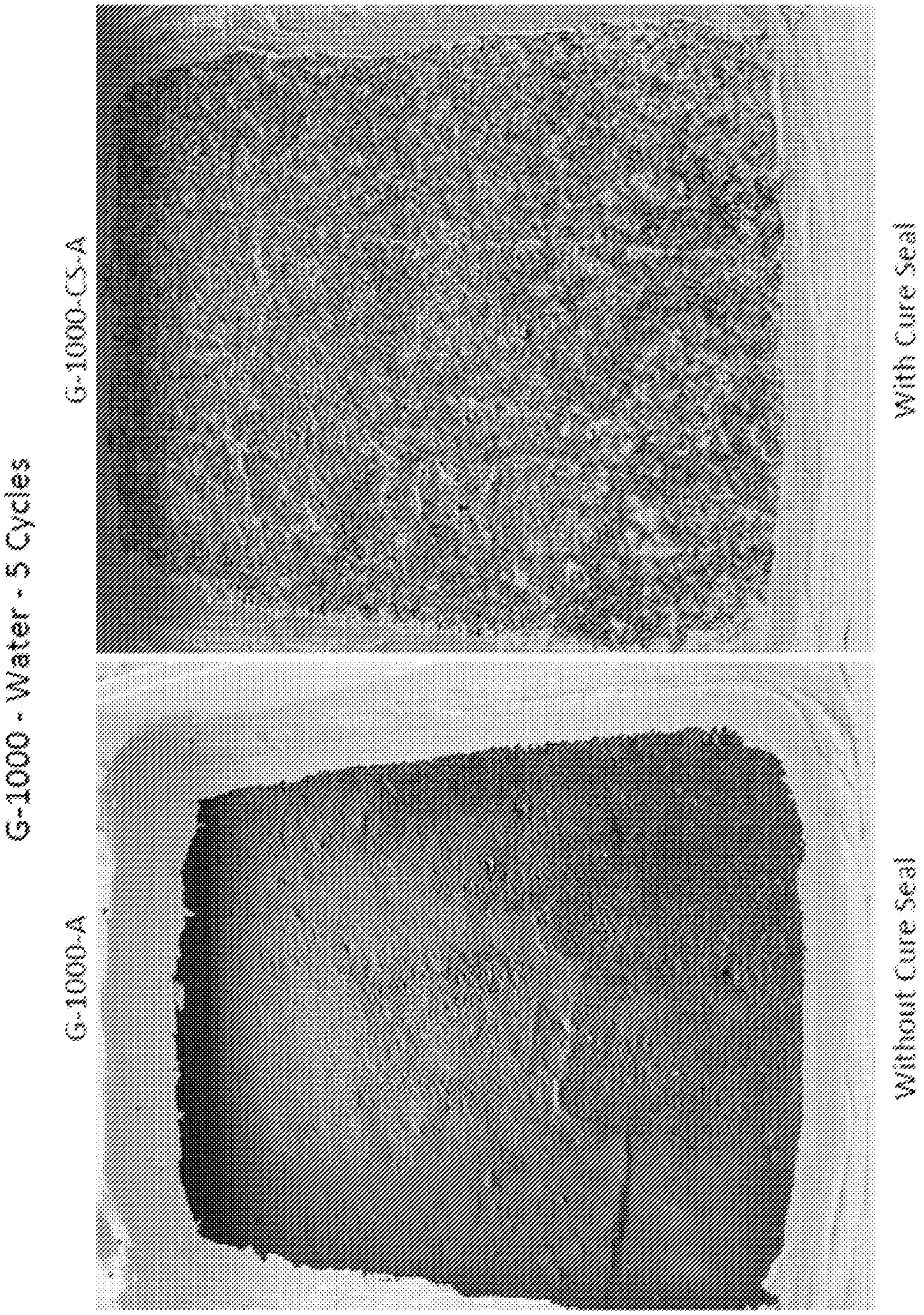
FIG. 4B depicts visual surface deterioration observations taken after 5 freeze-thaw cycles, for compositions including 1,000 lb/CY cement and including and not including a cure sealer, when exposed to water.
Figure 4C:
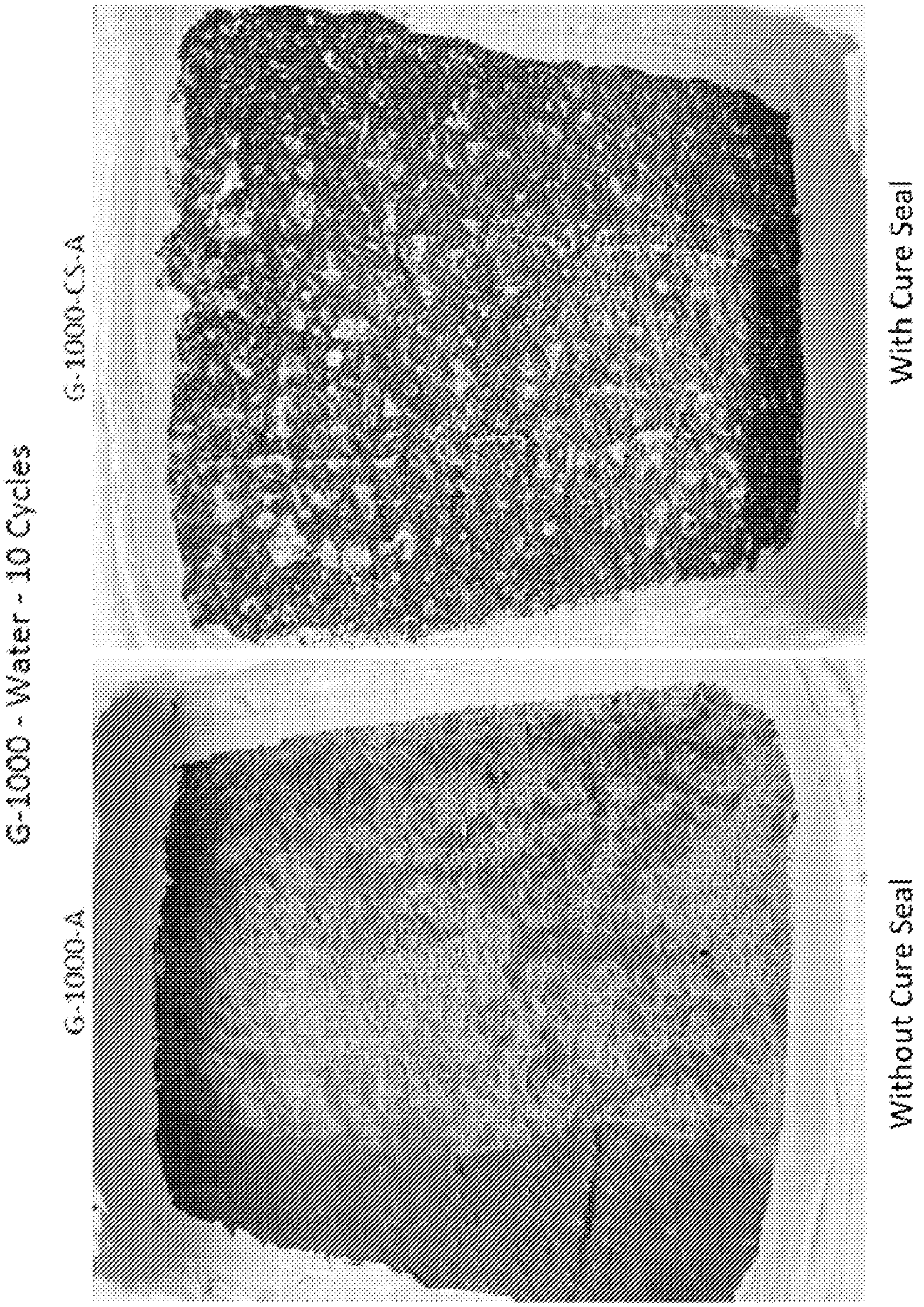
FIG. 4C depicts visual surface deterioration observations taken after 10 freeze-thaw cycles, for compositions including 1,000 lb/CY cement and including and not including a cure sealer, when exposed to water.
Figure 4D:
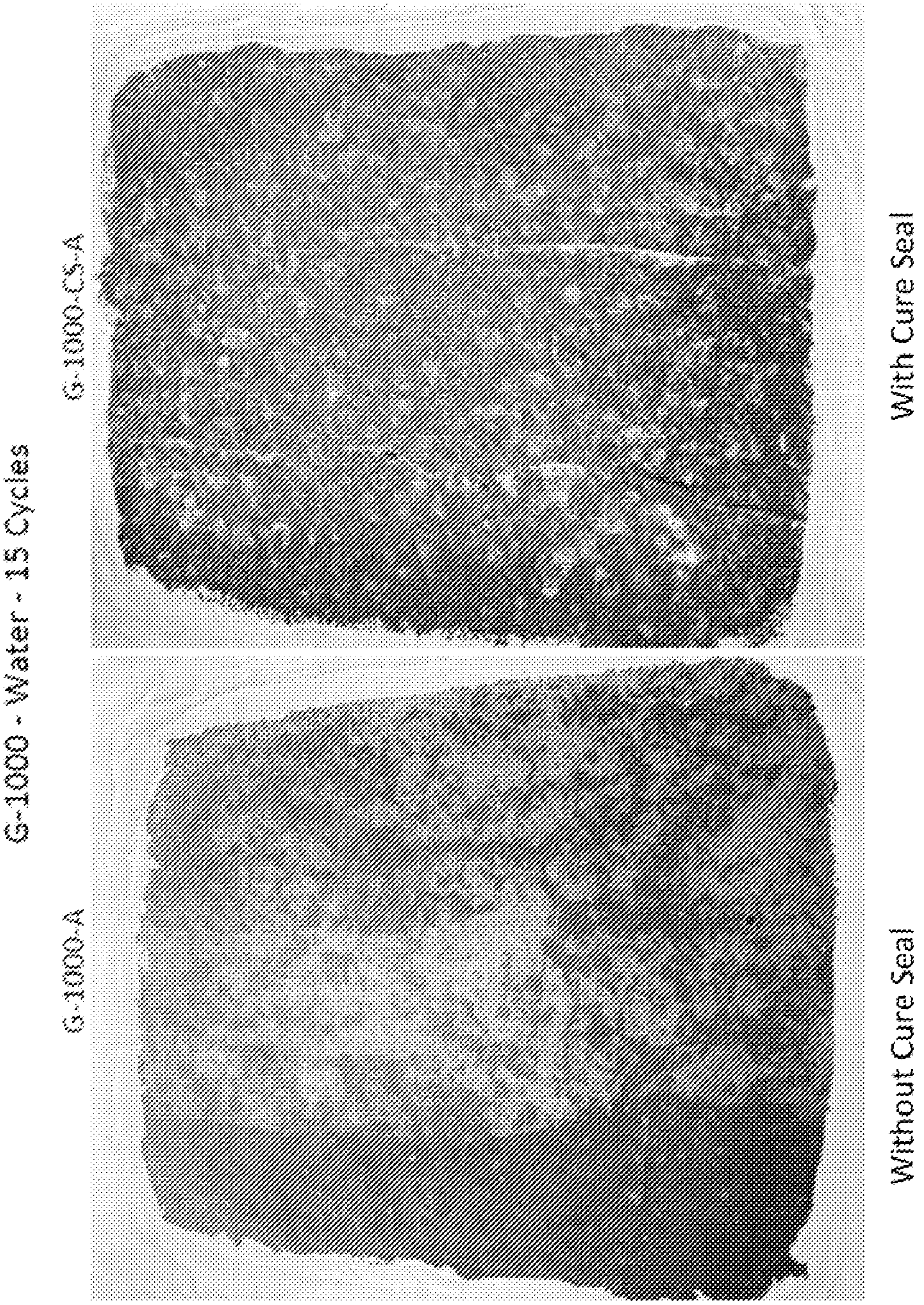
FIG. 4D depicts visual surface deterioration observations taken after 15 freeze-thaw cycles, for compositions including 1,000 lb/CY cement and including and not including a cure sealer, when exposed to water.
Figure 4E:
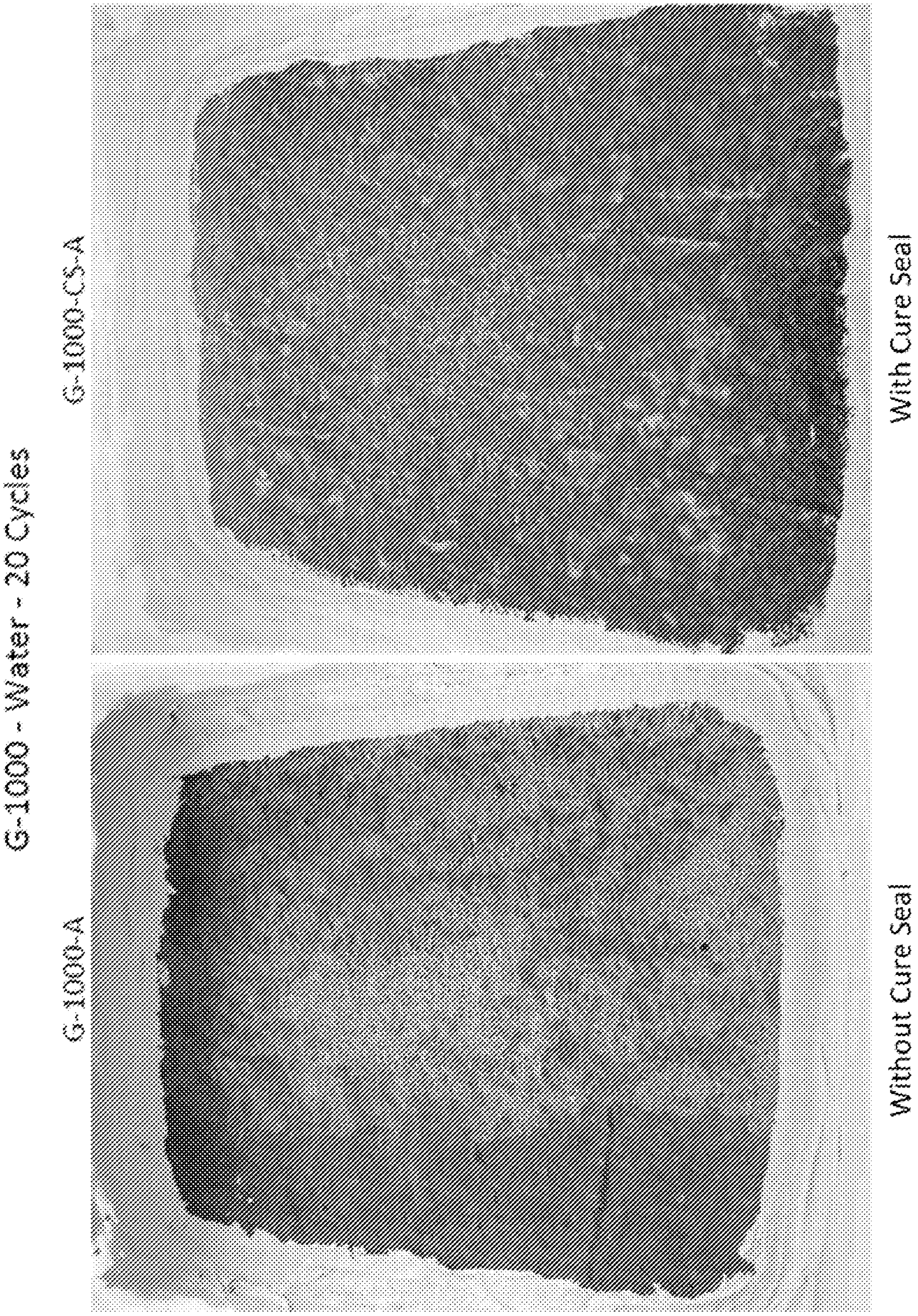
FIG. 4E depicts visual surface deterioration observations taken after 20 freeze-thaw cycles, for compositions including 1,000 lb/CY cement and including and not including a cure sealer, when exposed to water.
Figure 4F:
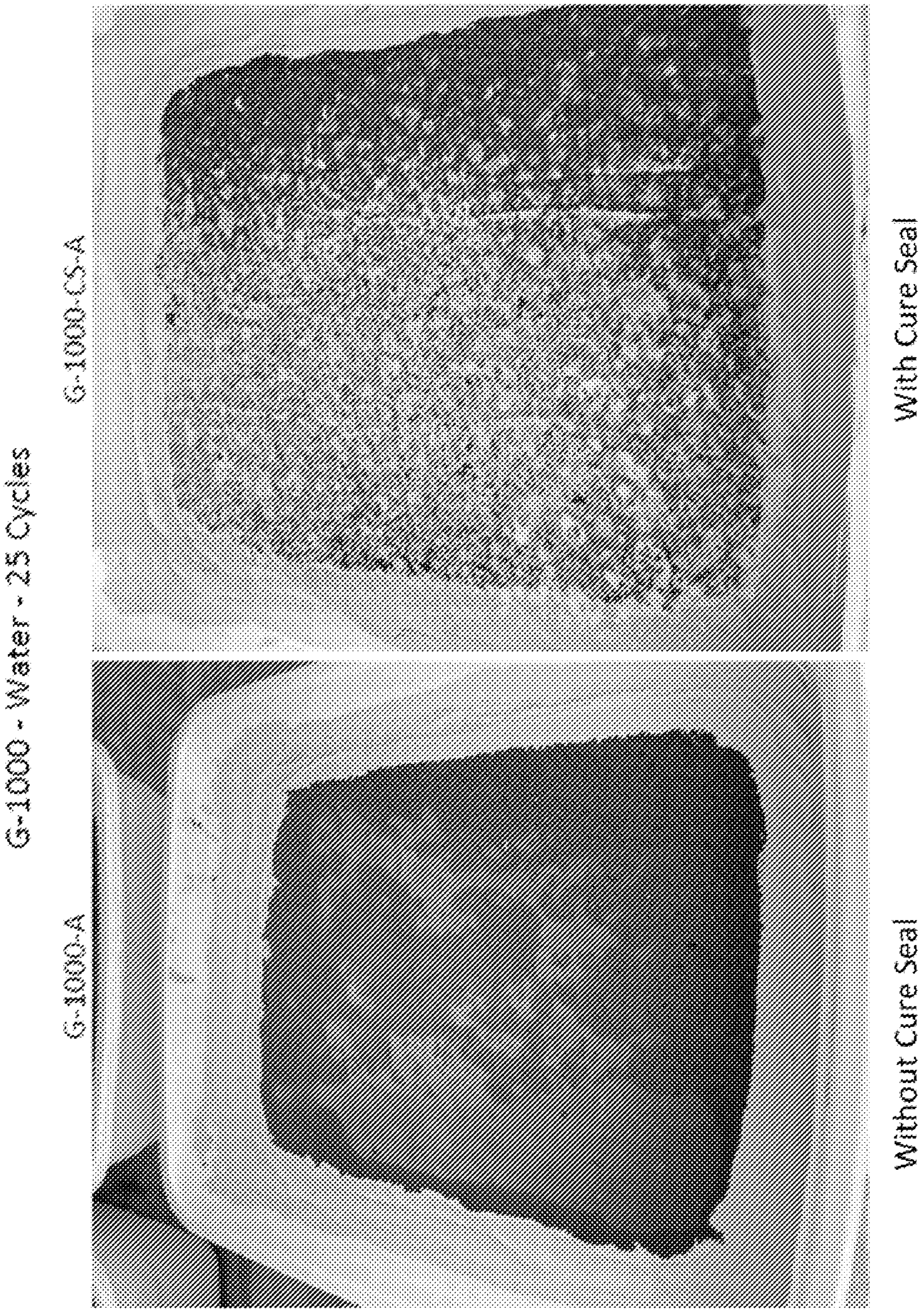
FIG. 4F depicts visual surface deterioration observations taken after 25 freeze-thaw cycles, for compositions including 1,000 lb/CY cement and including and not including a cure sealer, when exposed to water.
Figure 4G:
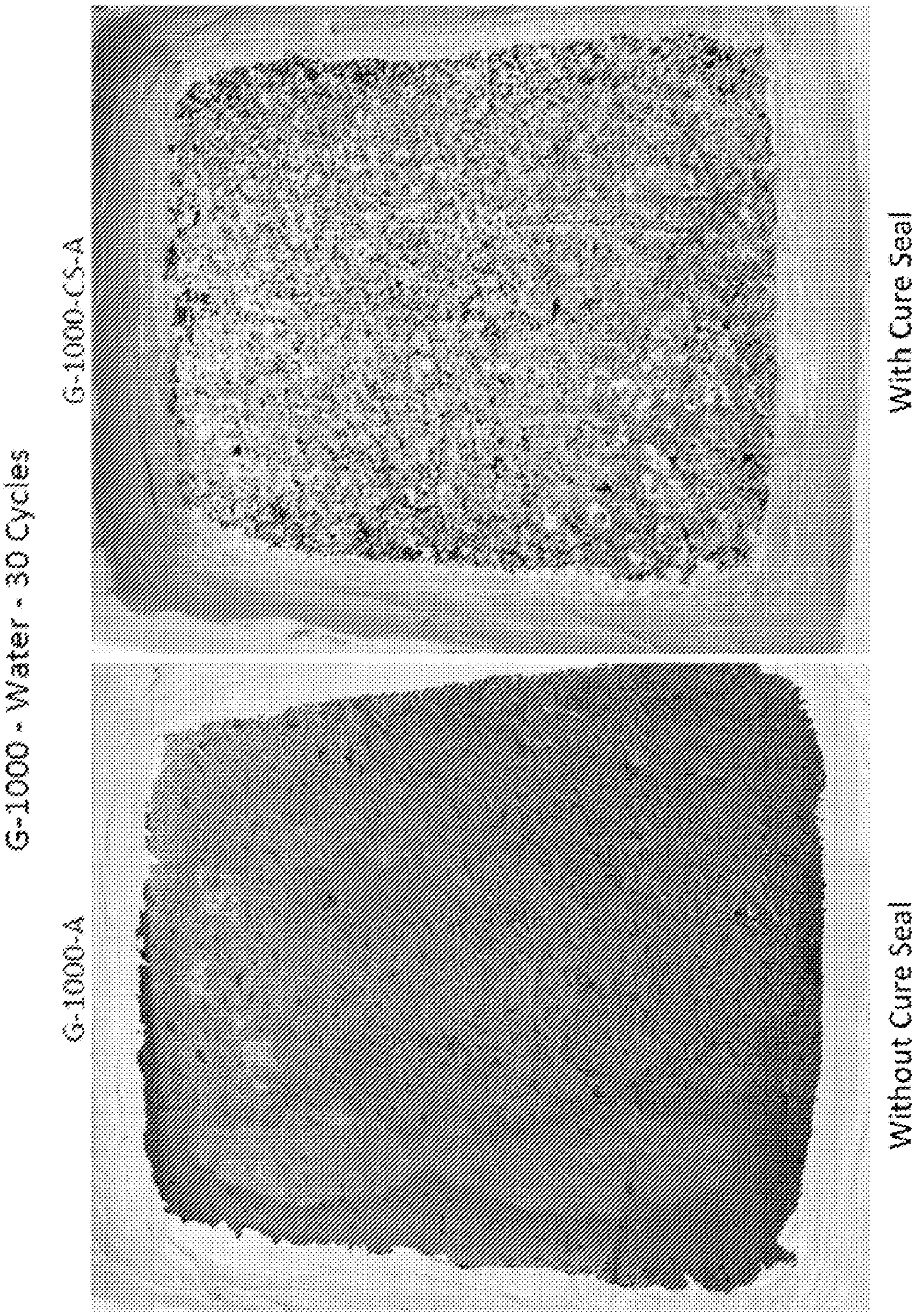
FIG. 4G depicts visual surface deterioration observations taken after 30 freeze-thaw cycles, for compositions including 1,000 lb/CY cement and including and not including a cure sealer, when exposed to water.
Figure 4H:
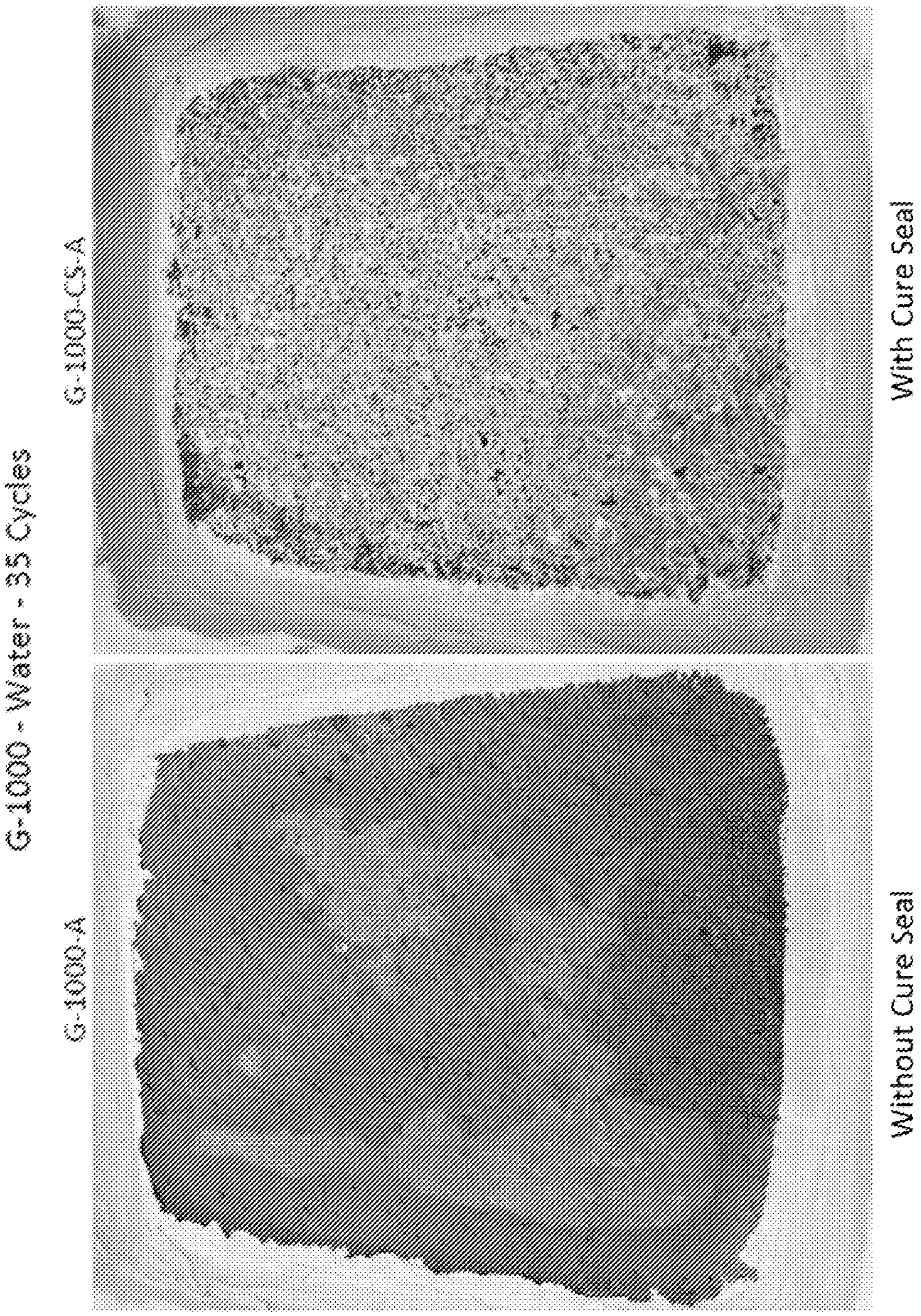
FIG. 4H depicts visual surface deterioration observations taken after 35 freeze-thaw cycles, for compositions including 1,000 lb/CY cement and including and not including a cure sealer, when exposed to water.

FIG. 4A illustrates a graphical representation of data depicting freeze-thaw cycle data for compositions including 1,000 lb/CY cement and either including or not including a cure sealer, when exposed to water. FIGS. 4B-4H include photographs of visual surface deterioration observations taken every 5 (five) freeze-thaw cycles up to 35 (thirty-five) freeze-thaw cycles, for compositions including 1,000 lb/CY cement and either including or not including a cure sealer, when exposed to water.

TABLE 19B

Percent Mass Loss Data due to Freeze-Thaw Cycles for the Compositions of Example 15 when Exposed to Water. Freeze Thaw—Water (A samples)

| | % Mass Loss After No. Cycles | | | | | | | |
|---|---|---|---|---|---|---|---|---|
| Mix ID | 0 | 5 | 10 | 15 | 20 | 25 | 30 | 35 |
| G-800 | 0.0 | 0.1 | 0.3 | 0.3 | 0.6 | 0.4 | 0.5 | 0.6 |
| G-800-CS | 0.0 | 0.0 | −0.3 | −0.2 | −0.3 | 0.0 | 0.2 | 0.4 |
| G-1000 | 0.0 | 0.2 | 0.3 | 0.0 | 0.1 | 0.1 | 0.1 | 0.1 |
| G-1000-CS | 0.0 | 0.4 | 0.4 | 0.4 | 0.6 | 0.6 | 0.8 | 0.8 |

TABLE 19C

Percent Mass Loss Data due to Freeze-Thaw Cycles for the Compositions of Example 15 when Exposed to a Salt Solution. Freeze Thaw—Salt Solution (B samples)

| | % Mass Loss After No. Cycles | | | | | | | |
|---|---|---|---|---|---|---|---|---|
| Mix ID | 0 | 5 | 10 | 15 | 20 | 25 | 30 | 35 |
| G-800 | 0.0 | 0.7 | 1.0 | 1.2 | 1.8 | 1.9 | 5.2 | 12.3 |
| G-800-CS | 0.0 | 0.1 | 0.1 | 0.0 | −0.1 | −0.1 | −0.1 | −0.1 |
| G-1000 | 0.0 | 0.8 | 0.8 | 2.9 | 2.9 | 2.8 | 2.6 | 3.4 |
| G-1000-CS | 0.0 | 0.2 | 0.2 | 0.3 | 0.4 | 0.5 | 3.8 | 9.6 |

Example 20

Twelve embodiments of the compositions described above were prepared for testing and evaluation. Four of these compositions were prepared including dry calcium chloride Prill. Four of these compositions were prepared including a liquid calcium chloride solution. The components for each of the four compositions is set forth below based on pounds per cubic yard (lb/cy) and ounces per 100 lbs of cement (oz/cwt) in Table 20A and percent (%) of the composition by weight in Table 20B.

TABLE 20A

Components of Twelve Embodiments of the Compositions by Pounds per Cubic Yard and Ounces per 100 Pounds of Cement.

| Mix ID | Composition (lb/Cy) | | | | | Liq. CC | CC Prill | Solid CaCl | Admix Water |
|---|---|---|---|---|---|---|---|---|---|
| | Cement | Sand | Fiber | Polymer | Water | (oz./cwt) | (lb/CY) | (lb/CY) | (lb/CY) |
| G-600-FP | 600 | 2550 | 2.5 | 2 | 501 | 0 | 0 | 0.0 | 0 |
| G-600-CC | 600 | 2550 | 2.5 | 2 | 501 | 0 | 30 | 30.0 | 0 |
| G-600-LCC | 600 | 2550 | 2.5 | 2 | 434 | 178 | 0 | 29.9 | 62 |
| G-800-FP | 800 | 2400 | 2.5 | 2 | 509 | 0 | 0 | 0.0 | 0 |
| G-800-CC | 800 | 2350 | 2.5 | 2 | 509 | 0 | 40 | 40.0 | 0 |
| G-800-LCC | 800 | 2350 | 2.5 | 2 | 434 | 178 | 0 | 39.9 | 83 |
| G-1000-FP | 1000 | 2250 | 2.5 | 2 | 501 | 0 | 0 | 0.0 | 0 |
| G-1000-CC | 1000 | 2220 | 2.5 | 2 | 501 | 0 | 30 | 30.0 | 0 |
| G-1000-LCC | 1000 | 2250 | 2.5 | 2 | 434 | 107 | 0 | 30.0 | 62 |
| G-1200-FP | 1200 | 1975 | 2.5 | 2 | 547 | 0 | 0 | 0.0 | 0 |
| G-1200-CC | 1200 | 1925 | 2.5 | 2 | 547 | 0 | 36 | 36.0 | 0 |
| G-1200-LCC | 1200 | 1950 | 2.5 | 2 | 476 | 107 | 0 | 36.0 | 74 |

TABLE 20B

Components of the compositions of Table 20A by Weight.

| Mix ID | Composition % Wt. | | | | | |
|---|---|---|---|---|---|---|
| | Cement | Sand | Fiber | Polymer | Water | CaCl |
| G-600-FP | 16.41% | 69.76% | 0.07% | 0.05% | 13.71% | 0.00% |
| G-600-CC | 16.28% | 69.19% | 0.07% | 0.05% | 13.59% | 0.81% |
| G-600-LCC | 16.30% | 69.29% | 0.07% | 0.05% | 13.48% | 0.81% |
| G-800-FP | 21.54% | 64.63% | 0.07% | 0.05% | 13.71% | 0.00% |
| G-800-CC | 21.60% | 63.45% | 0.07% | 0.05% | 13.74% | 1.08% |
| G-800-LCC | 21.56% | 63.33% | 0.07% | 0.05% | 13.92% | 1.07% |
| G-1000-FP | 26.63% | 59.91% | 0.07% | 0.05% | 13.34% | 0.00% |
| G-1000-CC | 26.63% | 59.11% | 0.07% | 0.05% | 13.34% | 0.80% |
| G-1000-LCC | 26.45% | 59.52% | 0.07% | 0.05% | 13.12% | 0.79% |
| G-1200-FP | 32.20% | 53.00% | 0.07% | 0.05% | 14.68% | 0.00% |
| G-1200-CC | 32.32% | 51.85% | 0.07% | 0.05% | 14.73% | 0.97% |
| G-1200-LCC | 32.08% | 52.13% | 0.07% | 0.05% | 14.71% | 0.96% |

Example 21

Nine of the twelve embodiments of the compositions of Example 20 were evaluated to determine the effects of inclusion of dry calcium chloride or liquid calcium chloride solution as compared to a composition including no calcium chloride. Batches of the compositions were mixed and quickly placed into plastic cylinder molds (3 inches in diameter by 6 inches long), which were then placed in a fully insulated Styrofoam receptacles. Temperatures of the compositions were measured and logged digitally via thermocouples embedded within the material. Temperatures were measured for each composition at 6-minute intervals, up to a total time of between 1200 min. and 1500 min.

Heat generation during mixture curing can be an indicator of hydration occurring and curing/setting taking place. In some examples, the amount of heat generated and/or a higher rate of heat generation may be indicative of the mixture setting and being capable of achieving a measurable compressive strength. In some examples, peaks in heat generation curves may indicate when a mixture will achieve a measurable compressive strength. Adjusting the composition of a mixture, for example, adding accelerants, may shift the heat generation curve so that the peak (and time to achievement of a measurable compressive strength) occurs sooner or later.

Among the compositions for each of the different amounts of cement tested (600 lb/CY, 800 lb/CY, 1000 lb/CY), the composition with the highest peak was the composition including dry calcium carbonate (G-600-C, G-800-CC, G-1000-CC), and these highest peaks appeared sooner than or did not appear significantly later than the peaks for the compositions including liquid calcium chloride.

Figure 5:
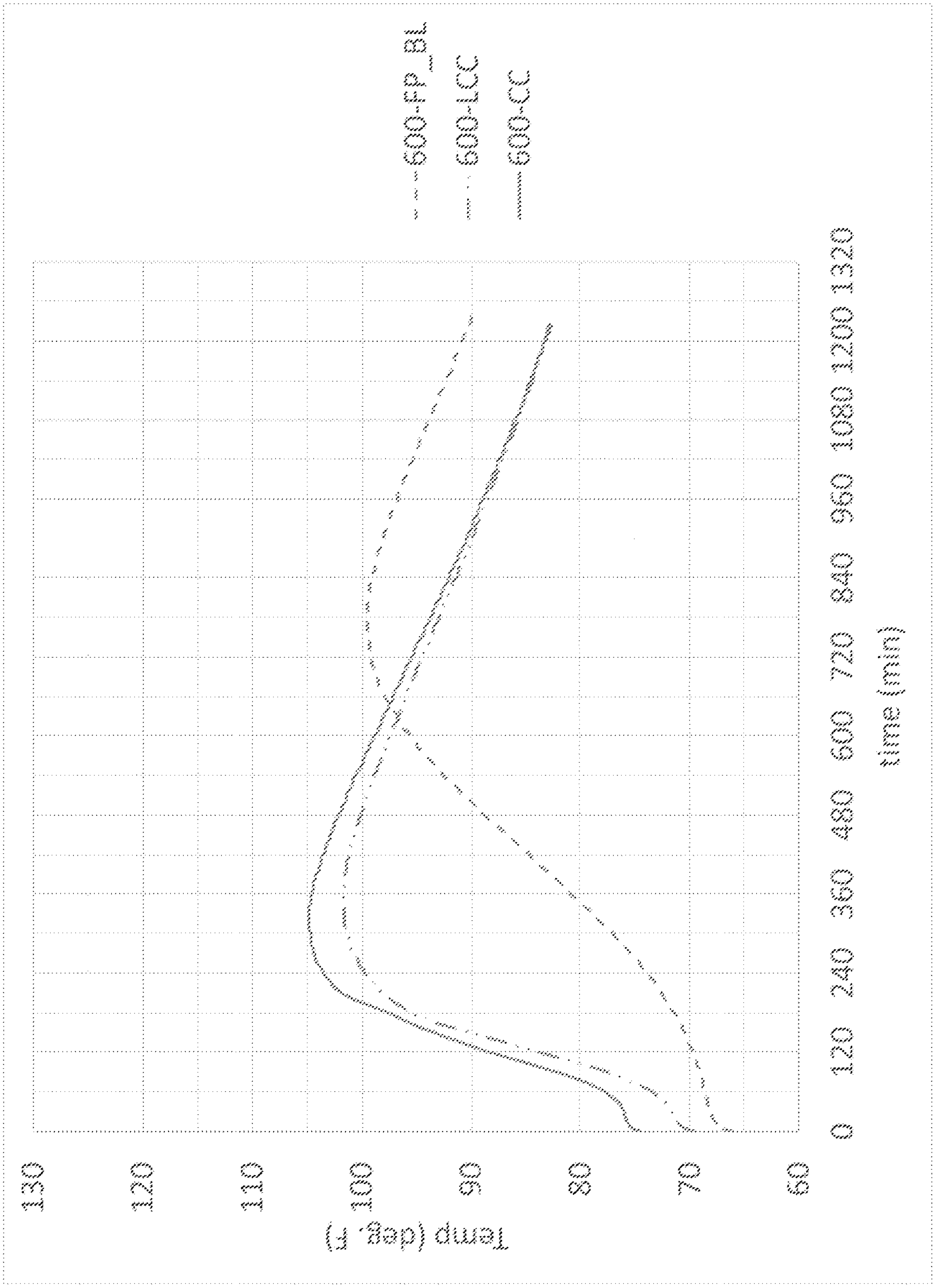
FIG. 5 illustrates a graphical representation of data depicting heat generation curves for compositions including 600 lb/CY cement and including no calcium chloride, liquid calcium chloride, or dry calcium chloride.
Figure 6:
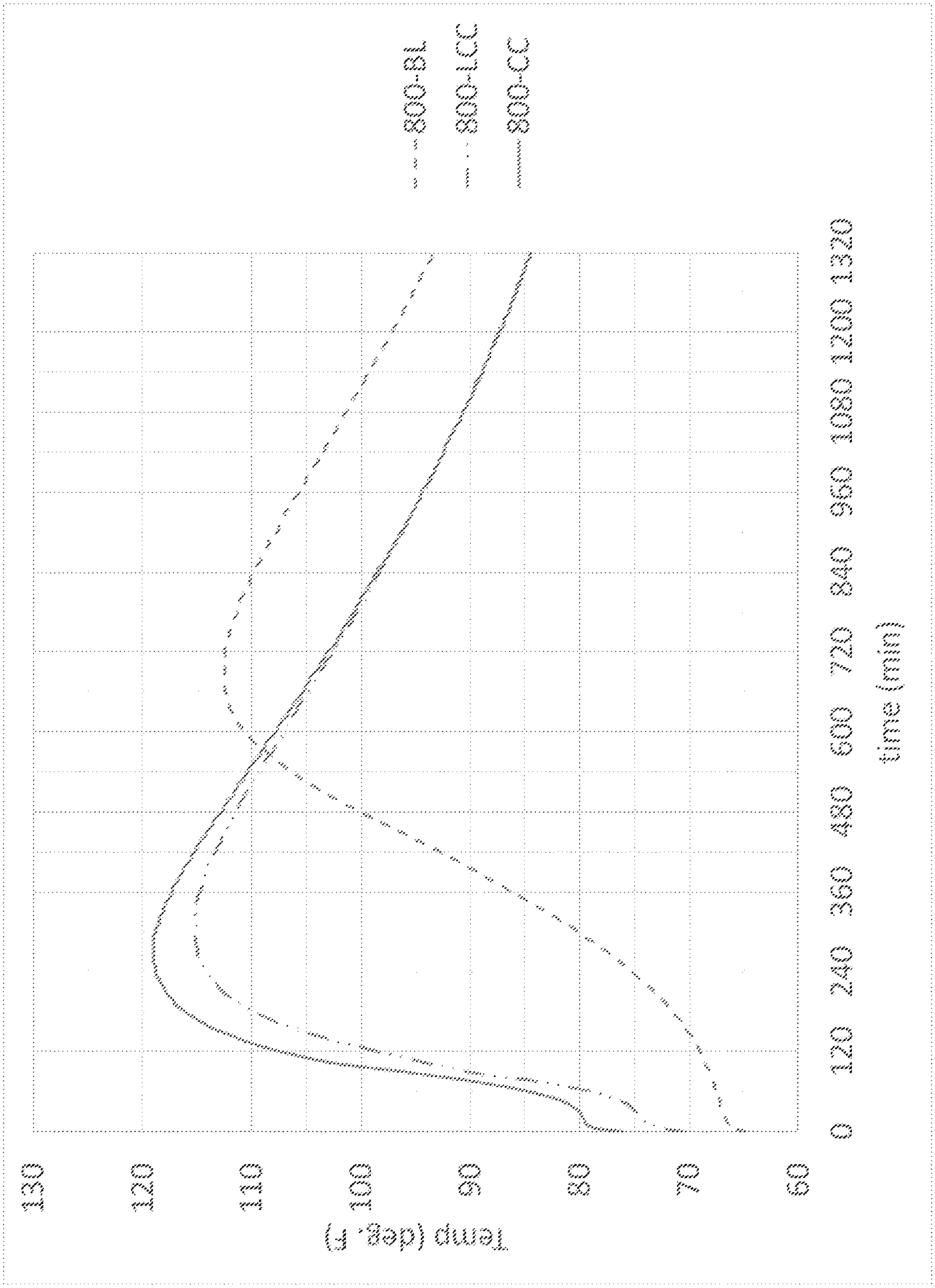
FIG. 6 illustrates a graphical representation of data depicting heat generation curves for compositions including 800 lb/CY cement and including no calcium chloride, liquid calcium chloride, or dry calcium chloride.
Figure 7:
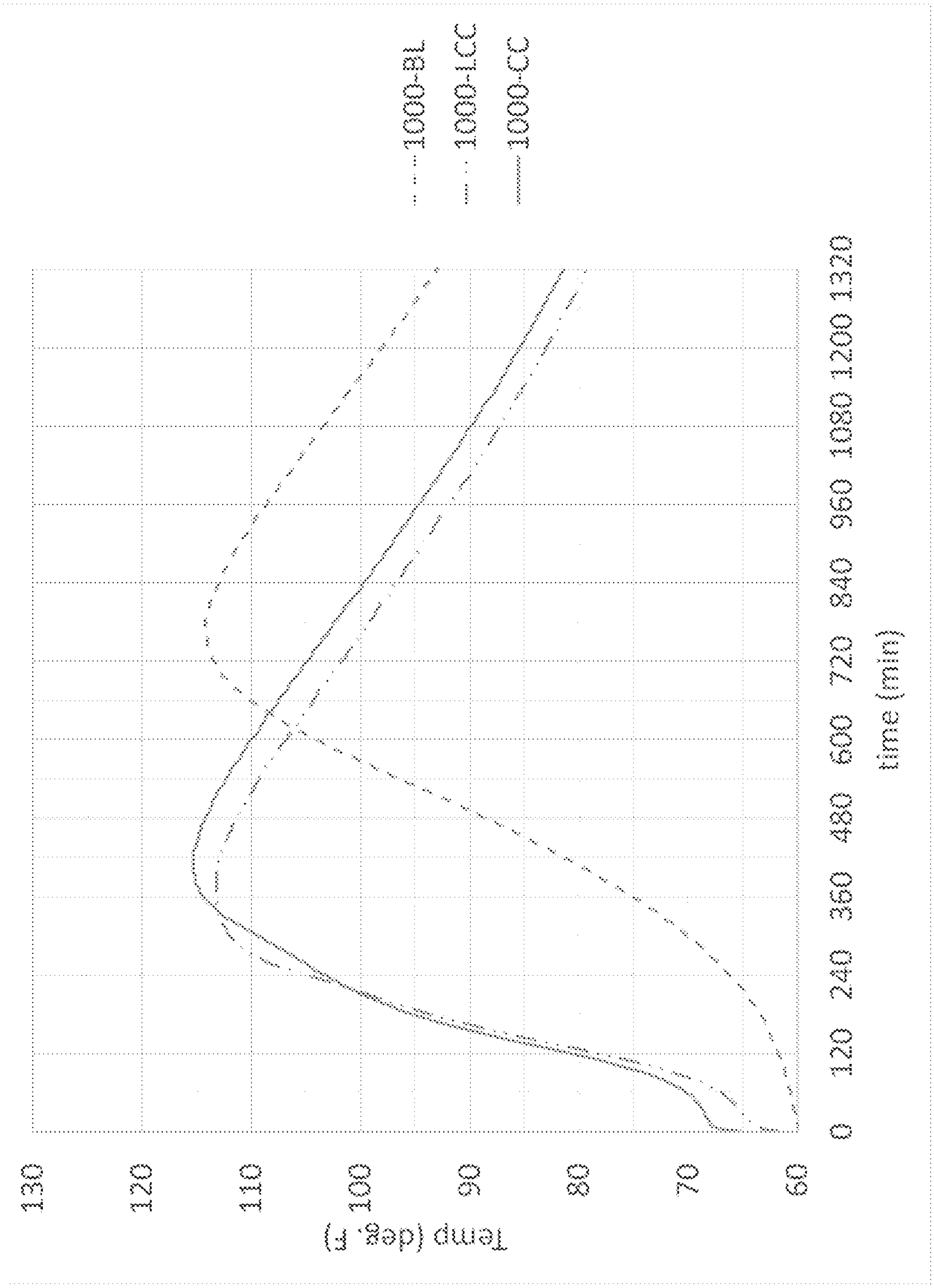
FIG. 7 illustrates a graphical representation of data depicting heat generation curves for compositions including 1000 lb/CY cement and including no calcium chloride, liquid calcium chloride, or dry calcium chloride.

FIG. 5 illustrates a graph of heat generation curves (temperature in degrees Fahrenheit by time in minutes) for compositions including 600 lb/CY cement and including no calcium chloride, liquid calcium chloride, or dry calcium chloride. FIG. 6 illustrates a graph of heat generation curves (temperature in degrees Fahrenheit by time in minutes) for compositions including 800 lb/CY cement and including no calcium chloride, liquid calcium chloride, or dry calcium chloride. FIG. 7 illustrates a graph of heat generation curves (temperature in degrees Fahrenheit by time in minutes) for compositions including 1000 lb/CY cement and including no calcium chloride, liquid calcium chloride, or dry calcium chloride.

Figure 8:
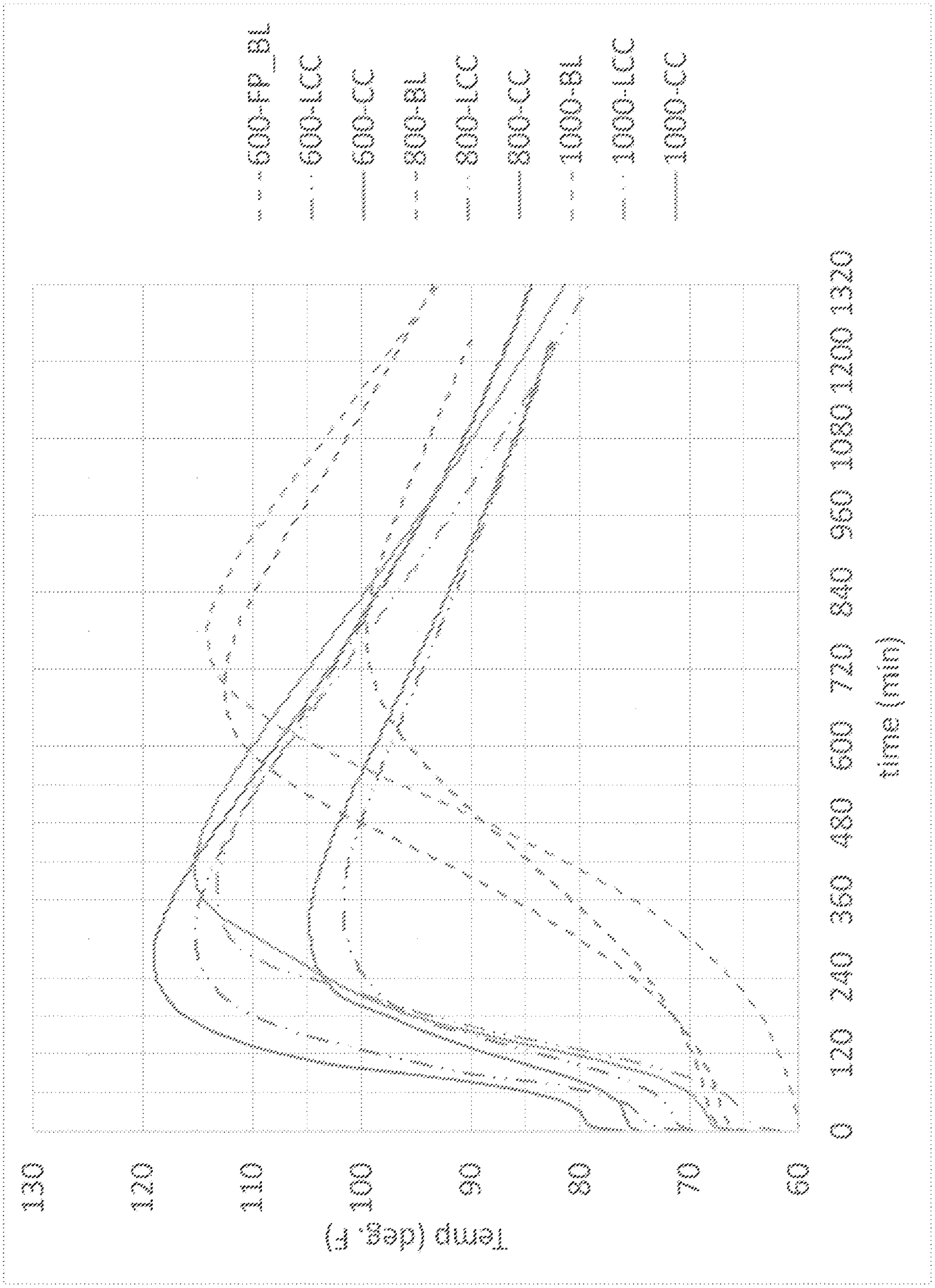
FIG. 8 illustrates a graphical representation of data depicting heat generation curves for the compositions and heat generation curves depicted in FIGS. 5-7.

FIG. 8 illustrates a graph of heat generation curves (temperature in degrees Fahrenheit by time in minutes) for the compositions and heat generation curves depicted in FIGS. 5-7.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above.

Where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects. The scope of the technology is defined by the following claims and any equivalents therein.

The invention claimed is:

1. A composition comprising:

between 45% and 70% sand by weight of the composition;

between 10% and 35% cement by weight of the composition;

between 5% and 20% water by weight of the composition;

between 0.02% and 0.2% a water reducer by weight of the composition;

between 0.01% and 0.5% fibers by weight of the composition; and between 0.1% and 3% anhydrous calcium chloride by weight of the composition, the composition having a compressive strength of between 1,500 psi and 4,000 psi after 7 days, and a compressive strength of between 2,500 psi and 5,000 psi after 28 days.

2. The composition of claim 1, wherein the sand is between 50% and 65% by weight of the composition.

3. The composition of claim 1, wherein the cement includes Portland cement.

4. The composition of claim 3, wherein the Portland cement is between 15% and 30% by weight of the composition.

5. The composition of claim 1, wherein the anhydrous calcium chloride includes pellets.

6. The composition of claim 5, wherein the anhydrous calcium chloride is between 0.5% and 2% by weight of the composition.

7. The composition of claim 1, wherein the water is between 10% and 15% by weight of the composition.

8. The composition of claim 1, further comprising between 0.01% and 2.0% polymer by weight of the composition.

9. The composition of claim 8, wherein the polymer is between 0.03% and 0.1% by weight of the composition.

10. The composition of claim 8, wherein the polymer is hydroxypropyl methylcellulose.

11. The composition of claim 1, wherein the fibers are between 0.05% and 0.1% by weight of the composition.

12. The composition of claim 1, wherein the fibers are polypropylene fibers.

13. The composition of claim 1, wherein the fibers are between 0.25 inches and 0.5 inches long.

14. The composition of claim 1, further comprising a cure-sealing compound.

15. The composition of claim 14, wherein the cure sealing compound is applied to the composition at a coverage rate of 400 square feet per gallon of cure sealing compound.

16. The composition of claim 14, wherein two coats of cure sealing compound are applied to the composition.

17. The composition of claim 1, further comprising an air entraining agent.

18. The composition of claim 17, wherein the air entraining agent is between 0.01% and 0.5% by weight of the composition.

19. The composition of claim 17, wherein the air entraining agent is between 0.04% and 0.2% by weight of the composition.

20. The composition of claim 1, wherein the water reducer is between 0.05% and 0.09% by weight of the composition.

* * * * *